(12) United States Patent
Clapper et al.

(10) Patent No.: US 11,543,054 B2
(45) Date of Patent: Jan. 3, 2023

(54) PIPE RETRIEVAL APPARATUS, SYSTEM, AND METHOD

(71) Applicant: North American Pipe Corporation, Houston, TX (US)

(72) Inventors: Joshua E. Clapper, Downingtown, PA (US); Michael A. Dotsey, Chester Springs, PA (US); Dmitry Yashin, Haverford, PA (US); Aaron Blinn, Wayne, PA (US); Mark Brunni, Wayne, PA (US); John Swartzentruber, Wayne, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 0 days.

(21) Appl. No.: 17/346,226

(22) Filed: Jun. 12, 2021

(65) Prior Publication Data

US 2022/0034426 A1     Feb. 3, 2022

Related U.S. Application Data

(63) Continuation-in-part of application No. 16/554,554, filed on Aug. 28, 2019, now Pat. No. 11,054,060.
(Continued)

(51) Int. Cl.
*F16L 1/10*      (2006.01)
*B65G 43/08*     (2006.01)
(Continued)

(52) U.S. Cl.
CPC .......... *F16L 1/0243* (2013.01); *B65G 13/071* (2013.01); *B65G 39/18* (2013.01); *B65G 43/08* (2013.01); *F16L 1/10* (2013.01)

(58) Field of Classification Search
CPC ... B65G 43/08; Y10T 29/49815; Y10T 29/53; Y10T 29/534
See application file for complete search history.

(56) References Cited

U.S. PATENT DOCUMENTS

| 4,178,673 A | 12/1979 | Swanson |
| 4,531,875 A | 7/1985 | Krueger |

(Continued)

OTHER PUBLICATIONS

International Search Report and Written Opinion cited in the International Application No. PCT/US 19/48673; Feb. 5, 2020; 9 pp.

*Primary Examiner* — Jason L Vaughan
*Assistant Examiner* — Amanda Kreiling
(74) *Attorney, Agent, or Firm* — Lempia Summerfield Katz LLC

(57) ABSTRACT

A pipe retrieval machine includes a frame defining a decoupling region and a travel axis and a transporting mechanism supported on the frame. The transporting mechanism has a first gripping structure adjacent an infeed end of the machine and a second gripping structure adjacent an outfeed end of the machine. The decoupling region is between the first and second gripping structures. The machine has a drive system to move the first and second gripping structures at a steady state speed to direct a pipe along the travel axis. The pipe retrieval machine includes one or more safety features to stop the drive system either automatically or through manual action, one or more safety features to inhibit or prevent damage to components of the decoupling region in the event of a malfunction, or both. Methods of operating a pipe retrieval machine include any of the operation procedures, method steps, safety features, and/or functions as described and in any combination.

20 Claims, 52 Drawing Sheets

Related U.S. Application Data

(60) Provisional application No. 63/038,676, filed on Jun. 12, 2020, provisional application No. 62/723,917, filed on Aug. 28, 2018.

(51) Int. Cl.
*F16L 1/024* (2006.01)
*B65G 39/18* (2006.01)
*B65G 13/071* (2006.01)

(56) References Cited

U.S. PATENT DOCUMENTS

| | | | |
|---|---|---|---|
| 5,316,352 A | 5/1994 | Smith | |
| 7,765,685 B2 * | 8/2010 | Brown | B23K 31/02 29/819 |
| 2003/0129043 A1 | 7/2003 | Clare | |
| 2005/0123356 A1 * | 6/2005 | Wilkinson | F16L 1/10 405/184.5 |
| 2007/0183848 A1 | 8/2007 | Fulton | |
| 2008/0247826 A1 | 10/2008 | Kogler | |
| 2010/0316448 A1 | 12/2010 | Gomes | |

* cited by examiner

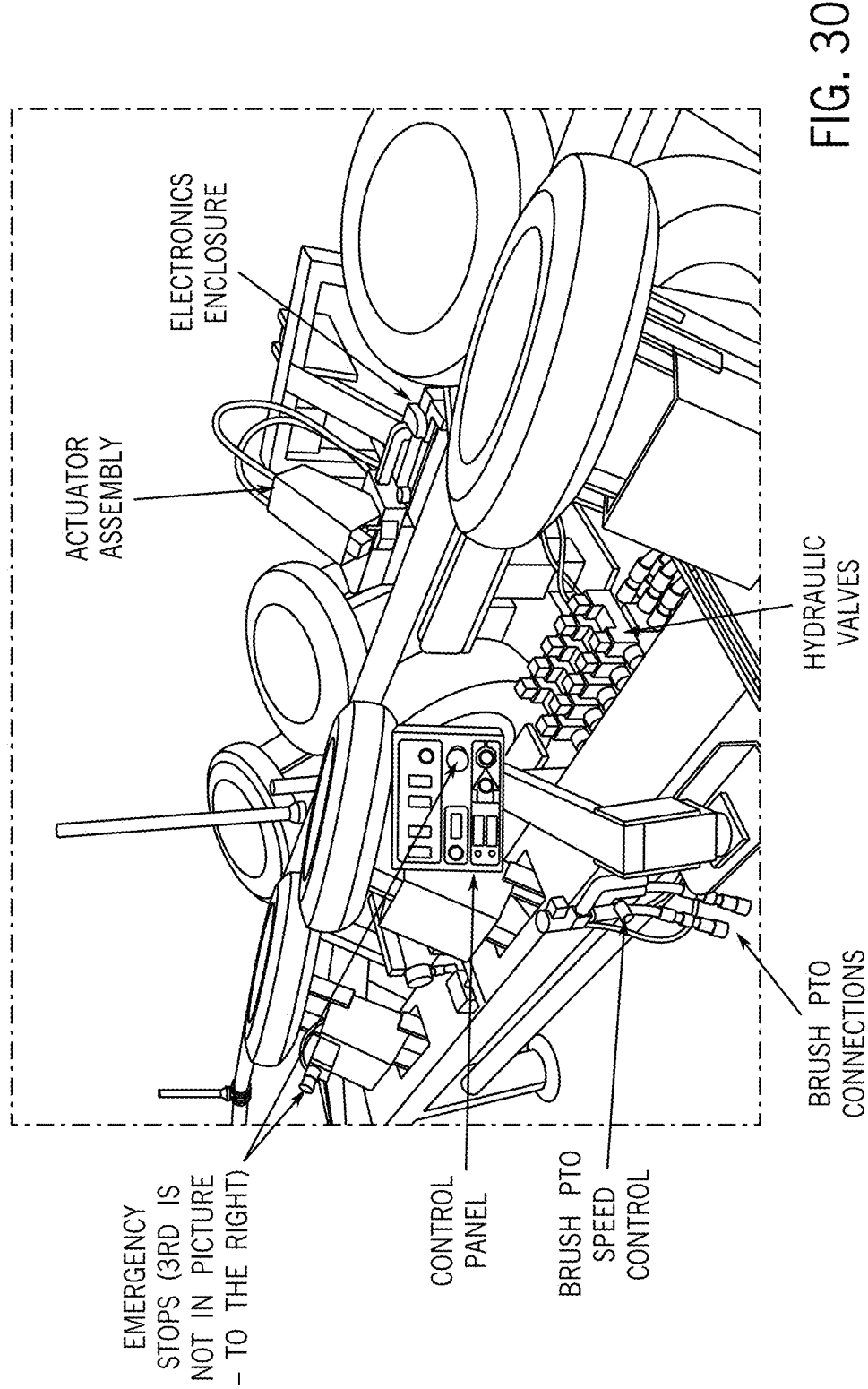

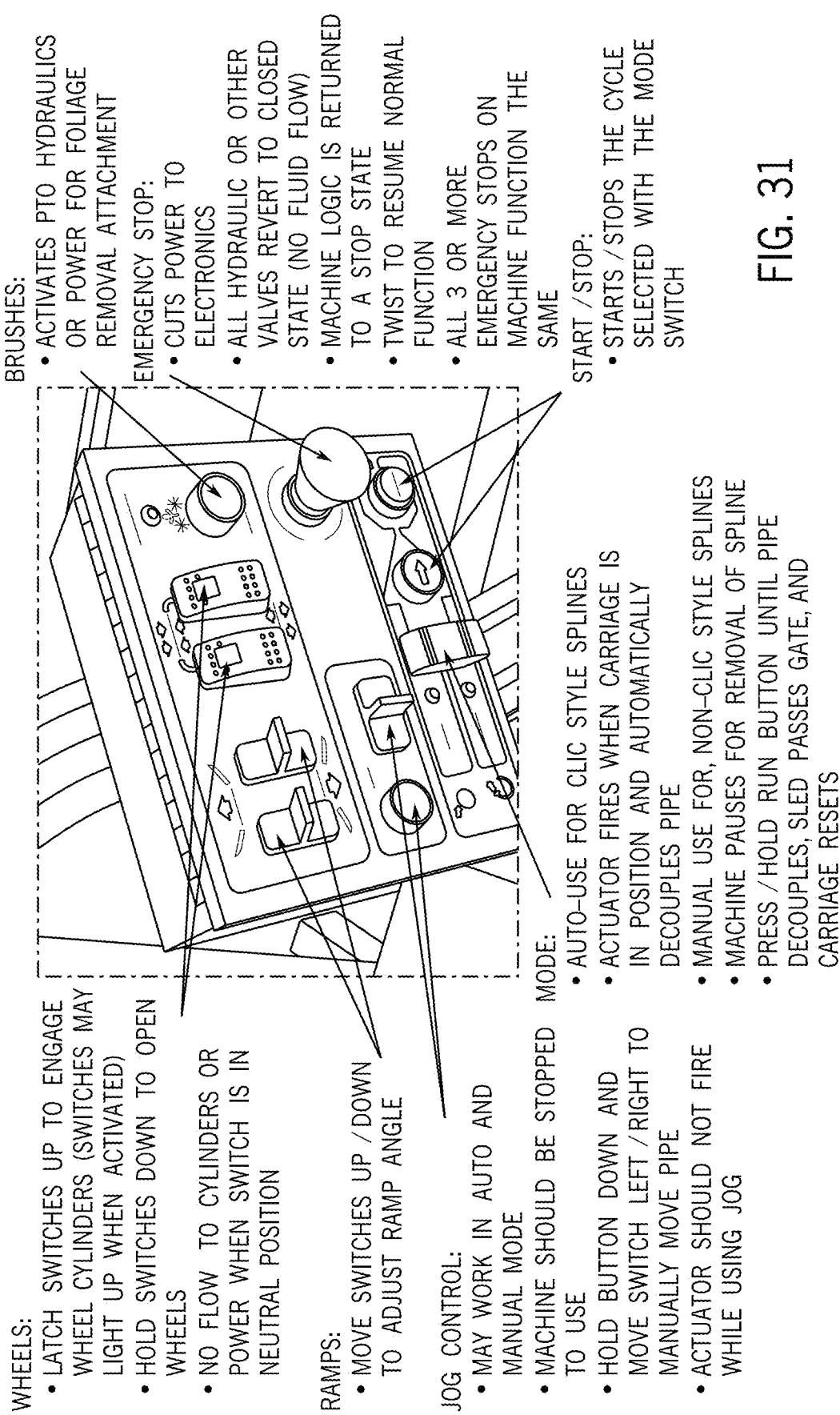

FIG. 31

WHEELS:
- LATCH SWITCHES UP TO ENGAGE WHEEL CYLINDERS (SWITCHES MAY LIGHT UP WHEN ACTIVATED)
- HOLD SWITCHES DOWN TO OPEN WHEELS
- NO FLOW TO CYLINDERS OR POWER WHEN SWITCH IS IN NEUTRAL POSITION

RAMPS:
- MOVE SWITCHES UP/DOWN TO ADJUST RAMP ANGLE

JOG CONTROL:
- MAY WORK IN AUTO AND MANUAL MODE
- MACHINE SHOULD BE STOPPED TO USE
- HOLD BUTTON DOWN AND MOVE SWITCH LEFT/RIGHT TO MANUALLY MOVE PIPE
- ACTUATOR SHOULD NOT FIRE WHILE USING JOG

BRUSHES:
- ACTIVATES PTO HYDRAULICS OR POWER FOR FOLIAGE REMOVAL ATTACHMENT

EMERGENCY STOP:
- CUTS POWER TO ELECTRONICS
- ALL HYDRAULIC OR OTHER VALVES REVERT TO CLOSED STATE (NO FLUID FLOW)
- MACHINE LOGIC IS RETURNED TO A STOP STATE
- TWIST TO RESUME NORMAL FUNCTION
- ALL 3 OR MORE EMERGENCY STOPS ON MACHINE FUNCTION THE SAME

START/STOP:
- STARTS/STOPS THE CYCLE SELECTED WITH THE MODE SWITCH

MODE:
- AUTO-USE FOR CLIC STYLE SPLINES
- ACTUATOR FIRES WHEN CARRIAGE IS IN POSITION AND AUTOMATICALLY DECOUPLES PIPE
- MANUAL USE FOR, NON-CLIC STYLE SPLINES
- MACHINE PAUSES FOR REMOVAL OF SPLINE
- PRESS/HOLD RUN BUTTON UNTIL PIPE DECOUPLES, SLED PASSES GATE, AND CARRIAGE RESETS

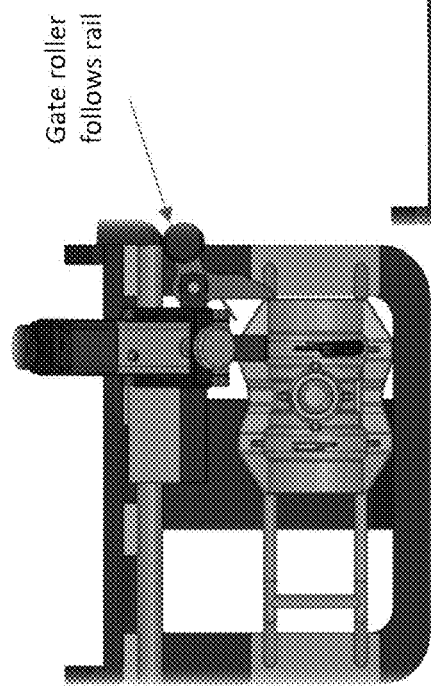
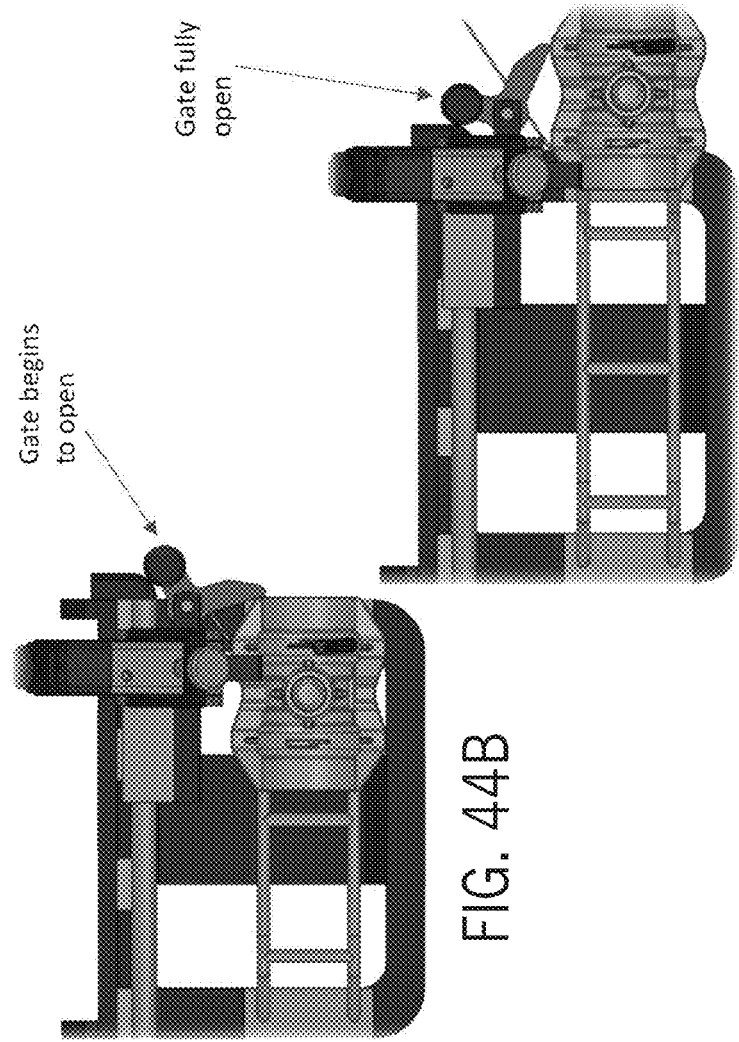
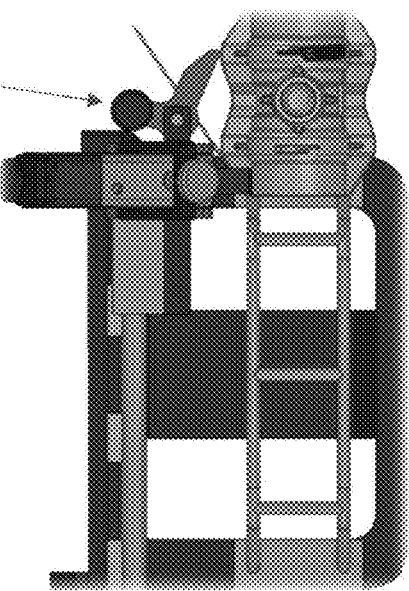
FIG. 44C
FIG. 44B
FIG. 44C

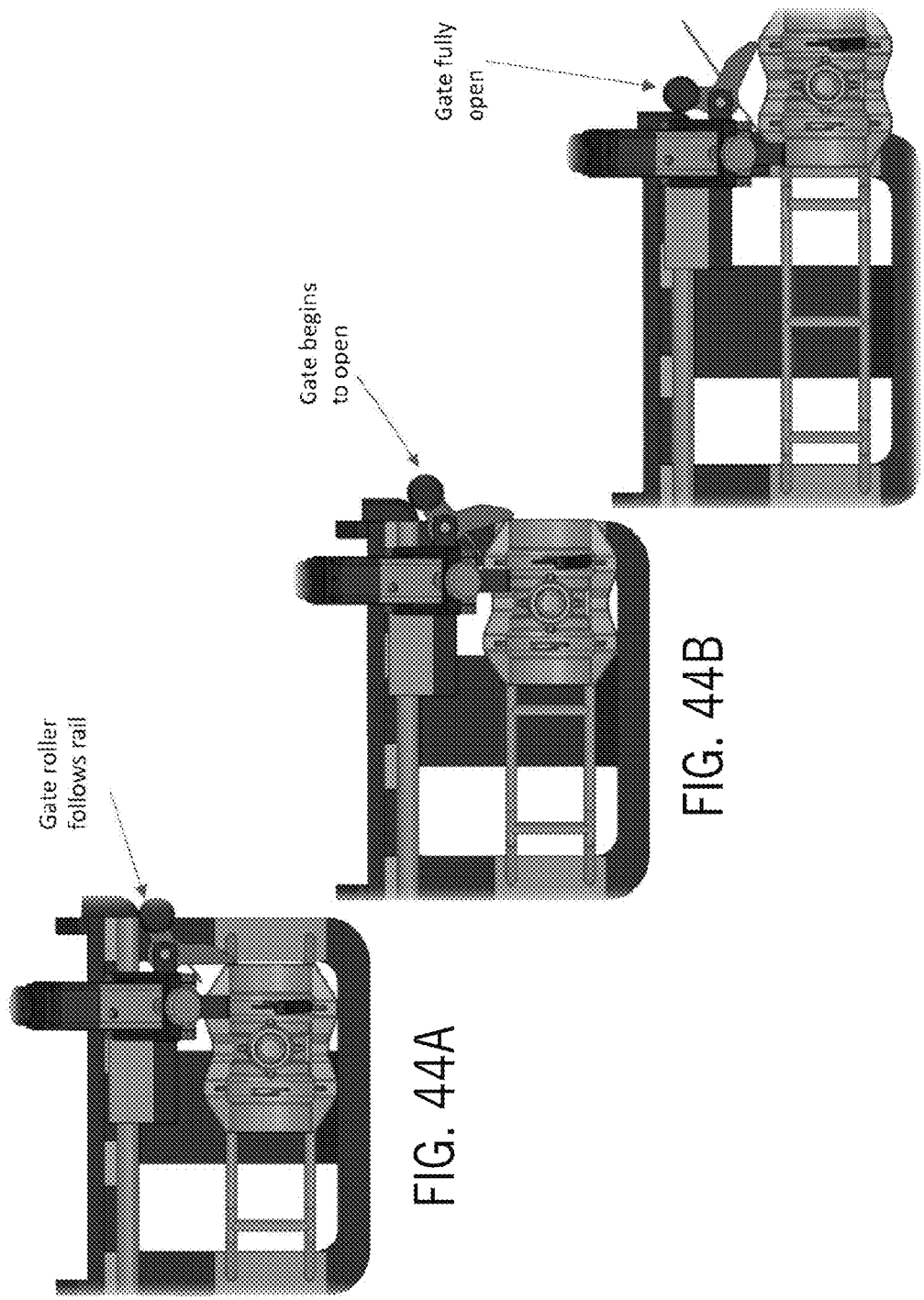

Shield prevents operator from reaching into machine during operation. Emergency stop activated and controls locked out when guard is folded down to access actuator for cleaning

PIPE RETRIEVAL APPARATUS, SYSTEM, AND METHOD

RELATED APPLICATION DATA

This patent is entitled to the benefit of and claims priority to U.S. provisional application Ser. No. 63/038,676 filed Jun. 12, 2020 and entitled "Pipe Retrieval Apparatus, System, and Method" and is a continuation-in-part of co-pending U.S. application Ser. No. 16/554,554 filed Aug. 28, 2019 and entitled "Pipe Retriever Apparatus, System, and Method," which claimed the benefit of and priority to U.S. provisional application Ser. No. 62/723,917 filed Aug. 28, 2018 and entitled "System, Method and Apparatus for Pipe Retrieval Machine." The entire contents of these prior filed application are hereby incorporated herein by reference.

BACKGROUND

1. Field of the Disclosure

The present disclosure is generally directed to pipe retrieval and disassembly, and more particularly to a machine or apparatus, a system, and a method for retrieving assembled pipe and disassembling same.

2. Description of Related Art

Conventional agricultural irrigation equipment typically includes an assembled and extensive system of pipes, fittings (including couplings and tees), sprinkler risers, and sprinkler heads. Examples of such an irrigation system are the Certa-Set™ and Certa-Lok™ agricultural irrigation systems manufactured and sold by the assignee of the present patent. See, for example, https://www.northamericanpipe.com/Certa-SetPipe. These types of irrigation systems are typically formed, in part, of assembled lateral pipes connected to a main line that is coupled to a water source. The lateral pipes include many separate and discrete pipe sections. The pipe sections are manually assembled by farm laborers to form the lengthy lateral pipes. The assembled lateral pipes are manually assembled and laid in place in the field or, in some instances, may be deployed using a conventional tractor to pull the lateral pipes into the field as the pipe sections are assembled. The tractor may be used to pull one assembled lateral pipe of the irrigation system into a single furrow of an agricultural field that is disposed between rows of crops.

After a crop is harvested, the components of the assembled irrigation system, or at least the lengthy lateral pipes, are routinely broken down by hand, loaded onto trucks or trailers, and removed from the field. The disassembled pipe sections and components may then be relocated from one field to another or stored for the next harvest season. The irrigation pipe system is typically broken down manually by farm laborers and loaded manually onto the trucks or trailers. This is a very tedious, labor intensive, and time-consuming process.

At least one attempt has been made to aid in automating the process of retrieving the lengthy assembled lateral pipes from the field. Ag Industrial Manufacturing, Inc. (A.I.M.) has produced a machine (the A.I.M. machine) that utilizes rotational elements to withdraw or pull the assembled lengths of lateral pipe from the field. A few farm laborers are then required to manually disassemble the lateral pipe into its discrete pipe sections at the A.I.M. machine. The A.I.M. machine is movable by a tractor to different locations on a farm, as needed. The A.I.M. machine is disclosed and described in U.S. Pat. No. 7,765,685. Manual labor is required to separate the pipe sections at the pipe couplings while using the A.I.M. machine. However, the machine automatically and controllably withdraws the assembled pipe from the field, which reduces the time needed for disassembly and removal of the pipe system from the field.

Other limitations of the irrigation system impact the feasibility of the existing A.I.M. machine. For example, the irrigation system typically includes risers disposed along the assembled length of the lateral pipe between the pipe sections. The risers are disposed at each of the fittings or couplings connection two lateral pipe sections and include a sprinkler head at the top of each of the risers. These parts of the irrigation system may should maintain their general vertical orientation to avoid inhibiting the function of the A.I.M. machine and avoid becoming damaged as the lateral pipe is retrieved and disassembled. In addition, the length of a single lateral span, i.e., a lateral pipe section of an entire assembled lateral pipe can be about 20 to 40 feet long. An assembled lateral section of a typical irrigation system can have an overall length of thousands of feet. These physical characteristics of the irrigation system can further inhibit the function of such a retrieval machine.

SUMMARY

In one example, according to the teachings of the present invention, a pipe retrieval machine includes: a frame defining a decoupling region and a travel axis; a transporting mechanism supported on the frame and having a first gripping structure adjacent an infeed end of the machine and a second gripping structure adjacent an outfeed end of the machine, the decoupling region disposed between the first and second gripping structures; a drive system configured to move the first and second gripping structures at a steady state speed to direct a pipe along the travel axis; and one or more safety features configured to stop the drive system either automatically or through manual action.

In one example, the pipe retrieval machine can also include a decoupling device in the decoupling region and having a decoupler. The decoupler can be automatically operable to engage a locking part of the pipe joint. The decoupling device can be configured to selectively and automatically slow the pipe relative to the steady state speed.

In one example, the pipe retrieval machine can be configured, by selectively and independently reducing the first and second gripping structures to respective first and second speeds that are less than the steady state speed, to detach at least one pipe section from the pipe, to move the detached pipe section from the machine, and to advance the remaining pipe for disassembly.

In one example, the one or more safety features can include one or more emergency stops configured, if actuated, to stop the drive system.

In one example, the pipe retrieval machine can include a user interface or control panel configured to receive inputs from a user and provide outputs to the user and can include a control system operable to control the drive system to move the transporting mechanism. The control system can be accessible via the user interface or control panel.

In one example, each of the one or more emergency stops can be an emergency stop button that is actuatable by manually pressing the button and releasable or resettable by manually twisting the button.

In one example, the one or more safety features can include one or more emergency stops configured, if actuated, to stop the drive system. The one or more emergency stops can include a plurality of emergency stops disposed spaced apart about the pipe retrieval machine.

In one example, an emergency stop can be is disposed at each of four corners of the pipe retrieval machine and on the user interface or control panel. Each of the emergency stops can be an emergency stop button that is actuatable by manually pressing the button and releasable or resettable by manually twisting the button.

In one example, the pipe retrieval machine can include a user interface or control panel configured to receive inputs from a user and provide outputs to the user and can include a control system operable to control the drive system to move the transporting mechanism. The control system can be accessible via the user interface or control panel. The one or more safety features can also include an emergency stop button on the user interface or control panel that is actuatable by manually pressing the button and releasable or resettable by manually twisting the button.

In one example, the one or more safety features can include an emergency stop disposed at each of four corners of the pipe retrieval machine and on a user interface or a control panel. Each of the emergency stops can be an emergency stop button that is actuatable by manually pressing the button and releasable or resettable by manually twisting the button.

In one example, the one or more safety features includes a light curtain configured to sense a foreign object within the machine, such as within the decoupling region, and to automatically stop the drive system.

In one example, the one or more safety features can include a platform associated with a user interface or a control panel. The platform, in a lowered position, can permit the pipe retrieval machine to start and run. The platform, in a raised position, can prevent the pipe retrieval machine from starting or running.

In one example, the one or more safety features includes a shield associated with a user interface or a control panel. The shield, in a lowered position, can prevent the pipe retrieval machine from starting or running and/or prevent access to the user interface or control panel. The shield, in a raised position, can permit the pipe retrieval machine to start and run and/or permits access to the user interface or control panel.

In one example, the one or more safety features can include that user inputs and user outputs of a user interface or a control panel are arranged ergonomically according to a hierarchy of use.

In one example the one or more safety features can include that user inputs and user outputs of a user interface or a control panel include a plurality of knobs, switches, and/or actuation devices. One or more of the plurality of knobs, switches, and/or actuation devices can be configured to actuate a respective part of the machine and to move in a direction that corresponds to the movement of the respective part of the machine, such as left/right or up/down.

In one example, according to the teachings of the present disclosure, a pipe retrieval machine includes: a frame defining a decoupling region and a travel axis; a transporting mechanism supported on the frame and having a first gripping structure adjacent an infeed end of the machine and a second gripping structure adjacent an outfeed end of the machine, the decoupling region disposed between the first and second gripping structures; a drive system configured to move the first and second gripping structures at a steady state speed to direct a pipe along the travel axis; and one or more safety features configured to inhibit or prevent damage to components of the decoupling region in the event of a malfunction.

In one example, the pipe retrieval machine can include a decoupling device in the decoupling region and having a decoupler. The decoupler can be automatically operable to engage a locking part of a pipe joint and the decoupling device can be configured to selectively and automatically slow the pipe relative to the steady state speed.

In one example, the pipe retrieval machine can be configured, by selectively and independently reducing the first and second gripping structures to respective first and second speeds that are each less than the steady state speed, to compress a pipe joint, to detach at least one pipe section from the pipe at the pipe joint, to move the detached pipe section from the machine, and to advance the remaining pipe for disassembly.

In one example, the pipe retrieval machine can include one or more additional safety features configured to stop the drive system either automatically or through manual action.

In one example, the pipe retrieval machine can include a decoupling device that includes a breakaway mount to the pipe retrieval machine. The breakaway mount can be configured to release the decoupling device to allow the decoupling device to move out of the way if a riser on a joint of a pipe passing through the pipe retrieval machine hits a part of the decoupling device.

In one example, the pipe retrieval machine can include a decoupling device that includes an actuator with an actuator cylinder. The actuator can include an overstroke spring to prevent damage to a pipe coupling, a decoupler of the actuator, or both, in the case of a failed spline release.

In one example, the pipe retrieval machine can include a decoupling device that includes a gate that is pivotable in one direction to selectively release a separated pipe and pipe coupling passing through the decoupling region. The gate can be configured to pivot in the opposite direction if hit by a pipe coupling and pipe that is reversed in direction through the decoupling region.

In other examples, according to the teachings of the present disclosure, methods of operating a pipe retrieval machine may be derived according to any of the disclosed embodiments and including any one of the operation procedures, method steps, emergency features, and/or functions as disclosed and described herein, or in any combination of two or more of any of the operation procedures, method steps, safety features, and/or functions as disclosed herein.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present invention will become apparent upon reading the following description in conjunction with the drawing figures, in which:

FIG. 30 shows a perspective view of one example of a pipe retrieval machine according to the teachings of the present disclosure.

FIG. 31 shows a perspective view of one example of a control panel according to the teachings of the present disclosure for operating a pipe retrieval machine.

FIGS. 44A-44C and 45 show top and side views of one example of the gate of the decoupling region of FIG. 34 and with the gate progressively moved.

The use of the same reference numbers or characters throughout the description and drawings indicates similar or identical components, aspects, and features of the disclosure.

DETAILED DESCRIPTION OF THE DISCLOSURE

This application incorporates herein by reference, as noted above, the entire subject matter of co-pending U.S. application Ser. No. 16/554,554 filed Aug. 28, 2019. This incorporation by reference also specifically incorporates the claims of the '554 application. This application also incorporates herein by reference, as noted above, the entire subject matter of U.S. provisional application Ser. Nos. 63/038,676 filed Jun. 12, 2020 and 62/723,917 filed Aug. 28, 2018. The inventorship of this application includes the inventors of the above prior filed, fully incorporated, non-provisional application. The inventorship of any related non-provisional applications filed based on the above-noted provisional and non-provisional applications may change, subject to the ultimate claim scope of such non-provisional applications.

The disclosed pipe retrieval apparatuses, systems, and methods for withdrawing and disassembling pipe of an assembled irrigation system solve or improve upon one or more of the above mentioned and/or other problems and disadvantages of prior known pipe retrieval apparatuses, systems, and methods. The disclosed apparatuses can be deployed on site to automatically withdraw and at least partly disassemble portions of an assembled irrigation system while in the field. The disclosed apparatuses can thus be utilized to reduce the number of farm laborers that are currently needed to manually disassemble and remove or relocate the portion of the system piece by piece. In one example, the irrigation system portion is an assembled lateral pipe of the irrigation system. The disclosed systems and methods include use of an apparatus that can withdraw assembled pipe of the assembled irrigation system from a field to the apparatus. The disclosed systems and methods include use of an apparatus that can separate each pipe section from the assembled length of pipe. These and other objects, features, and advantages of the disclosed systems, methods, and apparatuses will become apparent to those having ordinary skill in the art upon reading this disclosure.

Figure 1:
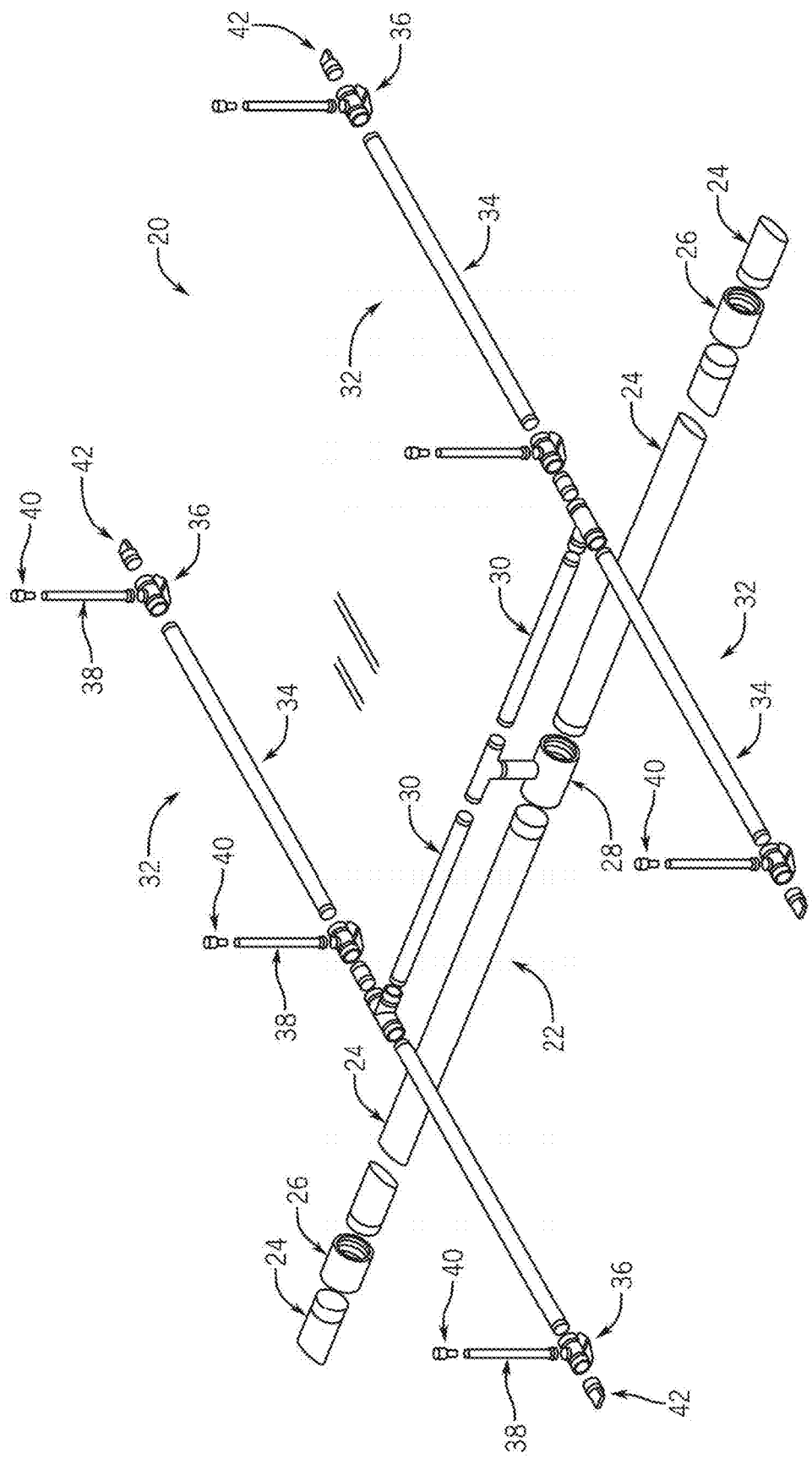
FIG. 1 shows a partly exploded view of the components of one example of an existing irrigation system for irrigating fields of a farm.

Turning now to the drawings, one example of an irrigation system 20 is depicted in simplified form in FIG. 1. In this example, the irrigation system 20 includes a main line or main pipe 22 that is typically connected to a water source. The main line 22 has a plurality of main pipe sections or segments 24 that are interconnected to one another at main pipe joints by various main connectors 26, fittings, and the like. The main line 22 also has one or more valves 28 provided strategically at least at some of the main pipe joints. The valves 28 are connected to distribution pipes 30 for distributing water to dispensing portions of the irrigation system 20. The main line 22 may be installed on a farm either above ground or below ground level and the installation may be either temporary or permanent. The valves 28 and distribution pipes 30 are typically disposed above ground level for ready access by the farm personnel.

The irrigation system 20 also typically has a plurality of lengthy lateral pipes 32 that are connected to or teed off from the distribution pipes 30. The lateral pipes 32 are typically formed of a series of lateral pipe sections 34 that are connected to one another by couplings 36 at the lateral pipe joints. The couplings 36 of the lateral pipes 32 each include a vertical pipe or riser 38 extending upward from the coupling. Each riser 38 includes a sprinkler or sprinkler head 40 at or near a top of the riser. The free end of the distal most pipe section 34 of a full assembled lateral pipe 32 is typically closed off by an end cap 42. Water is distributed from the main line 22 through the valves 26 to the distribution pipes 30. The distribution pipes 30 deliver the water to the lateral pipes 32. The water is then delivered along the lateral pipes 32 to the sprinkler heads 40 via the risers 38 and couplings 36 and dispersed to the field. The valves 28 can be operated manually or automatically, such as wirelessly, to be opened or closed to selectively deliver water to desired ones of the lateral pipes 32 during use.

Though shown with only one lateral pipe section 34 in FIG. 1, each assembled lateral pipe 32 can be formed of dozens or a hundred or more discrete pipe sections 34. During use and when deployed in a field, the lateral pipes 32 are generally linear and extend to hundreds or thousands of feet in length. However, the lateral pipes 32 may not be entirely straight when deployed in a field and may instead follow any slight or gradual, gentle curves that may be imparted by the terrain of the field to the crop rows and furrows. In one example, the irrigation system 20 may include multiple lateral pipes 32 deployed in the field in a generally linear and parallel arrangement. As is known in the art, the assembled irrigation system 20 may be positioned in a field, with or without furrows between crop rows. In an example, the lateral pipes 32 of the assembled irrigation system 20 can extend in a furrow direction and can be configured to irrigate surrounding rows of crops of the farm. The crops do not have to be growing for the disclosed examples or embodiments to be of use, since seeds are often irrigated before germination.

In the disclosed example, the pipes and pipe sections and segments of the irrigation system, as well as the various connectors, fittings, and couplings, or parts thereof, can be resin based, i.e., formed of plastic. Thus, these components can be capable of bending, within limits, allowing for the components to be pulled or withdrawn from a field as described herein without having to partially or completely disassemble the various portions of the irrigation system until each pipe section of the assembled pipe reaches the apparatus.

The term "assembled", as used herein for the irrigation system 20, can be defined as substantially fully assembled and ready to irrigate a farm, whether pressurized with water or not. The term "assembled", as used herein for the lateral pipes 32, can be defined as substantially fully assembled from the end cap 42 at the free capped end to the end adjacent to the distribution pipe 30, whether connected to the distribution pipe or not. However, when a lateral pipe 32 is to be withdrawn from the field for disassembly, the lateral pipe should be disconnected from the distribution pipe 30 at the current location and then withdrawn and disassembled. The lateral pipe 32 can then be reassembled and reconnected to the same part of the irrigation system during a next growing season or can be reconnected to another part of the irrigation system 20 or a different system altogether, in a new field.

In some instances, the assembled pipes may not have a separate coupling. Instead, each of the pipe sections may have a bell portion at one end for receiving the other end of another pipe section therein. The connection is referred to herein as a pipe joint or joint, instead of a coupling. The joint is secured using a flexible locking part, such as a ring that seats in internal grooves of the two pipe sections. The couplings noted above can be secured using the identical type of locking part or ring, as is known in the art. A riser may be utilized on such pipe joints where no separate coupling is deployed. The riser can be connected to the bell portion of each of the pipe sections.

Figure 2:
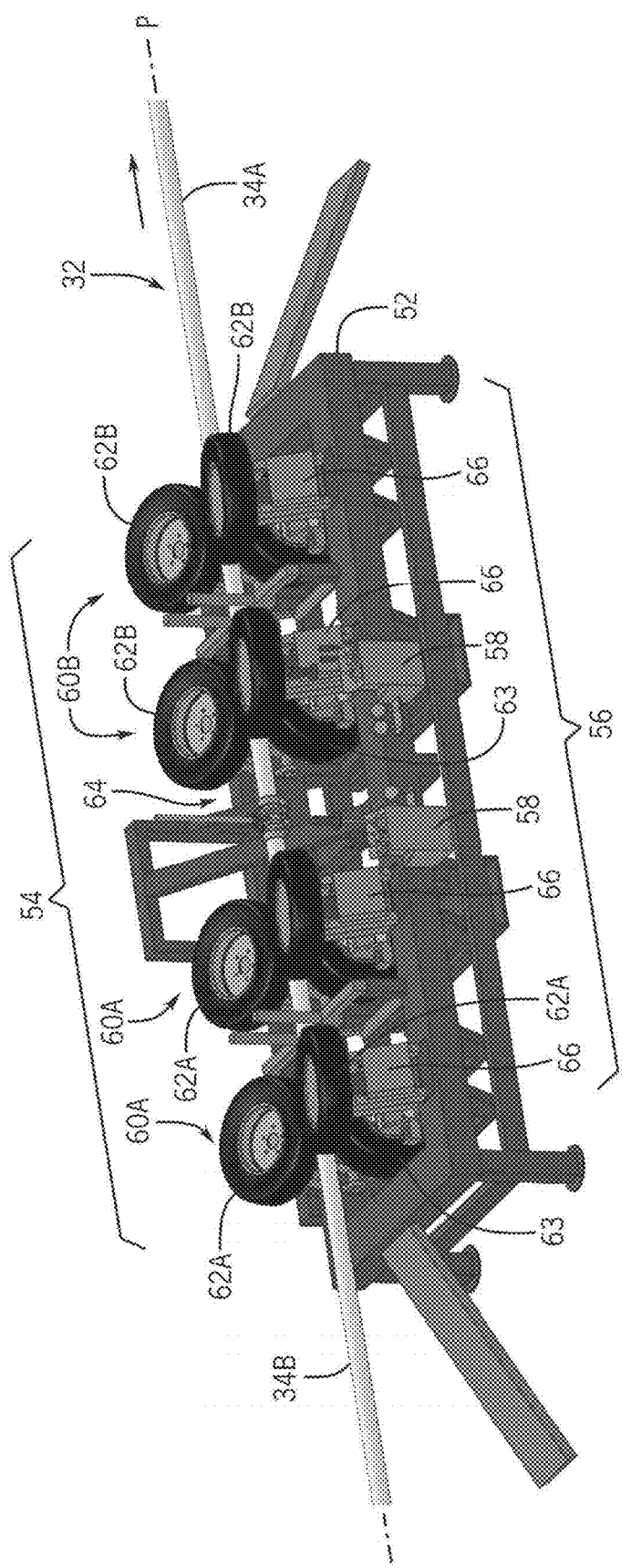
FIG. 2 shows a perspective view of a prior art pipe retrieval machine.
Figure 3:
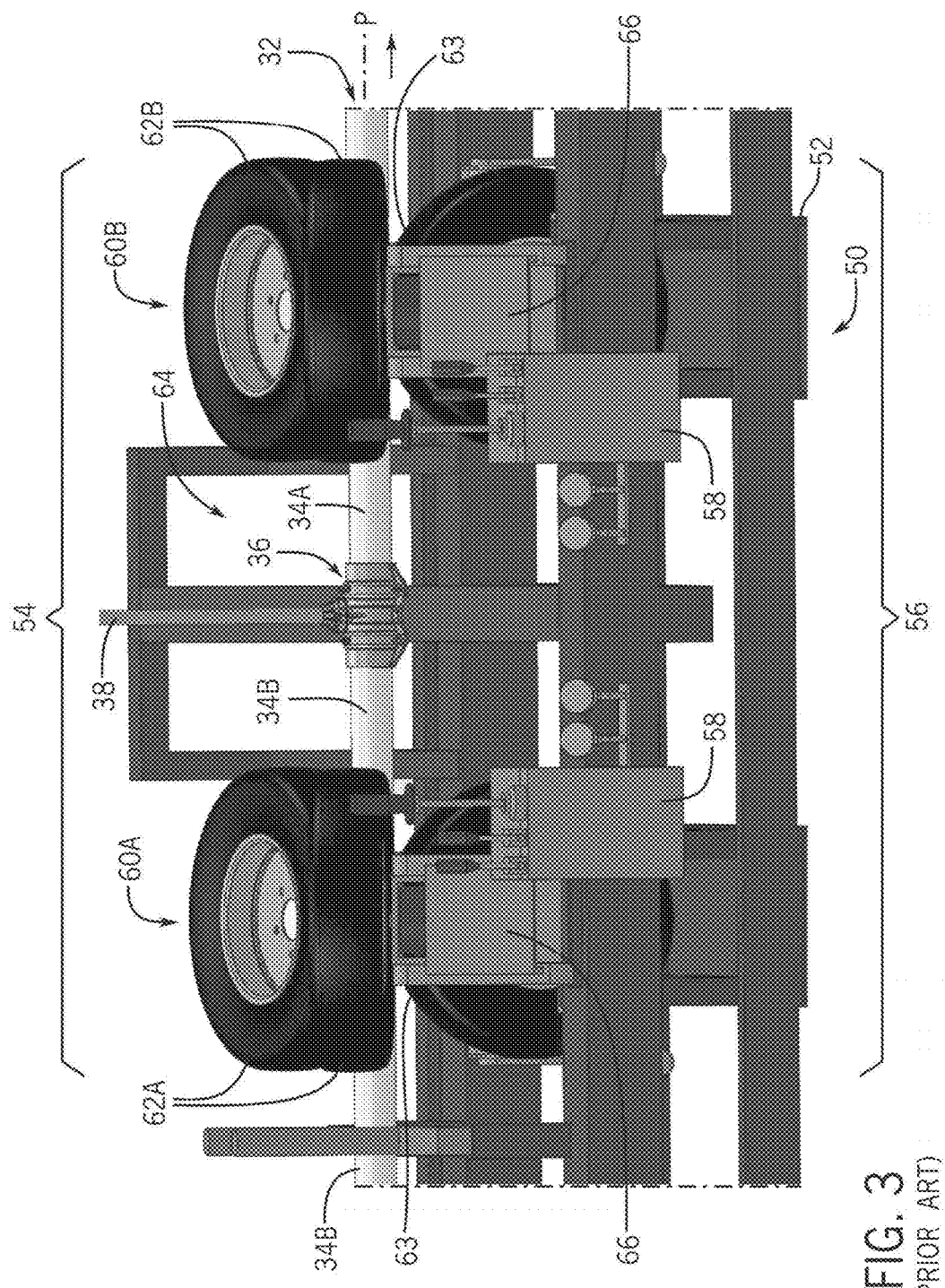
FIG. 3 shows a side perspective view of a decoupling region of the pipe retrieval machine of FIG. 2.
Figure 4:
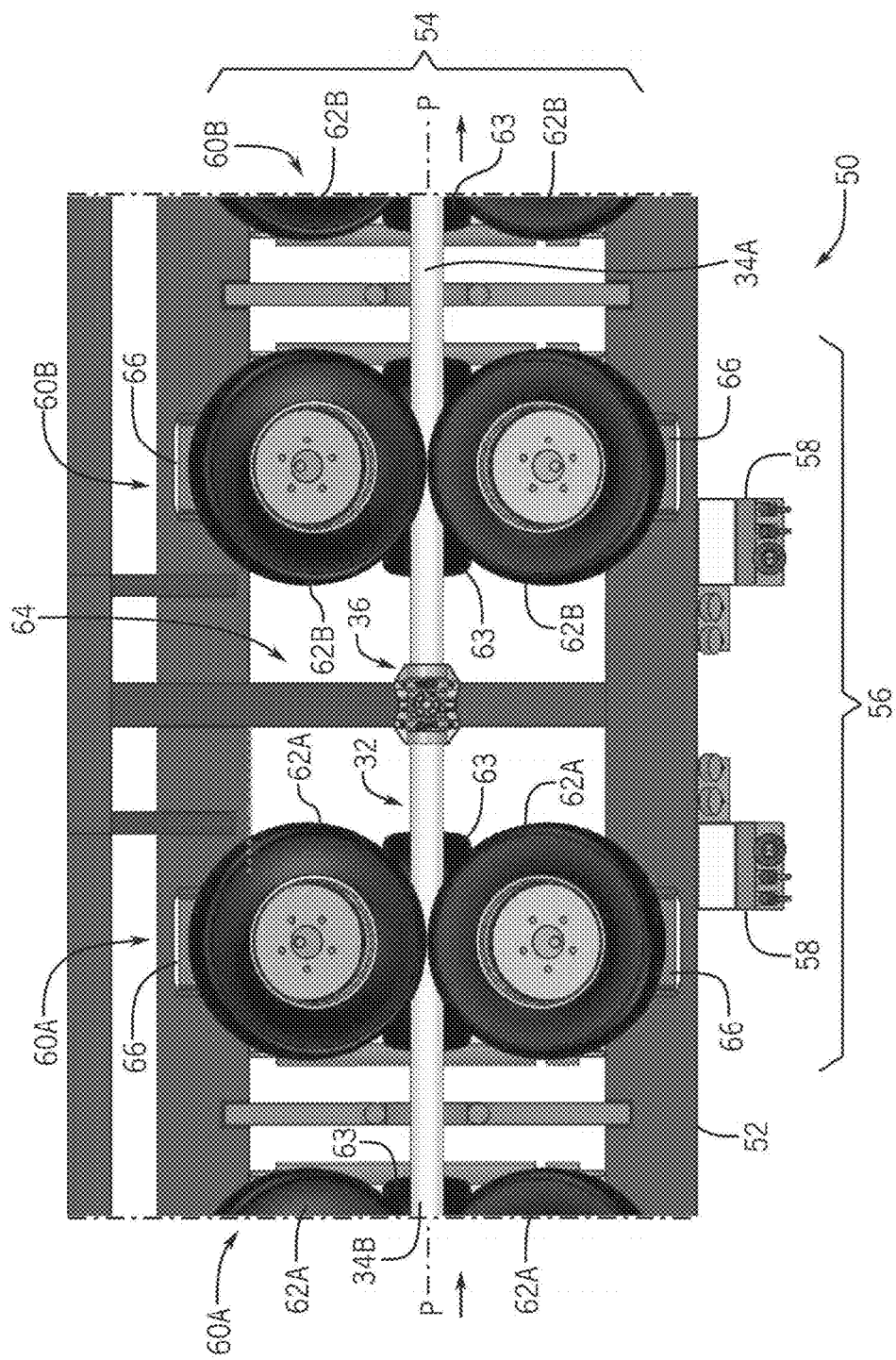
FIG. 4 shows a top view of a decoupling region of the pipe retrieval machine of FIG. 2.

FIGS. 2-4 illustrate several views of an existing A.I.M. machine 50. The machine 50 generally has a support structure or frame 52 that carries a transporting mechanism 54 for moving pipe through the machine. The machine 50 also generally has a drive system 56 that operates or drives the transporting mechanism 54. The machine 50 also generally has a user interface or a control panel 58 that is used to operate the drive system 56.

The transporting mechanism 54 has two or more gripping structures for gripping and moving a pipe. For example, the transporting mechanism 54 has two sets, i.e., first and second sets 60A and 60B of opposed upper wheels 62A and 62B, and each set includes two pairs of the opposed wheels 62A and 62B, respectively. Each of the first and second sets 60A and 60B of the transporting mechanism 54 also includes two support wheels 63A and 63B, respectively, positioned below the corresponding upper wheels 62A and 62B. Thus, each set 60A and 60B has two groups of wheels, and each group includes two of the opposed upper wheels 62A or 62B and one of the support wheels 63A or 63B, respectively. The upper wheels 62A and 62B can be tilted slightly downward relative to one another toward the middle of the machine 50 so that the force applied by the two upper wheels has a downward component or vector. Thus, the three wheels 62A and 63A or 62B and 63B in each group create a pressure zone that captures and grips the lateral pipe 32 between the wheels of each group and inhibits the pipe from popping up above the upper wheels during operation.

A decoupling region 64 is disposed between the two sets 60A and 60B of wheels of the transporting mechanism 54. The drive system 56 includes a plurality of motors 66 coupled to the wheels 62A, 62B, 63A, and 63B for driving rotation of the wheels. Each wheel can have its own dedicated motor 66. The machine 50 also has two of the control panels 58, one for operating each of the two sets 60A and 60B of the opposed wheels 62A, 62B and 63A, 63B independently. Each control panel 58 can include one or more levers, switches, buttons, and/or the like. Each control panel 58 is used to run, speed up, slow down, or stop rotation of the wheels of the corresponding set 60A or 60B.

During operation of the machine 50, one of the two sets 60A or 60B of wheels is operated to define an inlet or intake side of the transporting mechanism 54 and the other of the two sets is an outlet or ejection side of the transporting mechanism. In this example, the wheels 62A and 63A of the first set 60A define the intake side and the wheels 62B and 63B of the second set 60B define the ejection side. The wheels 62A and 63A of the first set 60A and the wheels 62B and 63B of the second set 60B are operated so that the wheels rotate in a direction to pull a lateral pipe 32 into the machine 50 in the direction of the arrow P in FIG. 1. The transporting mechanism 54 is controlled using the control panels 58 to pull the lateral pipe 32 into the machine 50 and then to stop the lateral pipe each time a joint, i.e., a coupling 36 (as used in this and the other disclosed examples herein) is positioned in the decoupling region 64. A laborer then typically removes the locking part (not shown) from the leading end of the coupling 36 to release the leading pipe section 34A from the coupling. The second set 60B of the wheels 62B and 63B are then operated to pull the leading pipe section 34A in the direction P, separating the pipe section from the coupling 36. The separated pipe section 34A is then ejected from the machine by the second set 60B of the wheels 62 and is typically manually loaded onto a truck or trailer by the farm laborers.

If desired, the farm laborer can also remove the locking part (not shown) from the trailing end of the coupling 36 that is still in the decoupling region 64 and attached to a trailing pipe section 34B of the lateral pipe 32. The laborer can then manually detach the coupling 36 and drop the coupling into a container below the decoupling region 64 or to the side of the machine 50. The first and second sets 60A and 60B of wheels are then operated to pull the lateral pipe 32 further into the machine 50 until a next sequential coupling 36 is positioned in the decoupling region 64. The process is repeated until an entire lateral pipe 32 is disassembled.

Figure 5:
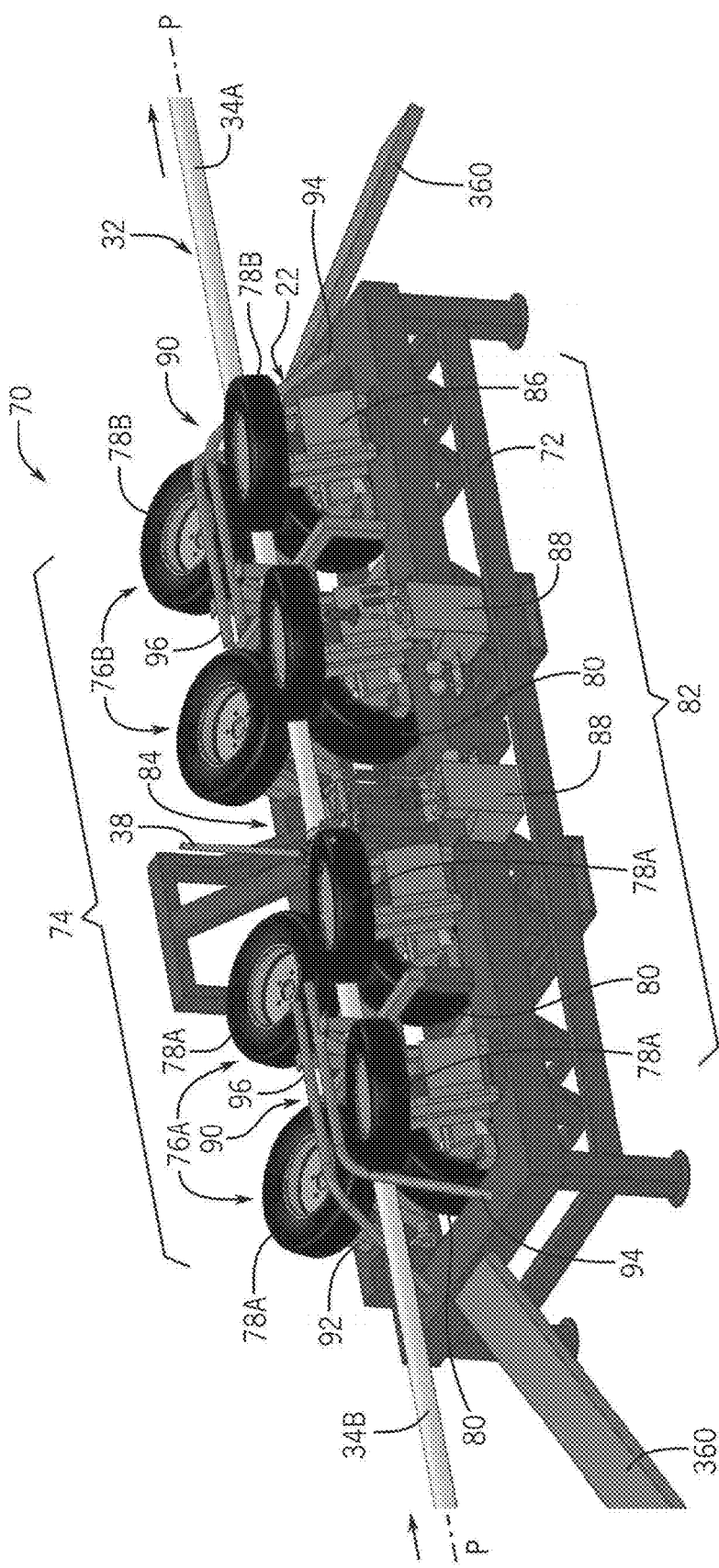
FIG. 5 shows a perspective view of one example of a pipe retrieval machine according to the teachings of the present disclosure.

The disclosed pipe retrieval apparatuses, systems, and methods are provided to automate and improve aspects of the existing machine 50. FIG. 5 illustrates one example of a pipe retrieval machine 70 constructed in accordance with the teachings of the present disclosure. In this example, the machine 70 includes a frame 72 that carries a transporting mechanism 74. The transporting mechanism 74 has first and second gripping structures, again in the form of first and second sets 76A and 76B of opposed upper wheel pairs 78A and 78B and support wheels 80A and 80B. In this example, the wheels are arranged in the same manner as that described above for the existing machine 50. The three wheels 78A and 80A or 78B and 80B in each group again create a pressure zone that captures and grips a lateral pipe 32 between the wheels of each group and inhibits the pipe from popping up above the upper wheels during operation. Each gripping structure may only have one set of the wheels instead of two sets, as in this example. Each gripping structure may instead have three or more sets of wheels as well.

The machine 70 also has a drive system 82 coupled to the transporting mechanism 74 to operate the two sets 76A and 76B of wheels. A decoupling region 84 is again disposed between the two sets 76A and 76B of the wheels of the transporting mechanism 54. The drive system 82 includes a plurality of motors 86 coupled to the wheels 76A, 76B, 80A, and 80B for driving rotation of the wheels. Each wheel can have its own dedicated motor 86 or, alternatively, a transmission (not shown) may be used to connect and drive any two or more of the wheels in each set 76A or 76B by a common motor. However, the first set 76A of wheels and the second set 76B of wheels are independent of one another.

The machine 70 also has two control panels 88 in this example, one for operating each of the two sets 76A and 76B of the opposed wheels 78A, 78B and 80A, 80B independently. Each control panel 88 can include one or more levers, switches, buttons, and/or the like. Each control panel 88 may be used to run, speed up, slow down, or stop rotation of the wheels of the corresponding set 76A or 76B.

In this example, the machine 70 includes several improvements over the existing machine 50. As shown in FIG. 5, the machine 70 can include guide rails 90 positioned at each end of the frame 72. The machine 70 can be operated in either direction so that either set 76A or 76B of wheels can define the intake side or the ejection side of the machine during use. The guide rails 90 can thus be positioned on the frame 72 to provide a guide function upstream of the first group of wheels at the inlet or intake side of the machine 70. The guide rails 90 function to properly orient the couplings 36 of the lateral pipe 32 as the pipe is pulled into the machine 70.

More specifically, during use, the couplings 36 may twist or rotate out of a vertical orientation during use of the irrigation system 20 or at least when the lateral pipe 32 is being retrieved. If a coupling 36 is twisted or rotated from vertical, then the riser 38 extending from the coupling 36 is also rotated from vertical. When the lateral pipe 32 is being retrieved, a riser 38 that is tilted out of vertical may cause the machine 70 to fail or to break the riser. The guide rails 90 are intended to prevent or inhibit these problems and to reorient the coupling 36, and thus the riser 38, prior to encountering the first group of three wheels at the inlet or intake side of the machine.

As shown in FIG. 5, each of the guide rails 90 in one example has a pair of spaced apart rail parts 92. Each rail part 92 has a generally upstanding rail section 94 and a generally horizontal rail section 96 connected to one another. The lower ends of the upstanding rail sections 94 are mounted to a portion of the frame 72 in this example. The upstanding rail sections 94 are tilted toward one another from their respective lower ends to their upper ends. Thus, the lower ends of the upstanding rail sections 94 are spaced relatively far apart from one another and the upper ends of the upstanding rail sections are spaced closer together than the lower ends. The upstanding rail sections 94 also are tilted at an angle toward the transporting mechanism 74 from the lower ends to the upper ends. The horizontal rail sections 96 extend from the upper ends of the respective upstanding rail sections 94 toward the decoupling region 84 of the machine 70. The horizontal rail sections 96 of each guide rail 90 in this example, maintain a consistent gap or spacing. The horizontal rail sections 96 in this example also terminate short of the decoupling region 84 and are supported by portions of the frame 72.

During use, as a lateral pipe 32 is retrieved, a coupling 36 may be tilted or rotated such that the riser 38 extending up from the coupling is also tilted to one side or the other. The tilted riser 38 will contact one of the upstanding rail sections 94 as the lateral pipe 32 and the coupling 36 are pulled into the machine 70. The forward tilt of the contacted upstanding rail section 94 will alleviate abrupt and hard contact with the riser. The inward tilt will redirect the riser back toward the vertical orientation as the coupling 36 and riser 38 move toward the decoupling region 84. The riser will be funneled between the two horizontal rail sections 96 to maintain the relative vertical orientation of the riser 38, and thus the coupling 36. This can be important to another of the disclosed improvements found in the machine 70, as discussed below.

Figure 6:
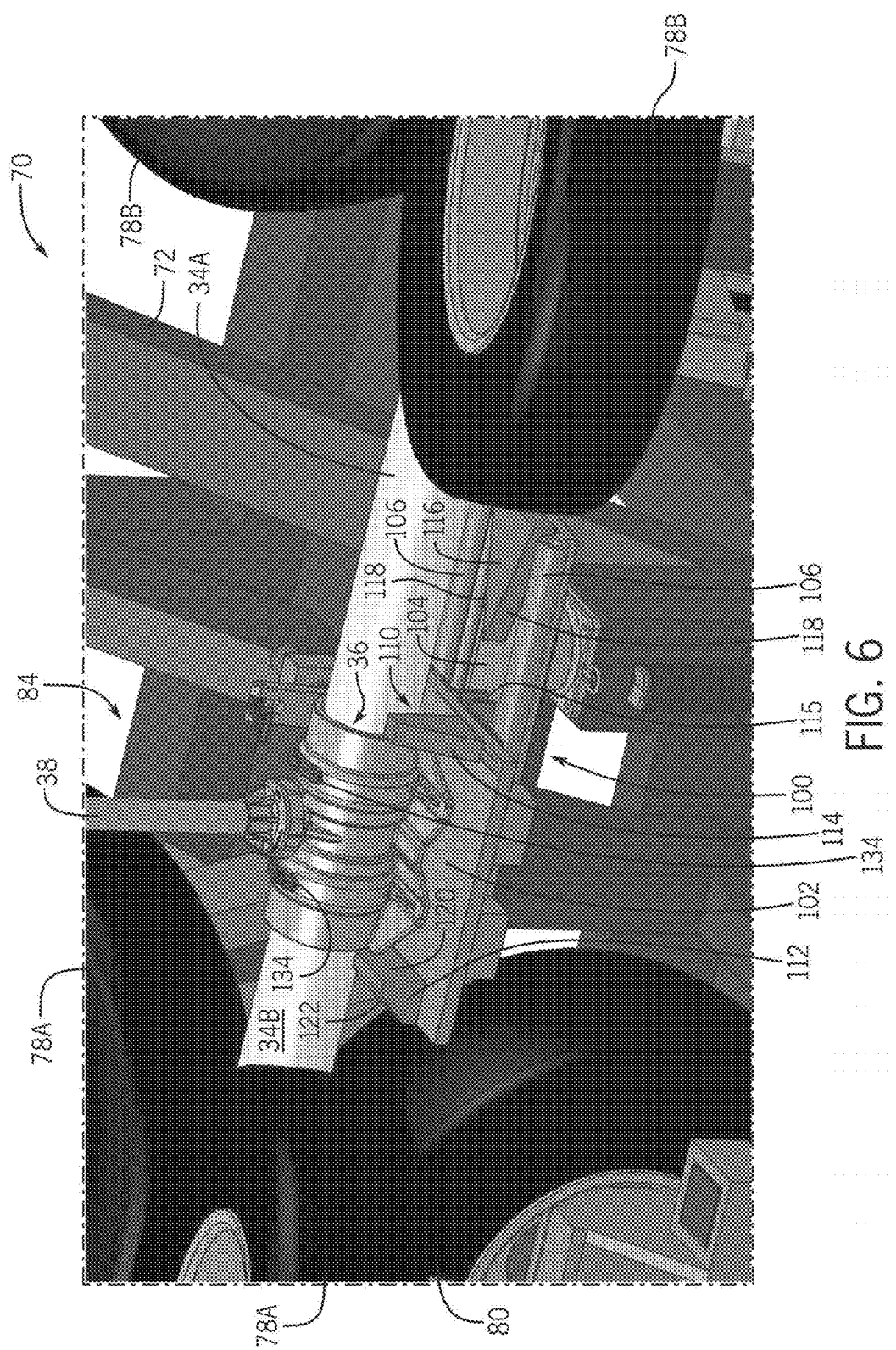
FIG. 6 shows an enlarged view of a decoupling region and device of the pipe retrieval machine of FIG. 5.

FIG. 6 shows the decoupling region 84 of the machine 70, which includes one example of an in line automated decoupling device 100 and system. In this example, the decoupling device 100 has a carriage 102 that can move back and forth along a lengthwise axis, i.e., the pipe axis of the machine 70 within the decoupling region 84. The carriage 102 can be slidably mounted on a fixed plate 104 or support that is secured within the decoupling region 84. The plate 104 can have one or more tracks 106, wires, grooves, or other type of linear guides that engage corresponding sliders 108, gliders, rollers, wheels, or other type of mating linear guide. In this example, the plate has two tracks 106 and the carriage has two corresponding sliders 108 that can slide along the tracks.

Figure 7A:
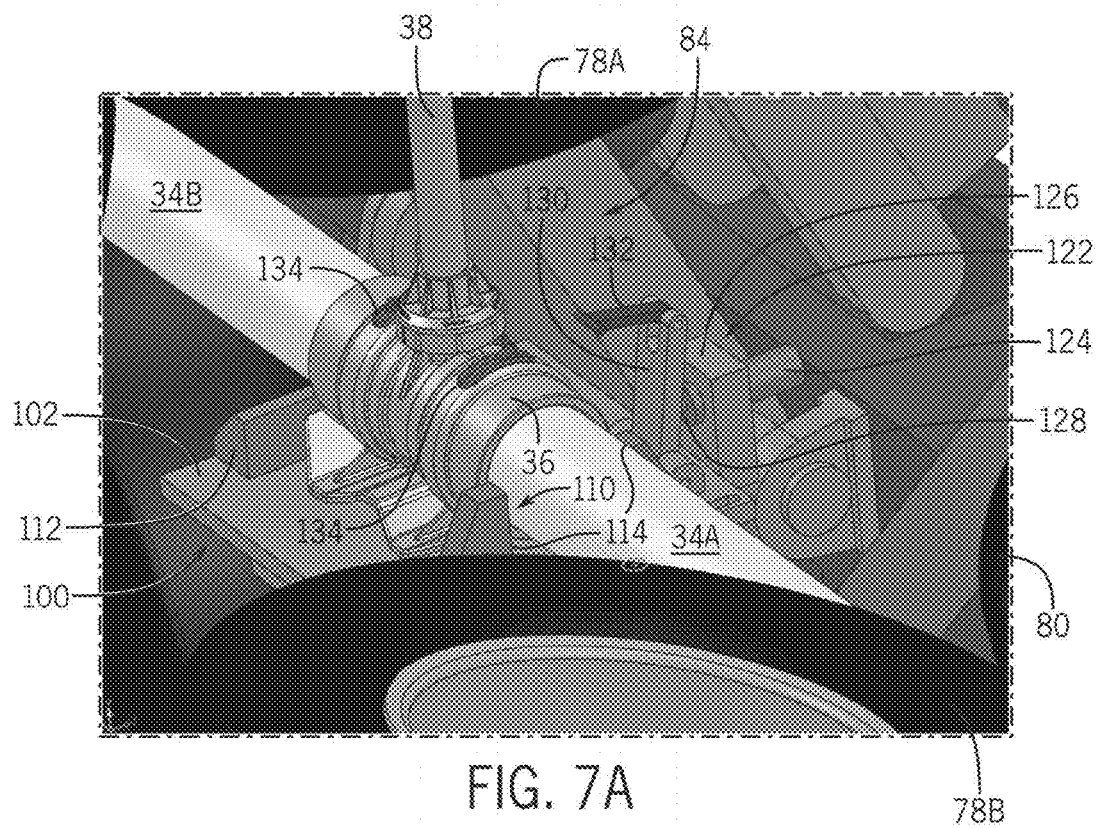
FIGS. 7A-7E show a progression of the decoupling device in the decoupling region of the pipe retrieval machine of FIG. 6.

Referring to FIGS. 6 and 7A, the trailing or downstream end of the carriage 102 can have a gate 110 or forward stop that projects up from a surface of the carriage. The gate 110 is configured and arranged to engage a leading end of a coupling 36 on the lateral pipe 32 as it passes through the decoupling region 84, as discussed below. The carriage 102 can also have a stop block 112 disposed at the upstream or leading end of the carriage. The stop block 112 is configured and arranged to engage a trailing end of the coupling 36 as it passes through the decoupling region 84, also as discussed below.

In one example, the gate 110 can include a pair of movable barriers 114 or stops slidably mounted on the carriage 102. The barriers 114 in this example can move toward and away from one another laterally or perpendicular to the axis of the machine 70. The barriers 114 can be biased by a spring (not shown) or other biasing element toward one another to a closed or stop position. In the stop position, a gap between the barriers 114 matches the width of a pipe section 34 but that is less than a width of the body of a coupling 36. The movable barriers 114 in this example include bosses 115 that protrude down through slots S in the carriage 102 toward the plate 104. In this example, the plate 104 includes a wedge 116 with an angled cam surface 118 on each side configured and arranged to contact the respective bosses 115 of the movable barriers, as discussed below.

In one example, the stop block 112 is fixed to the carriage 102 and can have a ramp 118 on the upstream or intake side and can have a vertical stop surface 120 on the downstream side. The ramp 118 is angled to allow the lateral pipe 32 and couplings 36 to ride up the ramp and over the stop block 112. Once the coupling 36 clears the stop block, the coupling will fall in front of the stop block and the trailing end of the coupling 36 will contact the stop surface 120. This prevents the coupling 36 from reversing direction opposite the arrow P and holds the coupling in place on the carriage 102.

In this example, as shown in FIGS. 6 and 7A, the carriage 102 also has an automated decoupler 122 offset to one side of the carriage 102 that can be actuated by movement of one or more parts of the decoupling device 100. The decoupler 122 includes a hydraulic actuator 124 mounted to a bracket 126 on the carriage 102. The hydraulic actuator 124 has a rod 128 arranged to extend toward the lateral pipe 32 in the decoupling region 84. The decoupler 122 also includes a lever 130 that protrudes up from the carriage 102. The free end of the actuator rod 128 contacts the lever 130, which is pivotable about its lower end. A lock actuator 132 extends from the upper free end of the lever 130 toward the lateral pipe location in the decoupling region 84. The lever 130 may be biased by a spring (not shown) such as a torsion spring or other biasing element toward the bracket 126 and actuator rod. The lock actuator 132 is in the form of a finer or arm and is pivotable relative to the lever 130. The lock actuator 132 may be biased a spring (not shown) to a first position that is angle upward relative to a horizontal reference. The lock actuator 132 may pivot upward from the first position to accommodate the shape of the lateral pipe 32 and coupling 36, as discussed below.

The hydraulic actuator 124 can be operable or actuated systematically in response to movements of the lateral pipe 32, parts of the decoupling device 100, or both, as discussed below. The rod 128, when actuated, pushes the lever 130 toward the lateral pipe 32 and coupling 36. The lock actuator 132 then contacts the coupling 36 and rides against a surface of the coupling. The lock actuator 132 can then pivot, as needed, relative to the lever 130 to stay in contact with the curved surface of the coupling 36 as the lever moves. The lock actuator 132 is angled upward relative to vertical so that it will rise after contacting the round or curved surface of the coupling 36, allowing the lever 130 to move toward the coupling.

FIGS. 7A-7F show the sequence of operation of the decoupling device 100 in his example. As shown in FIG. 7A, a lateral pipe 32 is in the process of being retrieved by and through the machine 70. The lateral pipe 32 is moved or pulled in the direction P by the transporting mechanism 74, which includes the inlet and outlet sides, i.e., the first and second sets 76A and 76B of wheels, of the machine 70. In this steady state of operation, the inlet and outlet sides of the transporting mechanism 74, i.e., the first and second sets 76A and 76B of the wheels, are synchronized to operate at the same speed. The steady state operating speed can be characterized as 100% speed, though the actual speed at 100% can vary according to the needs of a given machine and irrigation system. See Stage 1 in the speed chart of FIG. 7F, which represents this steady state condition.

Figure 7B:
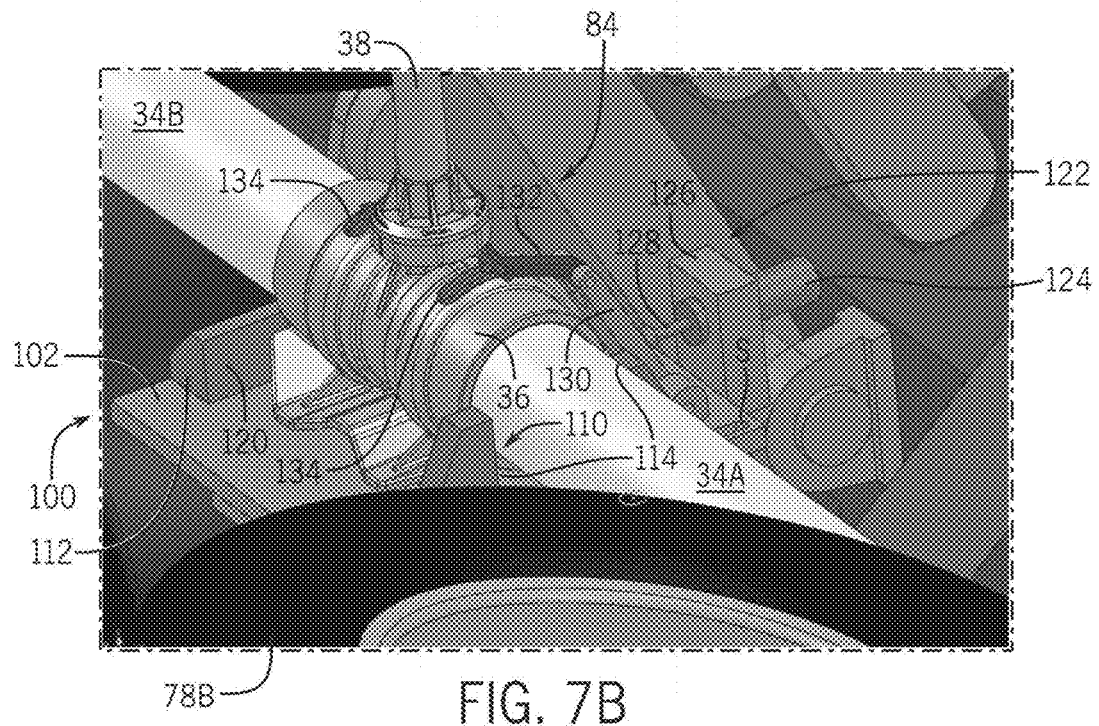

When a coupling 36 is aligned with the carriage 102, it is captured between the stop bock 112 and the gate 110. As shown in FIG. 7B, when the coupling 36 is captured, limit switches (not shown) or other such devices may be activated. See Stage 2 in the speed chart of FIG. 7F. This activation reduces the inlet or infeed speed of the first set 76A of wheels, i.e., the inlet side of the transporting mechanism 74, such as to about 25% of the steady state speed. See Stage 3 of the speed chart in FIG. 7F. At the same time, this activation also reduces the outlet or outfeed speed of the second set 76A of wheels, i.e., the ejection or outlet side of the transporting mechanism 74, to a stop or to a slower speed of about 10% of the steady state speed. The speed reduction can be imparted to the drive system 82 using electronic flow control valves (not shown) or other such devices. The slower speed of the transporting mechanism 74, i.e., the second set 76B of wheels, at the outlet side of the machine 70 imparts a momentary compression force between the leading pipe segment 34 and the coupling 36.

The momentary compression alleviates tension in the joint between the leading pipe section 34A and the leading end of the coupling 36. This alleviates pressure against a locking part 134 in the joint, allowing the locking part to be manipulated. At the same time, the hydraulic actuator 124 is actuated, driving the rod 128 toward the coupling 36. The rod 128 then pushes the lever 130 toward the coupling 36. The lock actuator 132 contacts the surface of the coupling 36, is aligned with a release tab (not shown) on the locking part 134, rides along the coupling surface, and contacts the release tab. As the lock actuator 132 pushes the release tab of the locking part 134, the locking part expands (not shown) within the coupling 36, which releases the leading pipe section 34A from the leading end of the coupling 36. See Stage 4 of the speed chart of FIG. 7F.

Figure 7C:
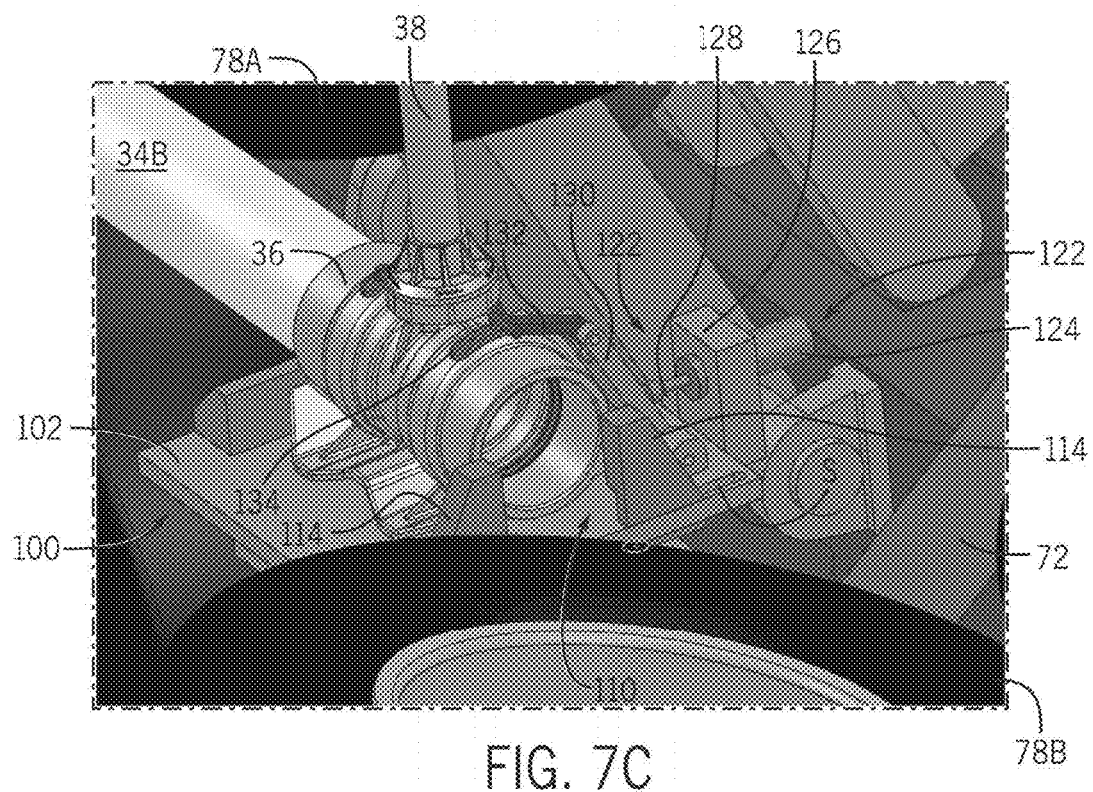

Once the leading pipe section 34A is released from the coupling 36 in this manner, the outfeed speed of the transporting mechanism 74 at the outlet side of the machine, i.e., the second set 76B of wheels, is increased back to 100%. This speed increase, as shown in FIG. 7C, causes the second set 76B of wheels to decouple and withdraw or pull the leading pipe section 34A from the coupling 36. See Stage 5 of the speed chart of FIG. 7F. The leading pipe section 34A is then ejected or fed out of the machine 70 by the second set 76B of wheels to a waiting truck or trailer.

Figure 7D:
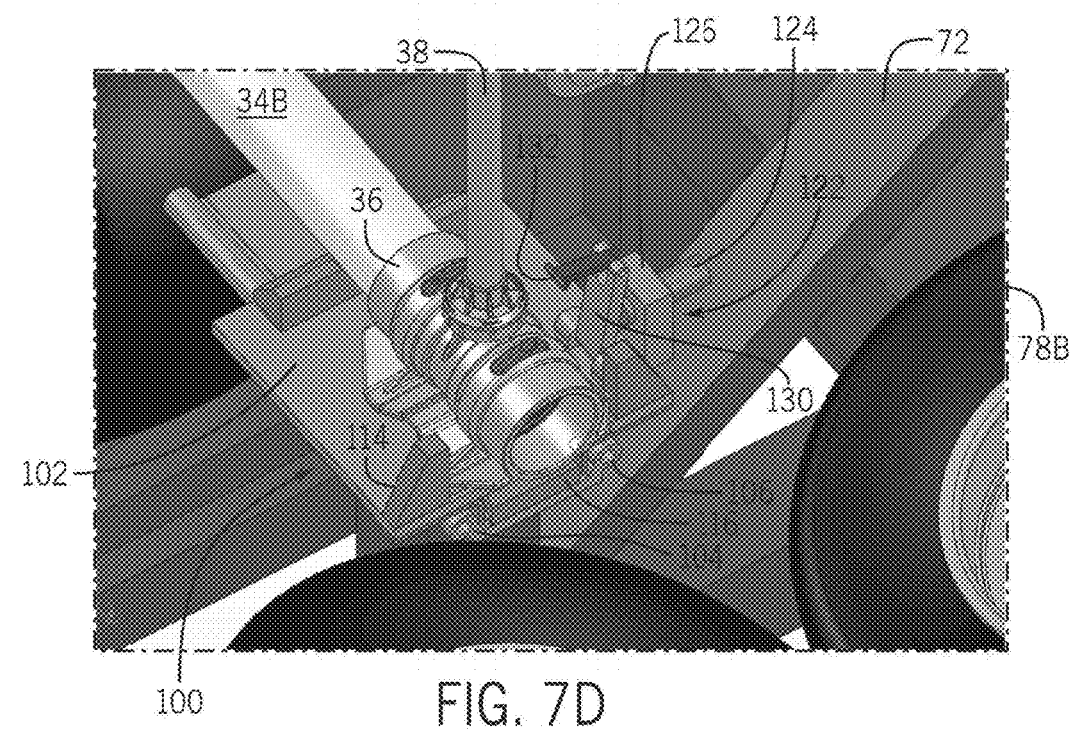
Figure 7E:
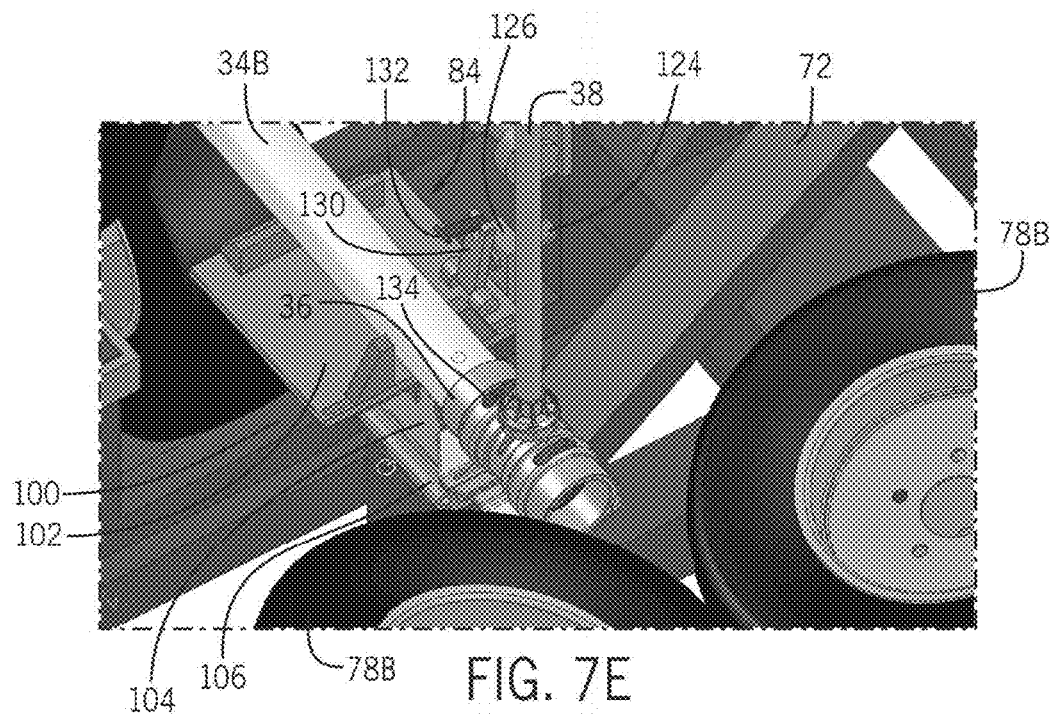
Figure 7F:
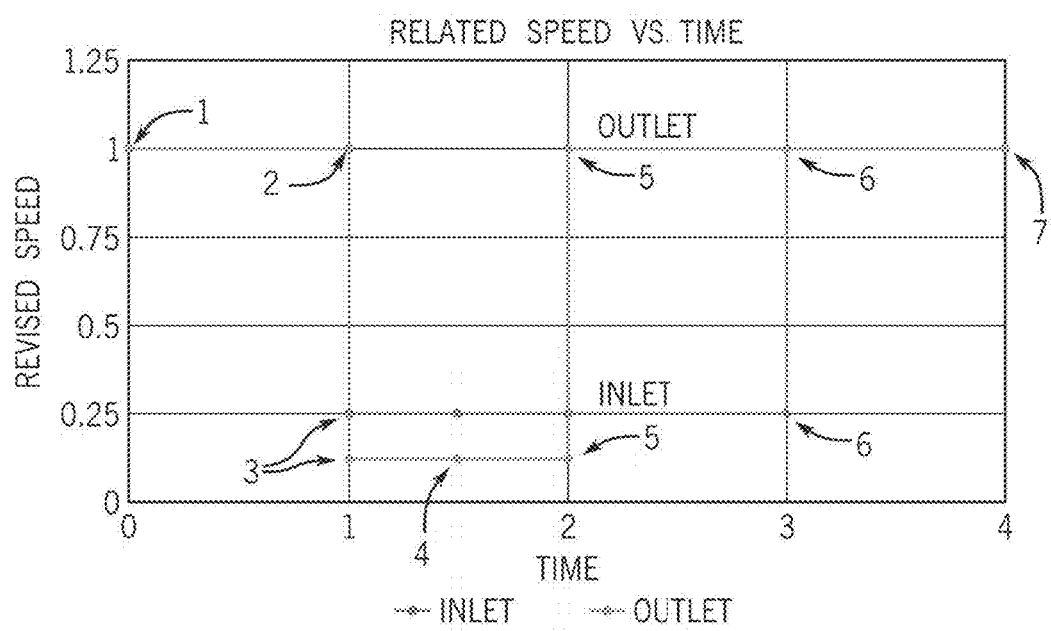
FIG. 7F shows a diagram of relative speed over time for the progression of the decoupling device of FIGS. 7A-7E.

As shown in FIG. 7D, when the force of the leading pipe section 34A is alleviated on the coupling 36, the carriage 102 can move forward relative to the plate 104. This movement is driven by the inlet side of the transporting mechanism 74, i.e., the first set 76A of wheels, which is still operating at 25% speed. As the carriage 102 moves forward, the bosses 115 of the movable barriers 114 engage the cam surfaces 118 of the wedge 116, which spreads the barriers apart and opens the gate 110. As shown in FIG. 7E, the trailing pipe section 34B and the coupling 36 can then be moved forward toward the second set 76B of wheels at the ejection side of the machine 70. See Stage 6 of the speed chart of FIG. 7F. At the same time, the infeed speed of the inlet side of the transporting mechanism 74, i.e., the first set 76A of wheels, can be increased to the steady state 100% speed to match the speed of the second set 76B and the trailing pipe section 34A and coupling 36 can be pulled through the machine 70 to become the next sequential leading pipe section. The carriage 102 will then return to a home position, as shown in FIG. 7E, relative to the plate 104. The foregoing decoupling process will repeat each time the next coupling 36 is captured by the carriage 102.

Figure 8A:
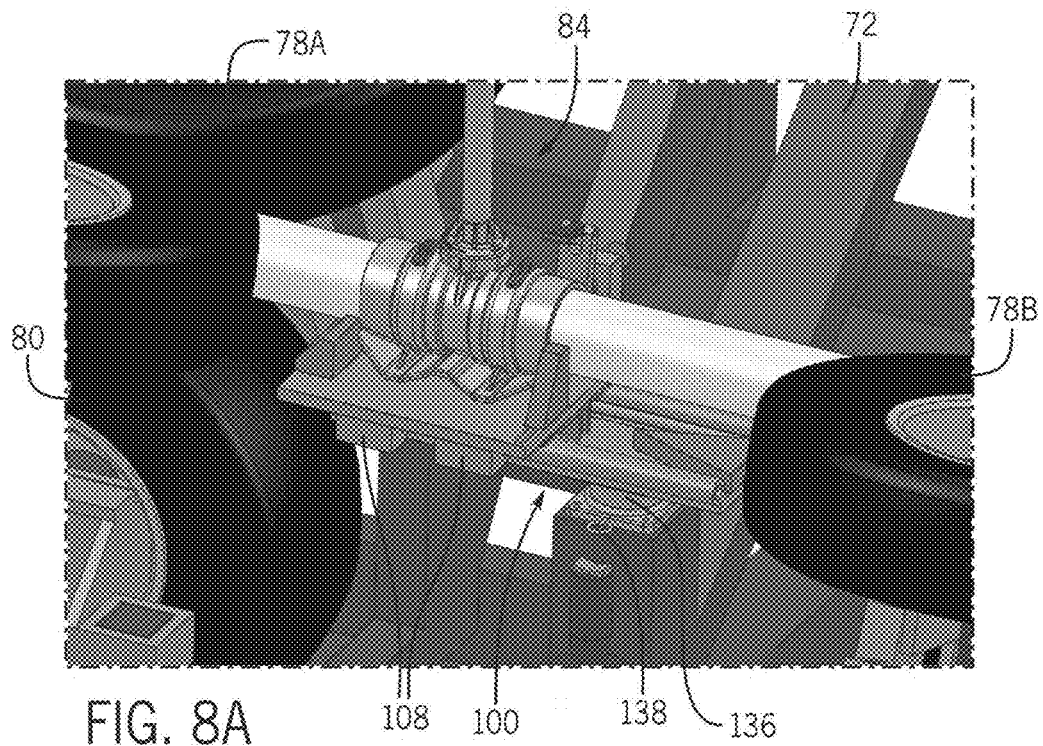
FIGS. 8A and 8B show the decoupling device in one orientation and in a reversed orientation, respectively, within the decoupling region of the pipe retrieval machine of FIG. 5.
Figure 8B:
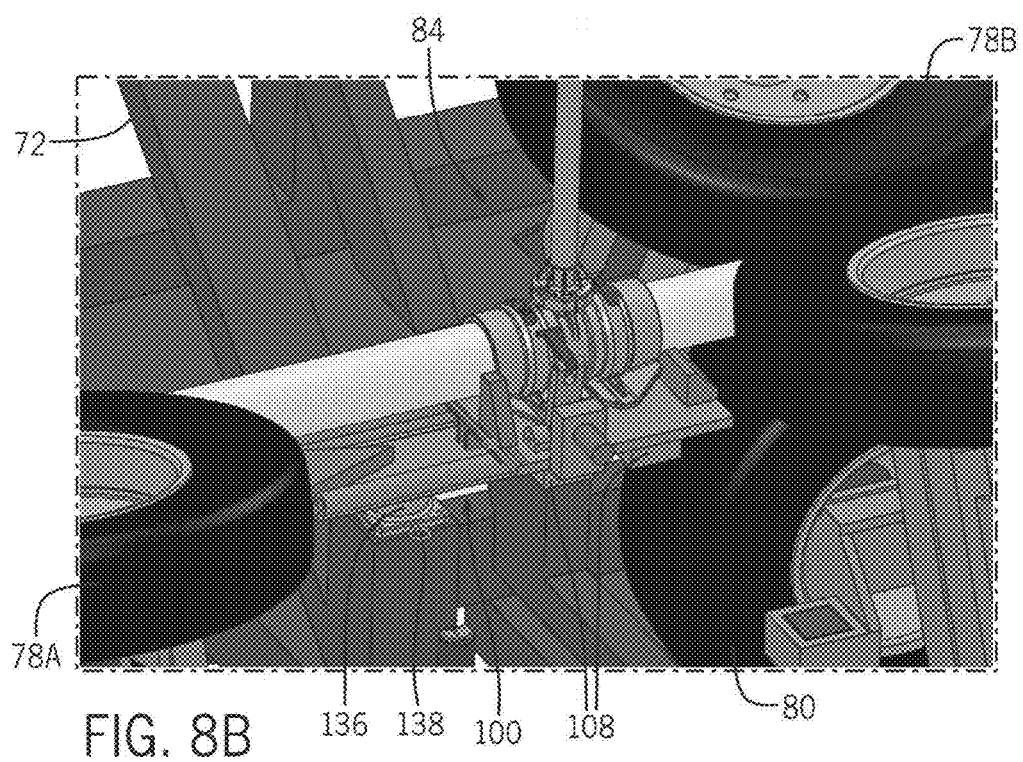

As noted above, the pipe retrieval machine 70 may be operable so that the feed or pulling direction P can be in either direction. This means that either side of the transporting mechanism 74 can be the infeed or inlet side. In one example, the decoupling device 100 may be reversible within the decoupling region 84 to achieve a direction change in the machine 70. Referring to FIGS. 8A and 8B, the plate 104 of the decoupling device 100 may be mounted on a rotatable stand or mount 136. The mount 136 can be fixed to a part of the frame 72 of the machine. In one example, the mount 136 may include a motor (not shown) that rotates and reverses the decoupling device from one orientation (FIG. 8A) to a reverse orientation (FIG. 8B). Alternatively, the mount 136 may be manually rotatable. In this example, the mount 136 can include a pin 138, which locks or secures the decoupling device 100 in the desired orientation. The pin 138 can be pulled, allowing the decoupling device to rotate when changing its orientation. When reversed, the second set of wheels 76B become the inlet or infeed side of the transporting mechanism 74 and the first set of wheels 76A become the outlet or outfeed side in this example.

The wheels of each set may be adjustable to accommodate different sized pipes. The wheels may also be replaced with other types of gripping structures or friction elements that can grip and move a pipe. Different sizes and different types of wheels may also be used for the gripping structures of the transporting mechanism.

Figure 9:
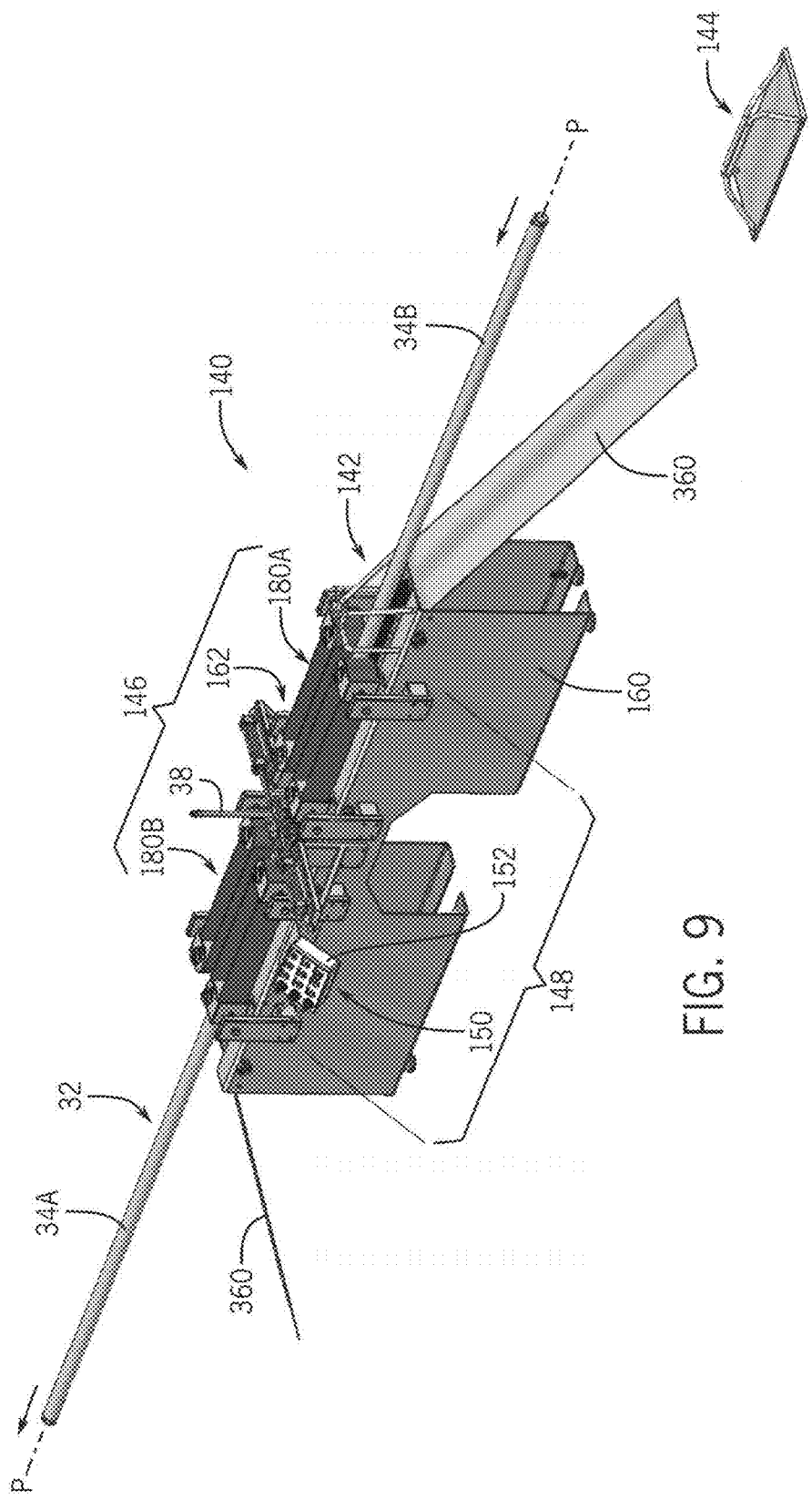
FIG. 9 shows a perspective view of one example of a pipe retrieval machine according to the teachings of the present disclosure

FIG. 9 shows another example of a pipe retrieval machine 140 constructed in accordance with the teachings of the present disclosure. The pipe retrieval machine 140 is substantially similar in function to the machine 70 described above and may again be used to aid in the removal and disassembly of assembled pipe of an irrigation system. However, the machine 140 includes several altered components and systems. In this example, a lateral pipe 32 is again pulled through the pipe retrieval machine 140, sequentially positioning the couplings 36 for disassembly of the pipe. After separating a coupling 36 and a trailing pipe 34B from a leading pipe section 34A, the leading pipe section 34A is ejected from the machine 140 and stored. The coupling 36 and trailing pipe section 34B are advanced through the pipe retrieval machine 140, becoming the next subsequent leading pipe section 34A, for removal or disassembly from the next coupling. The pipe retrieval machine 140 again can include pipe orientation or alignment features or guide rails 142 and 144, a transporting mechanism 146, a drive system 148 for operating the transporting mechanism, a control system 150, and a user interface or control box 152.

Figure 10:
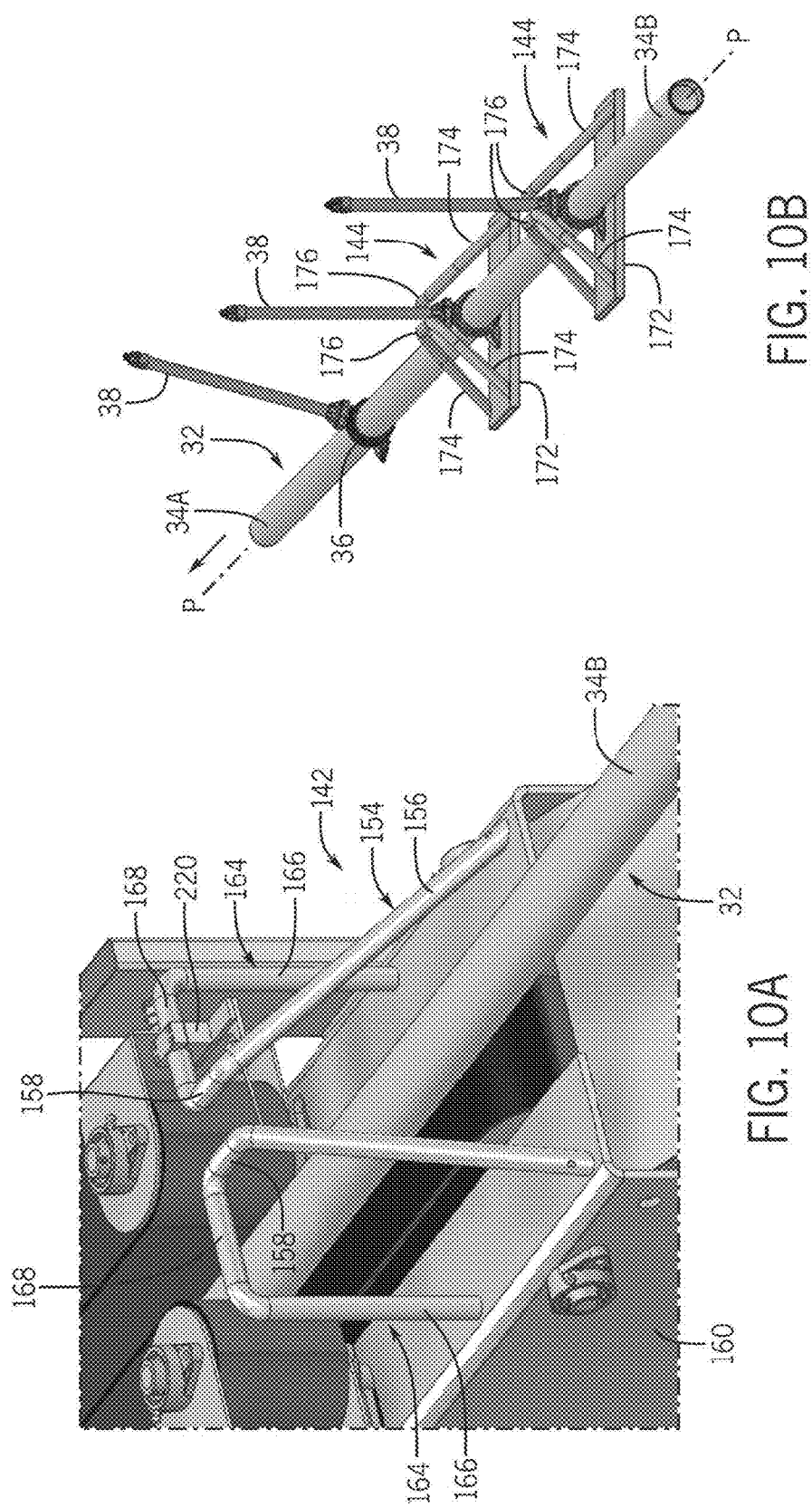
FIGS. 10A and 10B show two examples, respectively, of alignment tools or features of the pipe retrieval machine of FIG. 9 according to the teachings of the present disclosure.

As shown in FIGS. 9, 10A, and 10B, the pipe retrieval machine 140 includes two different alignment features or guide rails 142 and 144. The guide rails 142 and 144 in this example can again automatically align a sled or coupling 36 and riser 38 assembly of the pipe 32 with the riser in the true vertical position or orientation as it enters the machine. The guide rails 142 in this example are frame mounted or fixed guide rails, similar to the above described guide rails 90, and can be provided at each end of the machine 140. Each of the guide rails 142 in this example has a pair of rail parts 154 that are laterally spaced apart across the entry to the respective end of the machine 140. Each rail part 154 has an upstanding rail section 156 and a horizontal rail section 158. The guide rails 142 are mounted to a frame 160 of the machine and can be fixed to the frame or removable from the frame.

The lower ends of the upstanding rail sections 156 are mounted to a portion of the frame 160 in this example. The upstanding rail sections 156 are tilted toward one another from their respective lower ends to their upper ends. Thus, the lower ends of the upstanding rail sections 156 are spaced relatively far apart from one another and the upper ends of the upstanding rail sections are spaced closer together than the lower ends. The upstanding rail sections 156 also are tilted at an angle toward the transporting mechanism 146 from the lower ends to the upper ends. The horizontal rail sections 158 extend from the upper ends of the respective upstanding rail sections 156, but only a short distance toward a decoupling region 162 of the machine 140. The horizontal rail sections 158 in this example quickly terminate at an entry point into the transporting mechanism 146, and well short of the decoupling region 162.

Each rail part 154 in this example also has a support 164 including a vertical post 166 and a horizontal bar 168. The lower end of the post 166 is secured to the frame 160 and the upper end of the post is joined to one end of the bar 168. The post 166 is positioned laterally outward relative to the horizontal rail section 158 on the rail part 154. The other end of the bar 168 is joined to the end of the horizontal rail section 158. Thus, the bar 168 is horizontal but oriented transversely or laterally to connect the post 166 to the horizontal rail section 158. Each support 164 holds the rail sections 156 and 158 of the respective rail part 154 in a fixed position at each end of the machine 140.

The guide rails 144 in this example are an independent or portable alignment tool, which can be located in a desired position in front of the pipe retrieval machine 140 where the lateral pipe 32 is fed into the machine. The independent guide rails 144 can be placed on the ground in front of the pipe retrieval machine 140 to ensure that the risers 38 215 are not horizontal or in a position upon entering the machine 140 that could cause damage to the lateral pipe 32, riser 38, coupling 36, transporting mechanism 146, or any of the other components of the pipe retrieval machine.

Each of the portable guide rails 144 in this example is reversible and symmetrical. Each portable guide rail 144 has a pair of rail parts 170 that are laterally spaced apart from one another and mounted to a base 172 or platform. Each rail part 170 has a pair of upstanding rail sections 174 disposed at opposite ends of the base 172. Each rail part 170 also has a horizontal rail section 176 extending between the two upstanding rail sections 174 of the rail part. The rail parts 170 of the guide rails 144 are mounted to the portable base 172. The lower ends of the upstanding rail sections 174 of each rail part are tilted toward one another from their respective lower ends to their upper ends. The upstanding rail sections 174 of the two juxtaposed rail parts 170 at each end of the base 172 are also tilted inward at an angle toward one another. Thus, the lower ends of the upstanding rail sections 174 are spaced relatively far apart from one another and the upper ends of the upstanding rail sections are spaced closer together than the lower ends. The horizontal rail sections 176 are spaced apart but are relatively close together defining a suitable gap therebetween to reorient the risers 38 passing through the portable guide rails 144.

During use, as a lateral pipe 32 is retrieved, a coupling 36 moving toward the machine 140 may be tilted or rotated such that the riser 38 extending up from the coupling is tilted to one side or the other. If the portable guide rails 144 are used, the tilted riser 38 will contact one of the upstanding rail sections 174 as the lateral pipe 32 and the coupling 36 are pulled through the portable guide rails 144 toward the machine 140. The forward tilt of the contacted upstanding rail section 174 will alleviate abrupt and hard contact with the riser 38 and gradually lift the riser. The inward tilt will help to redirect the riser 38 back toward the vertical orientation as the coupling 36 and riser move toward the machine 140. The horizontal rail sections 176 will help to guide the riser along in the vertical orientation. Likewise, as a coupling 36 is about to enter the machine 140, the coupling may be tilted or rotated such that the riser 38 extending up from the coupling is still tilted to one side or the other. The tilted riser 38 will contact one of the upstanding rail sections 156 of one of the fixed guide rails 142 as the lateral pipe 32 and the coupling 36 are pulled into the machine 140. The forward tilt of the contacted upstanding rail section 156 will alleviate abrupt and hard contact with the riser 38 and lift the riser. The inward tilt will help to redirect the riser 38 back toward the vertical orientation as the coupling 36 and riser move toward the machine 140. The riser 38 will be funneled between the two horizontal rail sections 158 to maintain the relative vertical orientation of the riser 38, and thus the coupling 36 through the machine 140.

Figure 11:
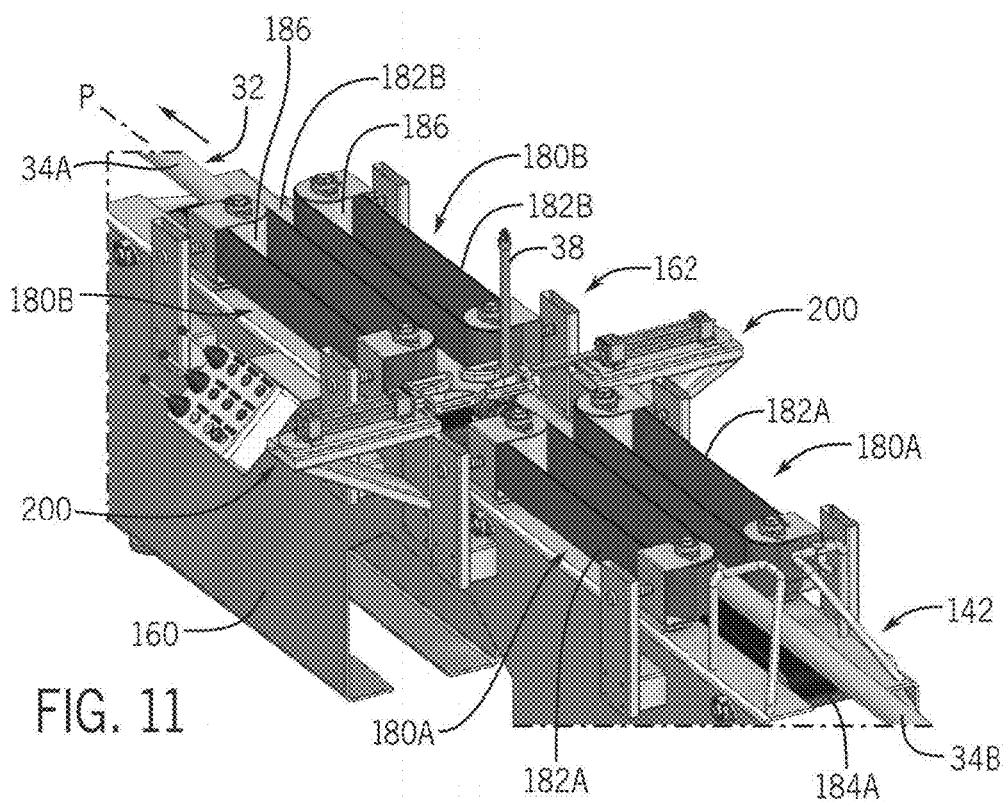
FIG. 11 shows a top perspective view of one example of a transporting mechanism and decoupling region of the pipe retrieval machine of FIG. 9.
Figure 12:
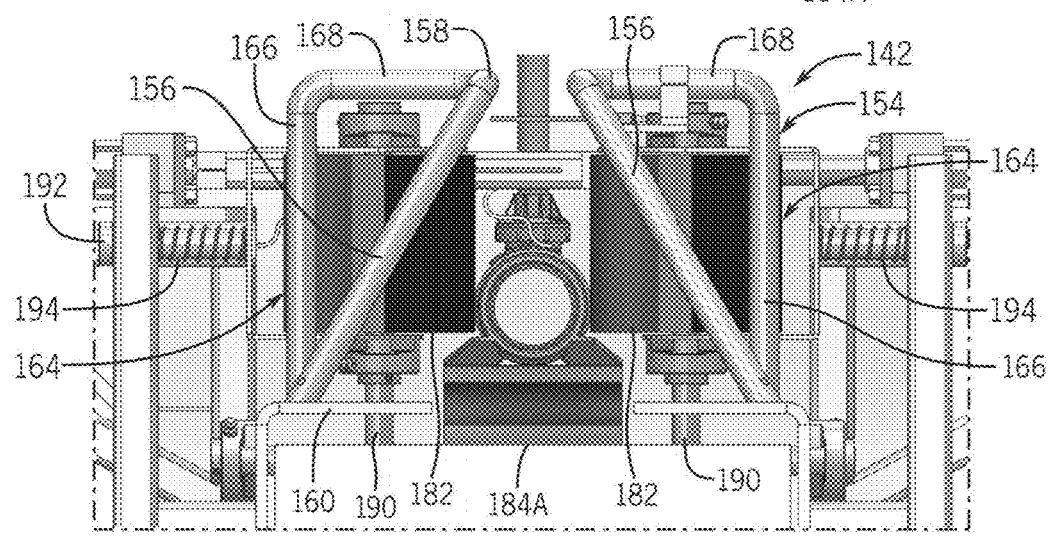
FIG. 12 shows an end view of the pipe retrieval machine of FIG. 9.
Figure 13:
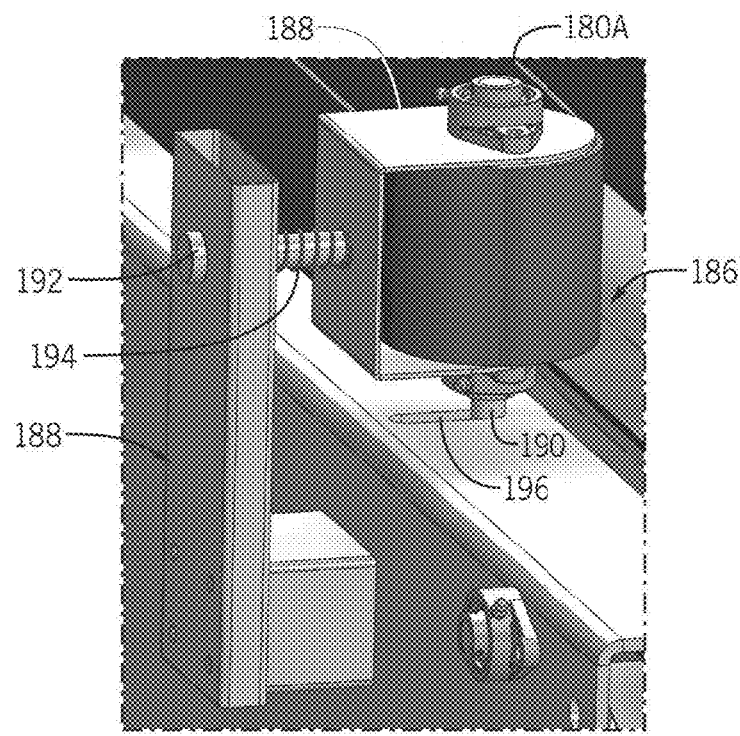
FIG. 13 shows an enlarged portion of the transporting mechanism of the pipe retrieval machine of FIGS. 9 and 11.

FIGS. 11-13 illustrate the transporting mechanism 146 in this example. The transporting mechanism 146 includes first and second belt or tread systems 180A and 180B, with one system at each end of the machine 140. Each tread system 180A and 180B has a pair of opposed and spaced apart lateral belts 182A or 182B, respectively. Each tread system 180A and 180B also has a horizontal support belt 184A or 184B, respectively, disposed below and between the corresponding lateral belts. In this example, the belts 182A, 182B, 184A, and 184B operate in a substantially similar manner to the various opposed wheels and support wheels as described above for the machines 50 and 70. The belts 182A and 184A or 184A and 184B of each tread system also operate in a similar manner to the three wheels in each group, as described above, to again create a pressure zone that captures and grips a lateral pipe 32 between the belts of each system 180A and 180B. In this example, the lateral belts in each tread system are arranged vertically, but could also be angled or tilted slightly inward, similar to the opposed wheels in the earlier described mechanisms to further inhibit the pipe from popping up above the lateral belts during operation.

As shown in FIGS. 11-14, each lateral belt 182A or 182B is routed at each end around a pulley or roller 186 that is supported in a vertical orientation by a bracket 188 mounted to a part of the frame 160. The rollers 186 are each coupled to a vertical shaft 190, i.e., a drive shaft or idler shaft. Though not shown in detail herein, each support belt 184A and 184B can be similarly routed around a pair of rollers carried by brackets that are mounted to the frame 160. These rollers are horizontally oriented and can be coupled to respective shafts.

The drive system 148 of the machine 140 in this example is again coupled to the transporting mechanism 146 to operate the two tread systems 180A and 180B. The decoupling region 162 is again disposed between the two tread systems 180A and 180B of the transporting mechanism 146 near the middle of the machine 140. The drive system 148 can include a plurality of motors (not shown) coupled to one or more of the shafts 190. At least one shaft 190, if not both, of one of the pulleys or rollers, if not both, on each of the lateral and support belts 182A, 182B, 184A, and 184B can be driven by a motor for driving rotation of the belts 182A, 182B, 184A, and 184B along the pull axis P through the machine 140. Each belt of one of the tread systems 180A or 180B can have its own dedicated motor or, alternatively, a transmission (not shown) may be used to connect and drive both belts of a given tread system by a common motor. However, the first tread system 180A and the second tread system 180B are operable independent of each other.

Depending on the orientation of the pipe retrieval machine 140, one of the tread systems is disposed at the inlet or infeed side of the machine 140 and the other is disposed at the outlet or outfeed side. In this example, the first tread system 180A is identified as the inlet side system and the second tread system is identified as the outlet side system. As a lateral pipe 32 is being drawn in the machine 140, both the first tread system 180A and the second tread system 180B can be controlled to operate at the same 100% speed to pull the pipe into the machine. The separate tread systems allow the first tread system 180A to grip a trailing pipe section 34B of the lateral pipe 32 while the second tread system 180B pulls the leading pipe section 34A of the pipe. In this example, each of the tread systems 180A and 180B of the transporting mechanism 146 can be operated in both rotation directions. In one example, the tread systems can be reversed to correct for misalignment, i.e., overshoot, of a coupling 36 and riser 38 relative to the decoupling region 162. In another example, as described further below, operation of the tread systems 180A and 180B of the transporting mechanism 146 can also be used to pull both the leading pipe section 34A and the trailing pipe section 34B out of a coupling 36.

In the disclosed example, the vertical lateral belts 182A and 182B and the horizontal support belts 184A and 184B grip the lateral pipe 32 at three locations and rotate, i.e., move along the pulling axis P to pull the pipe. The decoupling region 162 is defined between a lengthwise gap (see FIG. 14) between the first and second tread systems 180A and 180B so as not to interfere with disassembly of the pipe. In the disclosed example, each bracket 188 is coupled to the frame 160 of the machine 140 on a slide shaft 192. A spring 194 carried on the slide shaft 192 biases the bracket 188, and thus the roller 186 and belt 182A or 182B, toward the axis P and thus toward the lateral pipe 32 passing through the machine. The frame 160 of the machine 140 can include a slot 196 adjacent each of the rollers 186 for the corresponding drive or idler shaft 190 to move laterally in concert with the roller 186, as needed. The spring-loaded arrangement of the pulleys or rollers 186 and brackets 188 allows the belts 182A and 182B to move with the lateral pipe 32 and coupling 36 while sufficient pressure or force is continually exerted on the pipe during the transporting process. The spring-loaded arrangement of the pulleys or rollers 186 also allows the tread systems 180A and 180B to readily accommodate pipes of different diameter.

Figure 14:
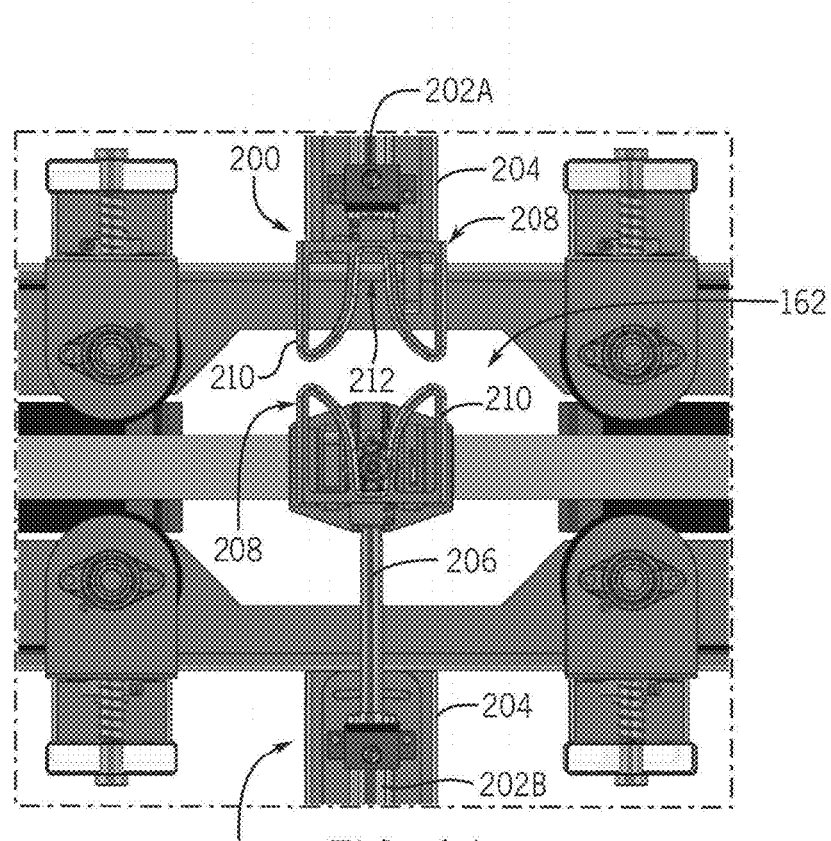
FIG. 14 shows a top view of the decoupling region of the pipe retrieval machine of FIGS. 9 and 11.
Figure 15:
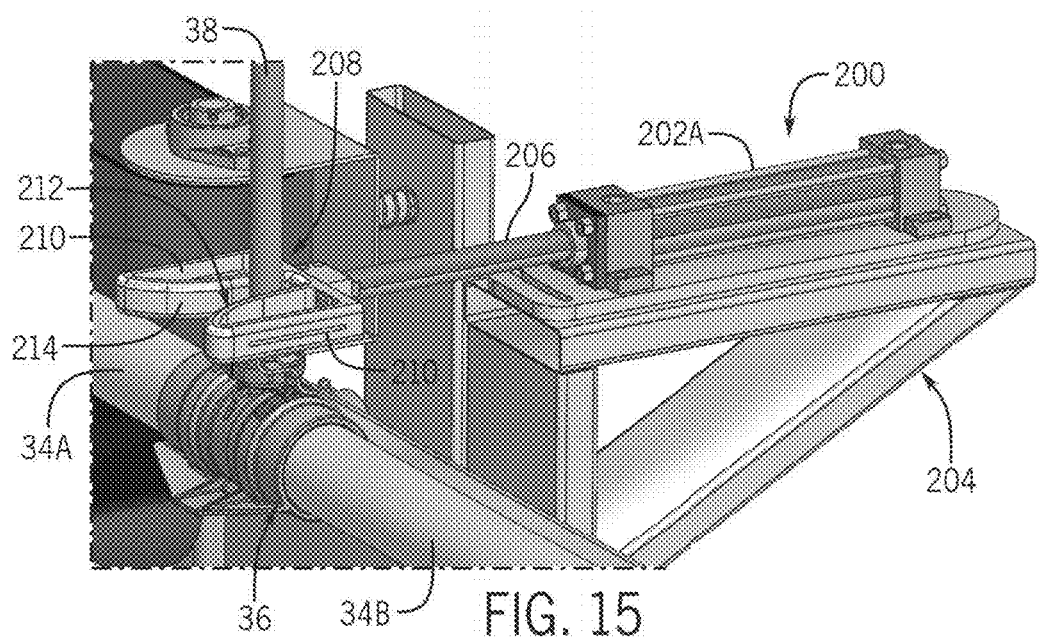
FIGS. 15 and 16 show enlarged views of one example of a decoupler for a decoupling device of the pipe retrieval machine of FIG. 9.
Figure 16:
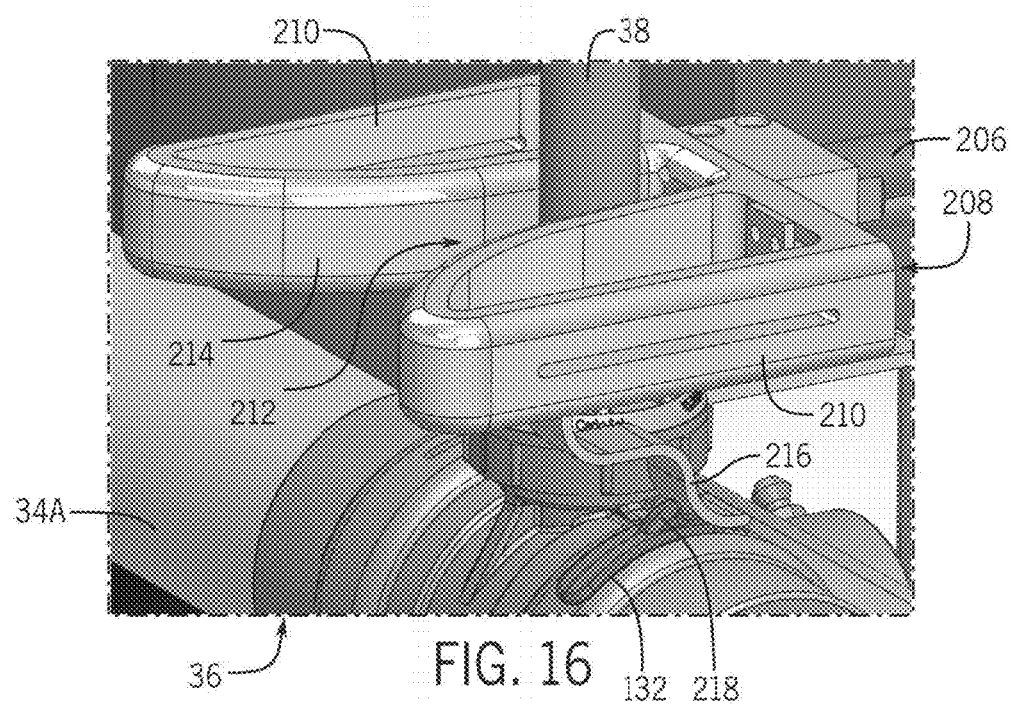

FIGS. 14-16 illustrate one example of a decoupling device 200 for use on the pipe retrieval machine of FIG. 9. Referring to FIGS. 14 and 15, the decoupling device 200 includes two hydraulic cylinders 202A and 202B positioned across from one another in the decoupling region 162. Each of the hydraulic cylinders 202A and 202B is essentially identical to the other in this example, so only the cylinder 202A is described herein with the understanding that the description applies equally to the other cylinder. Each hydraulic cylinder 202A and 202B is also oriented perpendicular or normal to the transport axis P through the machine 140. The hydraulic cylinders 202A and 202B may be directly opposite one another across the decoupling region 162 or may be staggered or offset along the axis P relative to one another.

The hydraulic cylinder 202A is mounted to a corresponding support bracket 204 carried on the respective side of the frame 160. The hydraulic cylinder 202A has a rod 206 extending from the cylinder toward the decoupling region 162. A riser stopper 208 is mounted to the free end of the rod 206. In this example, the riser stopper 208 is a fork having two spaced apart prongs 210 defining a notch between them. Confronting surfaces 214 on the prongs 210 define the notch 212 and may be curved to create a wider opening into the notch to direct or funnel a riser 38 into the notch during use. A lock actuator 216 projects down from the riser stopper 208 in the form of a finger or boss. As with the prior examples, the lock actuator 216 is configured and arranged to contact a release tab 218 on a locking part 132 of a coupling 36.

The hydraulic cylinder 202A and rod 206 are operable to move the riser stopper 208 to engage a riser 38 on a coupler 36 and lateral pipe 32 positioned within the decoupling region 162. The hydraulic cylinder 202A is also operable retract the rod 206 and riser stopper 208 to release a riser 38 and so as not to obstruct the pipe path along the axis P as the next subsequent coupling 36 and riser 38 are moved into position by the transporting mechanism 146. The fork shape of the riser stopper 208 may forms a "V" shape to allow for some positional tolerance when engaging a riser 38 on a coupling 36. The hydraulic cylinder 202A can extend so that the riser stopper engages riser 38 and aligns and orients the riser 38 relative to the notch 212 position. The support bracket 204 may be capable of swiveling, at least within a small angular range, to allow the hydraulic cylinder 202A to rotate slightly, depending on a location of the coupling 36 and riser 38. The lock actuator 216, i.e., finger is configured to engages the release tab 218 of the locking part 132 when the rod 206 of the hydraulic cylinder 202A is extended and engages the riser 38.

Figure 17:
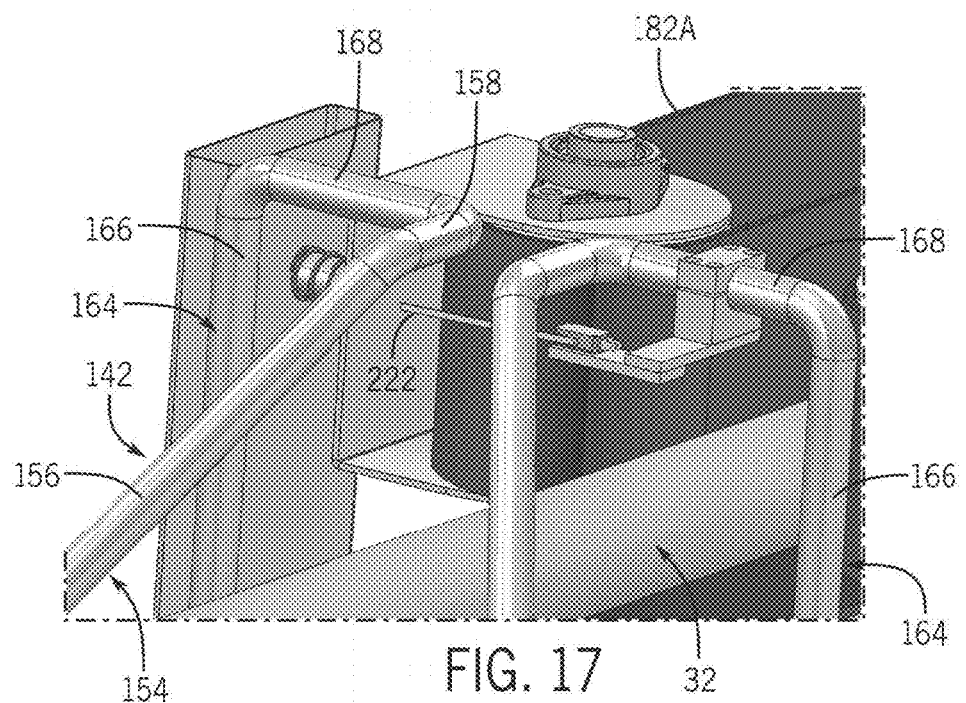
FIG. 17 shows one example of a microswitch actuator of the pipe retrieval machine shown in FIG. 9.

FIG. 17 illustrates one example of a microswitch 220 that can be provided on the pipe retrieval machine 140 according to the teachings of the present disclosure. One or more of the microswitches 220 can be mounted at any number of optional locations along the transport patch or axis P through the machine 140 and on both the inlet and outlet sides of the machine. In this example, the microswitch 220 is mounted on one of the transvers bars 168 of one of the fixed guide rails 142. The microswitch has a switch arm 222 that obstructs the flow path of the risers 38. This location can ensure that the microswitch 220 will be triggered each time a riser 38 passes through the alignment feature or guide rails 142. The microswitch 220 can send a signal that can actuate the decoupling device 200, including the hydraulic cylinders 202A and 202B after a predetermined time delay. The time delay is dependent on the speed of the transportation mechanism 146, as well as the travel distance between the microswitch 220 and the decoupling device. The time delay can be set to an elapsed time allowing for an object, having triggered the microswitch 220, to be aligned with the hydraulic cylinder 202A and/or 202B. The time delay thus allows a riser 38, after triggering the microswitch 220, to travel to the decoupling region 162 and be positioned adjacent the riser stopper 208. Other such microswitches or the like can be placed within the pipe retrieval machine to trigger various functions, such as speed changes among the transporting mechanism 146 components, staggered operation of the two hydraulic cylinders 202A and 202B, and the like.

Figure 18:
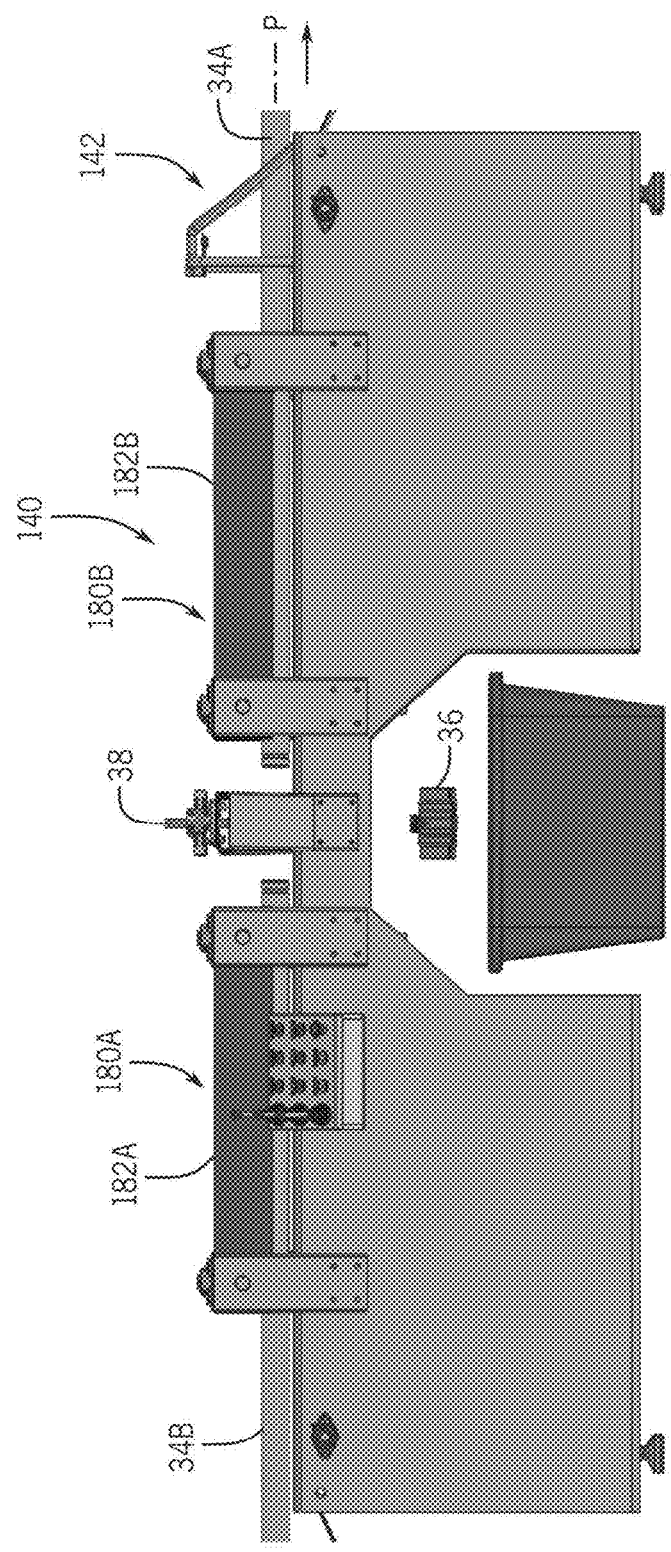
FIG. 18 shows a side view of the pipe retrieval machine of FIG. 9.

For example, the decoupling device 200 in this example has two hydraulic cylinders 202A and 202B and thus two lock actuators 216. As discussed above, the disclosed pipe retrieval machines can be configured to disassemble a coupling 36 from both a leading pipe section 34A and a trailing pipe section 34B within the decoupling region. In the machine 140, the first hydraulic cylinder 202A can be positioned to engage and release a locking part 134 at the leading end joint of the coupling 36. The second hydraulic cylinder 202B can be positioned to engage and release a locking part 134 at the trailing end joint of the coupling 36. The transporting mechanism 146 can be manipulated so that, once released, both pipe sections 34A and 34B can be withdrawn from the coupling 36. If and when this complete disassembly occurs, the removed coupling 36 can drop through an opening in the decoupling region 162 (see FIG. 18) to a waiting container. Two microswitches 220 can be provided along the transport path in the direction P, once for actuating each of the hydraulic cylinders. Two microswitches can also be provided on the other side of the machine 140 for the same purpose but when the machine operation is reversed. Alternatively, both hydraulic cylinders 202A and 202B can be activated by the same switch, but with different time delays.

Figure 19:
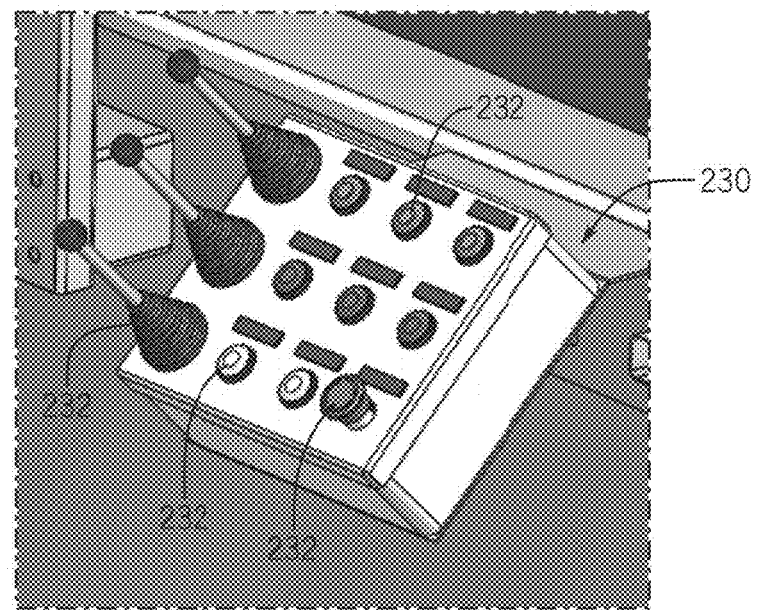
FIG. 19 shows one example of a control panel or control box for operating the pipe retrieval machine of FIG. 9.

FIG. 19 shows one generic example of a user interface or control device 230 of the pipe retrieval machine 140. In one example, the control device 230 can provide the ability to manually operate the transporting mechanism 146 and the drive system 148. The control box can be coupled to the components of the control system 150 as well. The control device 230 can be configured to operate the drive system in forward and backward directions, to stop the drive system at specified locations, and to detach couplings and detach pipe sections simultaneously. The user interface or control device 230 can include electronic and/or manual emergency stop switches, controls to grip/release a pipe, controls to adjust the transporting mechanism speeds and/or pressures, controls to effect locking part release, controls to separate pipe sections and couplings, and the like. All user interface and input functions and components can be located on the control device 30. The control device 230 can likewise be centrally or strategically placed on the machine 140. The user interface or control device 230 can also be connected directly or indirectly to the control system 150. The user interface or control device 230 also can be used to jog different components of the pipe retrieval machine 140 in case of a malfunction.

Further, sophisticated electronics (not shown), including a user display, a touchscreen, user adjustable machine operation parameters, and the like may also be incorporated. The control device 230 can include wireless or wired connection to a computer or network. The control device 230 can also include a processor and a memory to automate the various functions of the machine and, if desired, to store data collected by the machine during operation. The control device 230 can be located on the machine and can be connected in a wired or wireless manner, etc. The control box 230 can receive inputs from sensors on the machine, such as the microswitch, and can control the functioning of different components, such as the drive system and the lock actuator. The control device 230 includes the control system and an interface. While a number illustrated of inputs 232 may be mechanical, such as joysticks, switches, and buttons, the interface along with the inputs 232 could also be digital. The interface and the control device 230 and inputs 232 can be combined or separate. For example, the control system can be mounted to the machine, while the interface can be displayed on a remote device connected by wire or wirelessly.

The control device 230 can include multiple and separate inputs 232 for each of the transporting and drive systems, including inputs for speed, direction, emergency stop, and the like. The control device 230 can operate each drive system and transporting mechanism independently. The control device 230 can operate the decoupling device 200 and can include an emergency stop button or lever among the inputs 232 that can cut the power to all systems and mechanisms of the pipe retrieval machine 140.

Figure 20:
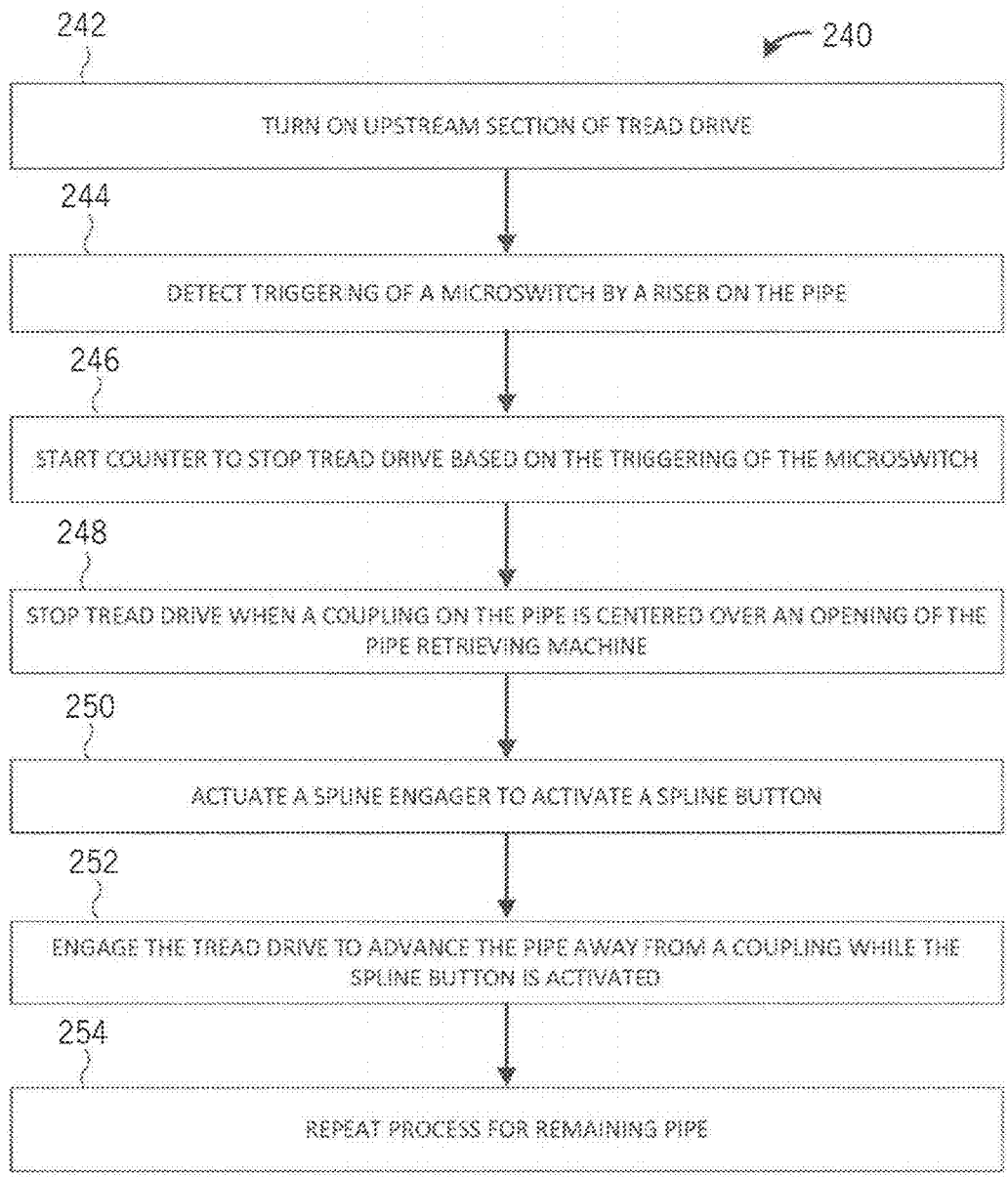
FIG. 20 shows a flow chart of one example of the progression of the decoupling device in the decoupling region of the pipe retrieval machine of FIGS. 9, 11, and 14-16.

FIG. 20 illustrates one example of a process flow diagram 240 or method for control logic of the pipe retrieval machine 140 according to the teachings of the present disclosure. For example, the process depicted in FIG. 20 may be performed or implemented by the control device of FIG. 19 and the pipe retrieval machine of FIGS. 9-19. The process may be implemented by the pipe retrieval machine 140 manually, part manually and part automatically, or fully automatically via the control system 150 and the control device 230.

In operation 242, the control device 230 and control system 150 operate the pipe retrieval machine 140 to turn on at least the inlet up infeed side of the transporting mechanism 146, which in this case is the first tread system 180A. A first end of a first leading pipe section 34A of a lateral pipe 32 fed into the transporting mechanism 146. The transporting mechanism 146 grips the leading pipe section 34A and begins pull the length of the lateral pipe 32 at a preset speed according to the control system 150 or using an input 232 of the control device 230.

In operation 244, the control device 230 and control system 150 are operated to sense a triggering event of the microswitch 220. As the lateral pipe 32 is pulled further into the machine 140, a riser 38 connected to a coupling 36 contacts the switch arm 222 of the microswitch 220 as the riser 38 passes the switch. The riser 38 triggers the microswitch 220, which indicates that a joint or coupling 36 of the lateral pipe 32 has passed. The trigger signal is sent to the control system 150.

In operation 246, the control device 230 operates the pipe retrieval machine 140 to start a counter or a time delay to stop or alter the speed of the tread systems 180A and/or 180B, based on the triggering event at the microswitch 220. The counter imparts a delay for the time duration that the coupling 36 and riser 38 take to become centered in the decoupling region 162.

In operation 248, the control device operates the pipe retrieval machine 140 to stop the first and second tread systems 180A and 180B when the coupling 36 and riser 38 are centered over an opening in the decoupling region of the pipe retrieval machine 140. The lateral pipe 32 is thus held in position with the riser 38 aligned with the riser stopper 208.

In operation 250, the control device 230 operates the pipe retrieval machine 140 to actuate the hydraulic cylinders 202A and 202B, which extends the rods 206 and riser stoppers 208 to engage the riser 38. The cylinders can be operated sequentially, not simultaneously, in this example, so as not to interfere with one another. The riser stopper 208 of the first hydraulic cylinder 202A can hold the riser 38 in the notch 212. The riser stopper 208 of the second hydraulic cylinder 202B can then hold the riser in the notch 212. The next operation is synchronized with the hydraulic cylinder operation.

In operation 252, the control device 600 operates the pipe retrieval machine 140 to engage the second tread system 180B to advance the leading pipe section away from the coupling 36. This is done while the release tab 218 of the locking part 134 at the leading end of the coupling 36 is activated or released by the lock actuator 216 moved by the first hydraulic cylinder 202A. The first tread system 180A is then operated in the opposite direction to pull the trailing pipe section 34B out of the coupling 36. This is done while the release tab 218 of the locking part 134 at the trailing end of the coupling 36 is activated or released by the lock actuator 216 moved by the second hydraulic cylinder 202B. Once the leading and trailing pipe sections 34A and 34B have cleared the coupling 36, the coupling can fall through the opening in the decoupling region 162. The disassembled coupling 36 can be directed into a storage area within the frame 160 of the machine 140, into a bin, or into another storage component or container. The trailing pipe section 34B is still connected to another coupling 36 and to the remaining lateral pipe 32 and thus becomes the next subsequent leading pipe section 34A.

In operation 254, the control device operates the pipe retrieval machine 140 to repeat the process for the remaining length of the lateral pipe 32 to be disassembled. The disassembled leading pipe section 34A can then be ejected from the machine 140 to a waiting truck or trailer and the remaining pipe 32 is advanced, starting the decoupling or disassembly process over. Once the entire lateral pipe 32 has been disassembled, the process can be ended.

Although FIG. 20 illustrates an example of a process or method for the control logic 240, various changes and modifications to the process or method could be made. For example, while shown as a series of operations, various operation could overlap, occur in parallel, occur in a different order, or occur multiple times. Such modifications may depend on the particular features of a given pipe or a given pipe retrieval machine design.

Figure 21:
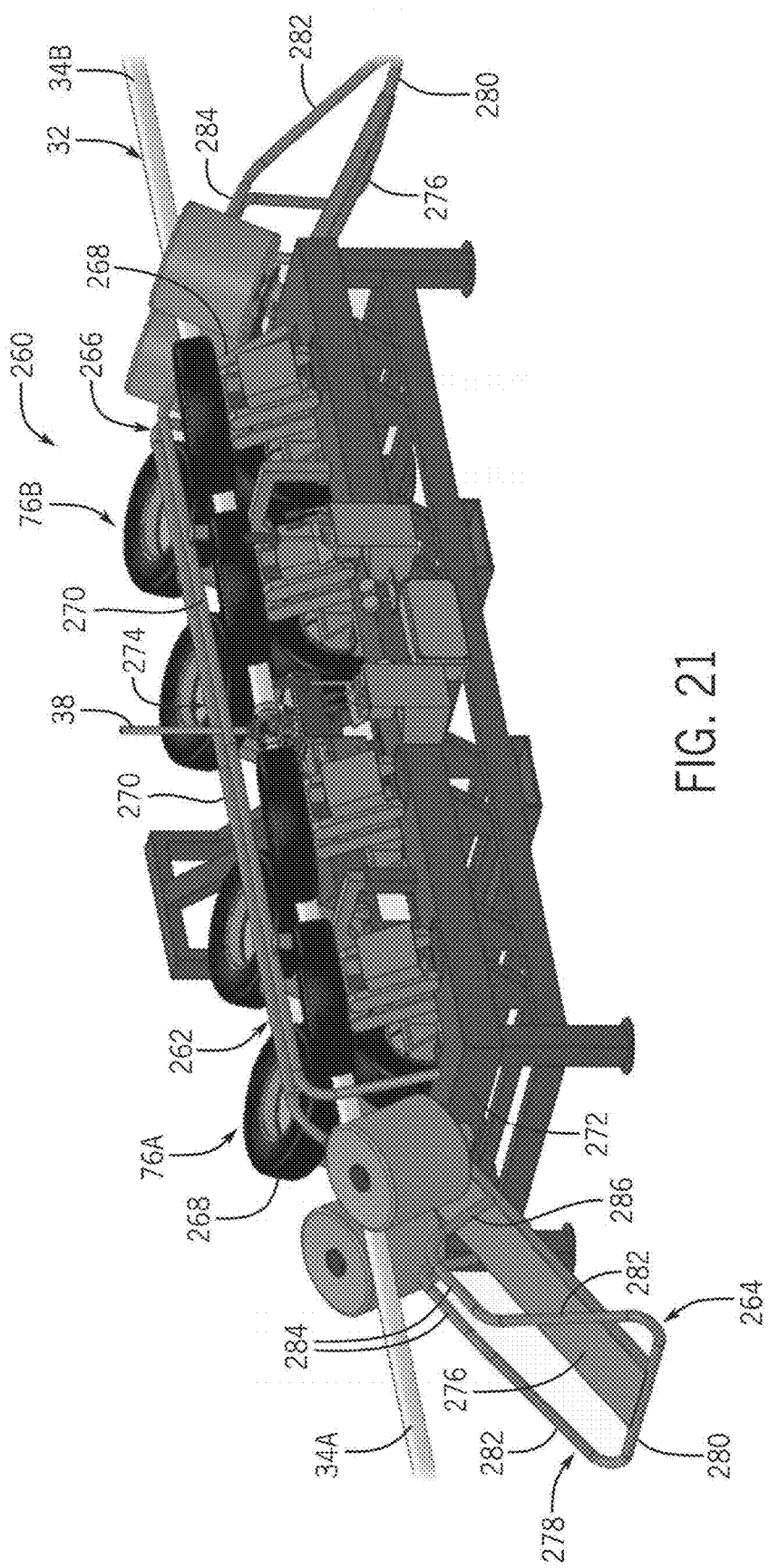
FIG. 21 shows a perspective view of one example of a pipe retrieval machine according to the teachings of the present disclosure.

FIG. 21 shows another example of a pipe retrieval machine 260 constructed in accordance with the teachings of the present disclosure. The pipe retrieval machine 260 is substantially similar in function to the machines 70 and 140 described above and may again be used to aid in the removal and disassembly of assembled pipe of an irrigation system. The machine 260 includes first and second sets 76A and 76B of wheels as the transporting mechanism 54, which can be identical to the earlier described transporting mechanism 74 of the machine 70. The machine 260 again, however, includes several altered components and systems. In this example, a lateral pipe 32 is again pulled through the pipe retrieval machine 260, sequentially positioning the couplings 36 for disassembly of the pipe. After separating a coupling 36 and a trailing pipe 34B from a leading pipe section 34A, the leading pipe section 34A is ejected from the machine 260 and stored. The coupling 36 and trailing pipe section 34B are advanced through the pipe retrieval machine 140, becoming the next subsequent leading pipe section 34A, for removal or disassembly from the next coupling. The pipe retrieval machine 260 again can include pipe orientation or alignment features or guide rails 262 and 264, a transporting mechanism 74, a drive system 76 for operating the transporting mechanism, a control system 150, and a user interface or control box 152 or one or more control panels 88 to control and operate the various aspects of the machine.

Figure 22:
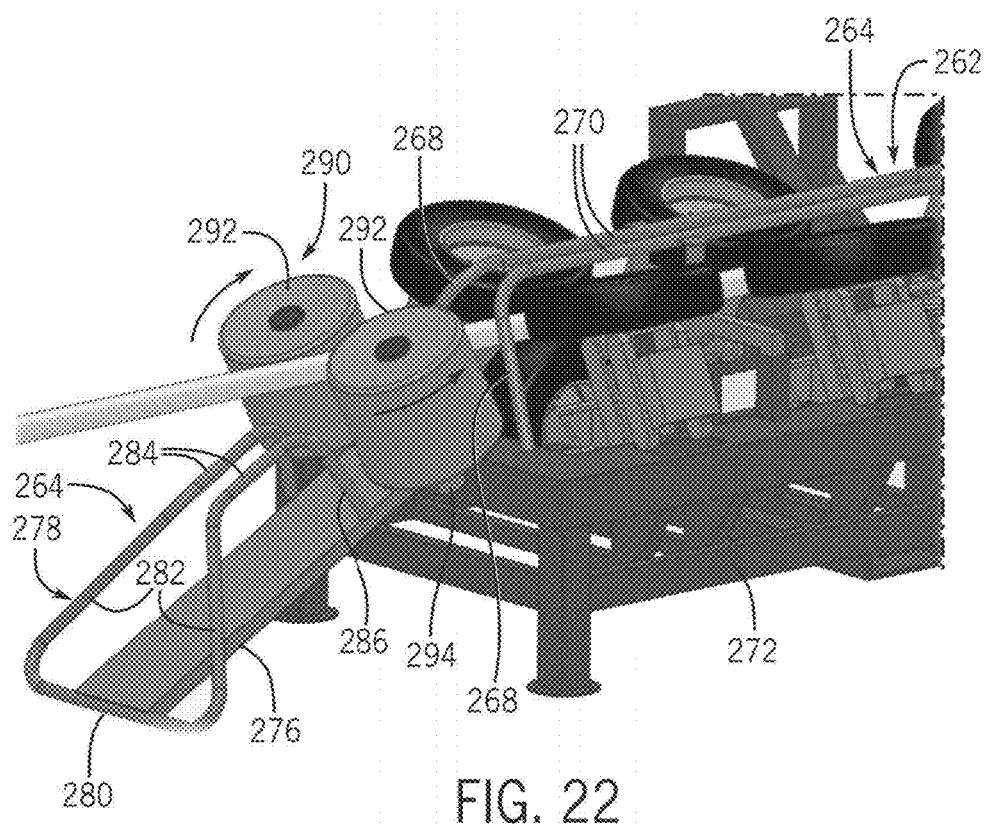
FIG. 22 shows an enlarged view of one end of the pipe retrieval machine of FIG. 21.
Figure 23:
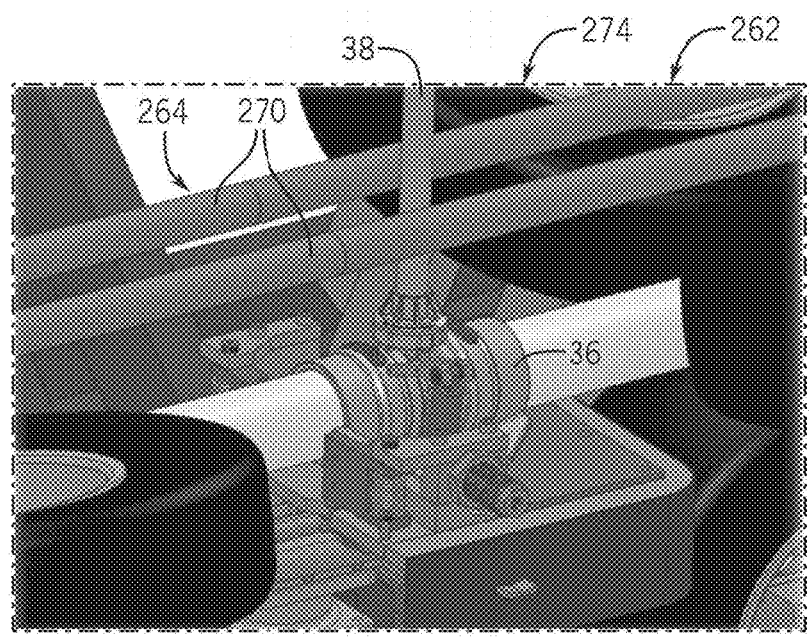
FIG. 23 shows an enlarged view of one example of a decoupling region of the pipe retrieval machine of FIG. 21.

As shown in FIGS. 21-23, the pipe retrieval machine 260 includes two different alignment features or guide rails 262 and 264. The guide rails 262 and 264 in this example can again automatically align a sled or coupling 36 and riser 38 assembly of the pipe 32 with the riser in the true vertical position or orientation as it enters the machine. The guide rails 262 in this example are frame mounted or fixed guide rails, similar to the above described guide rails 90 and 142 and can be provided at each end of the machine 260. Each of the guide rails 262 in this example has a pair of rail parts 266 that are laterally spaced apart across the entry to each end of the machine 260. Each rail part 266 has two upstanding rail sections 268, one disposed at each end of the machine 260, and one elongate horizontal rail section 270 extending between the two upstanding rail sections. The guide rails 142 are mounted to a frame 272 of the machine 260 and can be fixed to the frame or removable from the frame.

The lower ends of the upstanding rail sections 268 are mounted to a portion of the frame 272 in this example. The upstanding rail sections 268 are again tilted forward and inward toward the center of the machine 260 and function in the same manner as previously described. The horizontal rail section 270 extends the entire length of the machine 260 between the two upstanding rail sections 268 in this example. The horizontal rail sections 270 of the two rail parts 266 are again spaced apart from one another and thus define an alignment tool or orientation device over the length of the machine 260, including through a decoupling region 274, as shown in FIG. 23.

The guide rails 264 in this example are provided on a ramp 276 disposed at each end of the pipe retrieval machine 260. Each ramp has one end connected to an elevated part of the frame below the entry point to the transporting mechanism 74 and an opposite end that rests on the ground. The guide rails 264 each include two rail parts 278 and a crossbar 280. The crossbar 280 extends across the free end of the ramp 276 and is connected at each end to an upstanding rail section 282 of each rail part 278. As with the previous examples, the two upstanding rail sections are tilted or angled forward and inward and function in the same manner as previously described. Each rail part 278 also has a horizontal or guide rail section 284 extending forward from the respective upstanding rail section 282 and horizontal with the ramp 276. The forward end of each guide rail part 284 is connected to a post 286. Each post has a lower end connected to an edge of the ramp 276 and an upper end connected to the guide rail part 284. Each crossbar 280 and post 286 holds the rail sections 282 and 284 of the respective rail parts 278 in a fixed position on the ramps 276 at each end of the machine 260. The guide rails 274 on the ramps 276 can guide and orient a coupling 36 and riser 38 to vertical as a pipe is first being raised and directed into the machine 260 or as the pipe is continually pulled into the machine. However, this may not occur, depending on the size and stiffness of the pipe 32, as can be seen in FIG. 22.

As shown in FIGS. 22-26, the pipe retrieval machine 260 may also include a vegetation removal unit 290 at each entry point to the machine. In one example, the vegetation removal unit 290 can include a pair of rotatable brushes 292 disposed on opposite sides of the pull axis or direction P. Each of the brushes 292 can rotate about its own axis B and can rotate counter to one another. In other words, the brushes 292 rotate in opposite directions relative to one another. Each brush 292 can be rotated by its own independent hydraulic or electric motor 294. Each brush 292 can also be mounted to a carrier 296 or plate. The carrier 296 can be coupled to the frame 272 of the machine 260 by an adjustable bracket 298, which is attached to the frame 272 and to the carrier 296. The adjustable bracket 298 can allow the carrier 296, and thus the brushes 292 to rotate relative to the pipe or pull axis P. Each brush 292 may also be laterally and/or fore-and-aft adjustable on the carrier 296. In one example, the carrier 296 can include an adjustment slot 300 for each of the brushes 292 to allow positional adjustment of the brushes on the carrier. For example, the spacing between the brushes 292 may be adjustable to accommodate different pipe sizes or other conditions relevant to the machine 260, as needed.

Figure 24A:
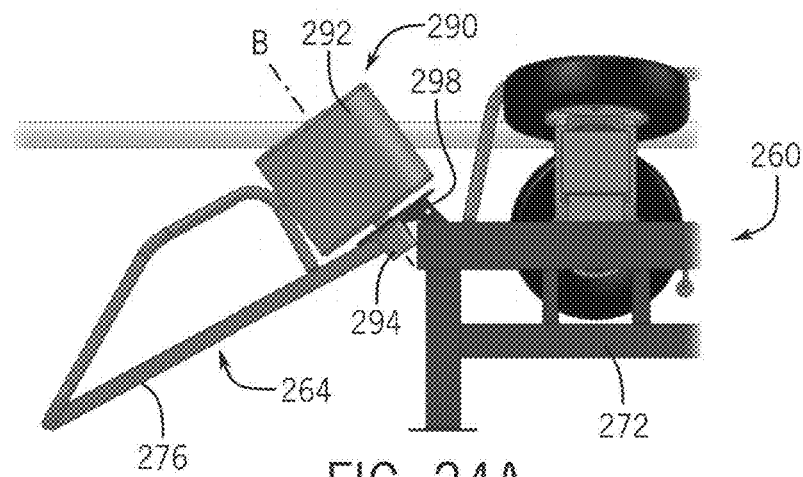
FIGS. 24A-24C show side views of one example of a vegetation remover of the pipe retrieval machine of FIG. 21 and with the vegetation remover in different positions, respectively.
Figure 24B:
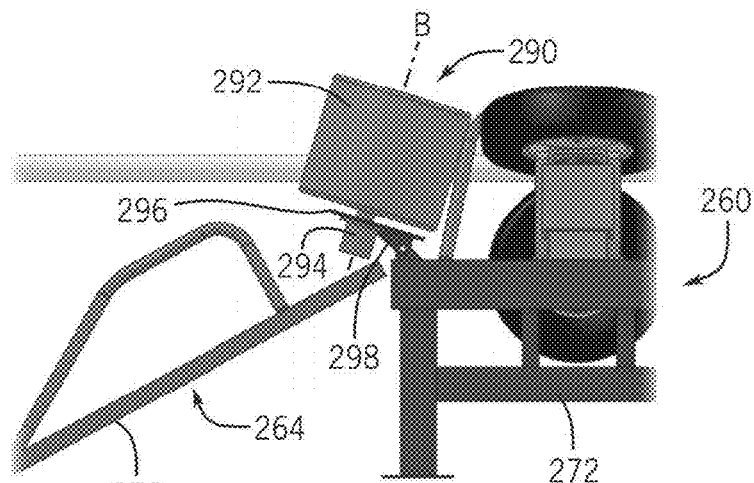
Figure 24C:
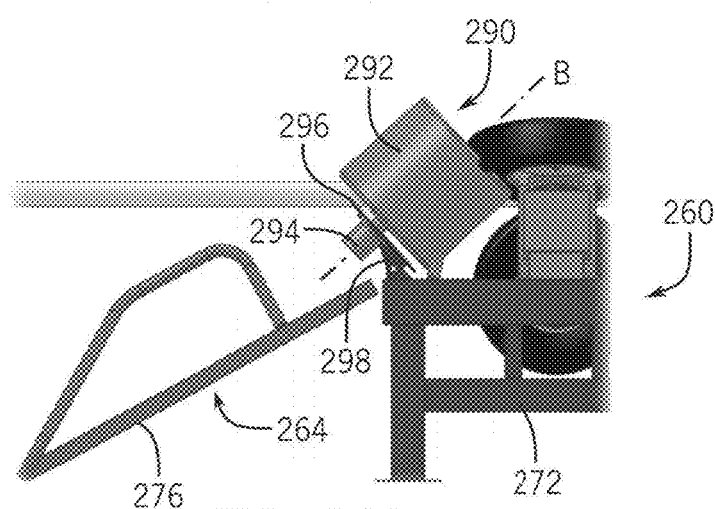
Figure 25:
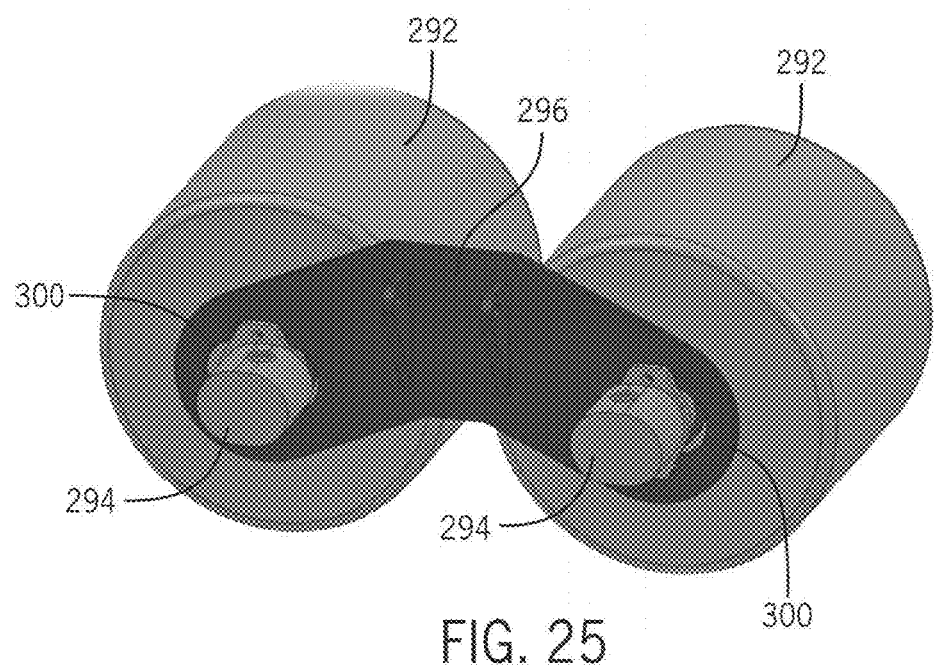
FIG. 25 shows a bottom perspective view of one example of vegetation removal brushes of the pipe retrieval machine of FIG. 21.

As shown in FIGS. 24A-C, the vegetation removal unit 290 is configured to allow the angle of the brushes 292 relative to the axial orientation of the lateral pipe 32 being fed through the machine 260. In this example, the adjustable bracket 298 allow the carrier 296, and thus the brushes 292 to be pivoted among different angular orientations, as shown in FIGS. 24A-24C, depending on the type of vegetation that might collect around the couplings 36 and risers 38 as the lateral pipe 32 is pulled from a field. As an example, the brushes may be pivotable from a position generally perpendicular to the ramp 276 (see FIG. 24A) to a position where the brushes are close to or perpendicular with the pipe 32 (see FIG. 24B) and/or to a position where the brushes overlie the frame (see FIG. 24C) for storage.

Figure 26:
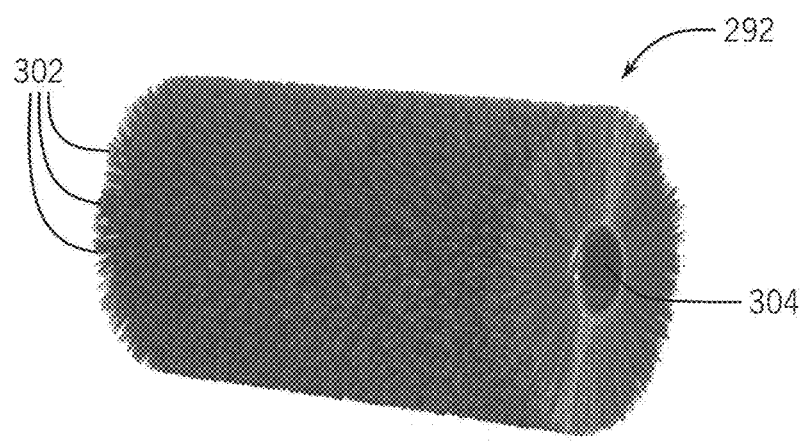
FIG. 26 shows a perspective view of one example of a vegetation removal brush of the pipe retrieval machine of FIG. 21 and including details of the brush.
Figure 27:
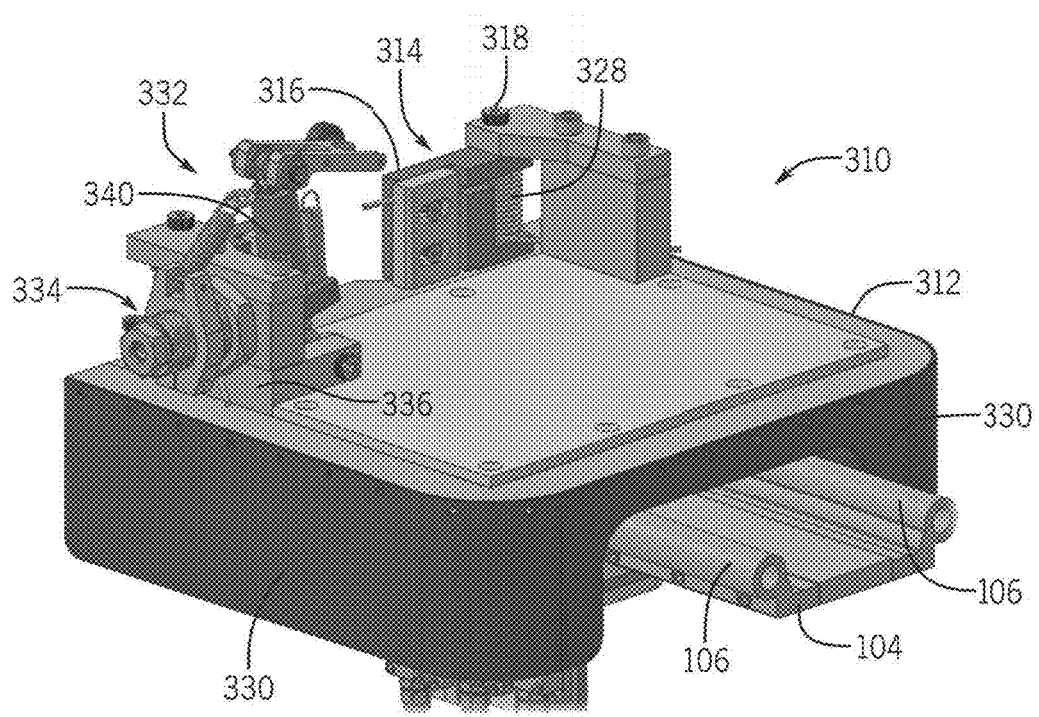
FIG. 27 shows a perspective view of one example of a decoupling device of the pipe retrieval machine of FIG. 21.
Figure 28:
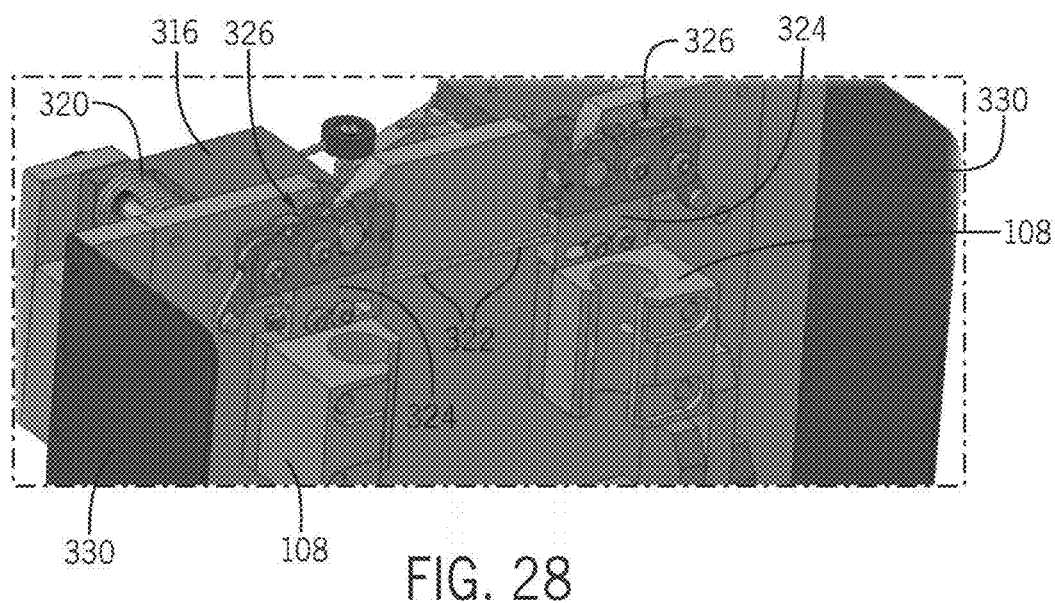
FIG. 28 shows a partial bottom perspective view of one example of a carriage of the decoupling device of FIG. 27.

The configuration details of the brushes 292 can vary considerably, depending on the needs of a particular application. In one example, the brushes may have bristles 302 extending from a core tube 304, though the bristles may vary in stalk thickness, bristle length, material type, or the like. In one example, as shown in FIG. 26, the brushes 292 may include wire/poly type bristles, similar to those used on conventional street sweeping vehicles. In other examples, the vegetation removal unit may include "brushes" that are more like weed whacker heads that physically cut any vegetation carried on the pipe assembly as it travels through the unit. Further, in other examples, the orientation and rotation of the brushes may be independently adjusted relative to one another to achieve a desired vegetation removal effect. Still further, in other examples, one of the brushes may be oriented generally parallel to the ground and the other brush may be oriented normal or generally perpendicular to the ground. The first brush may be oriented and configured to move or "flick" one end of a weed or vegetation upward. The second brush may be oriented and configured to move or "flick" the other end of a weed or vegetation outward. Such arrangements may be configured to effective in getting around the sprinkler riser The machine 260 can also include another example of a decoupling device disposed in the decoupling region 274 of the pipe retrieval machine 260. In this example, FIG. 23 shows the decoupling region 274 of the machine 260, which includes one example of an in line automated decoupling device 310 and system. In this example, as shown in FIGS. 27 and 28, the decoupling device 310 has a carriage 312 that can move back and forth along a lengthwise axis, i.e., the pipe axis of the machine 260 within the decoupling region 274. The carriage 312 can be slidably mounted on a fixed plate 104 or support that is secured within the decoupling region 274. The plate 104 in this example is substantially similar to the earlier described plate of the machine 70.

Figure 29:
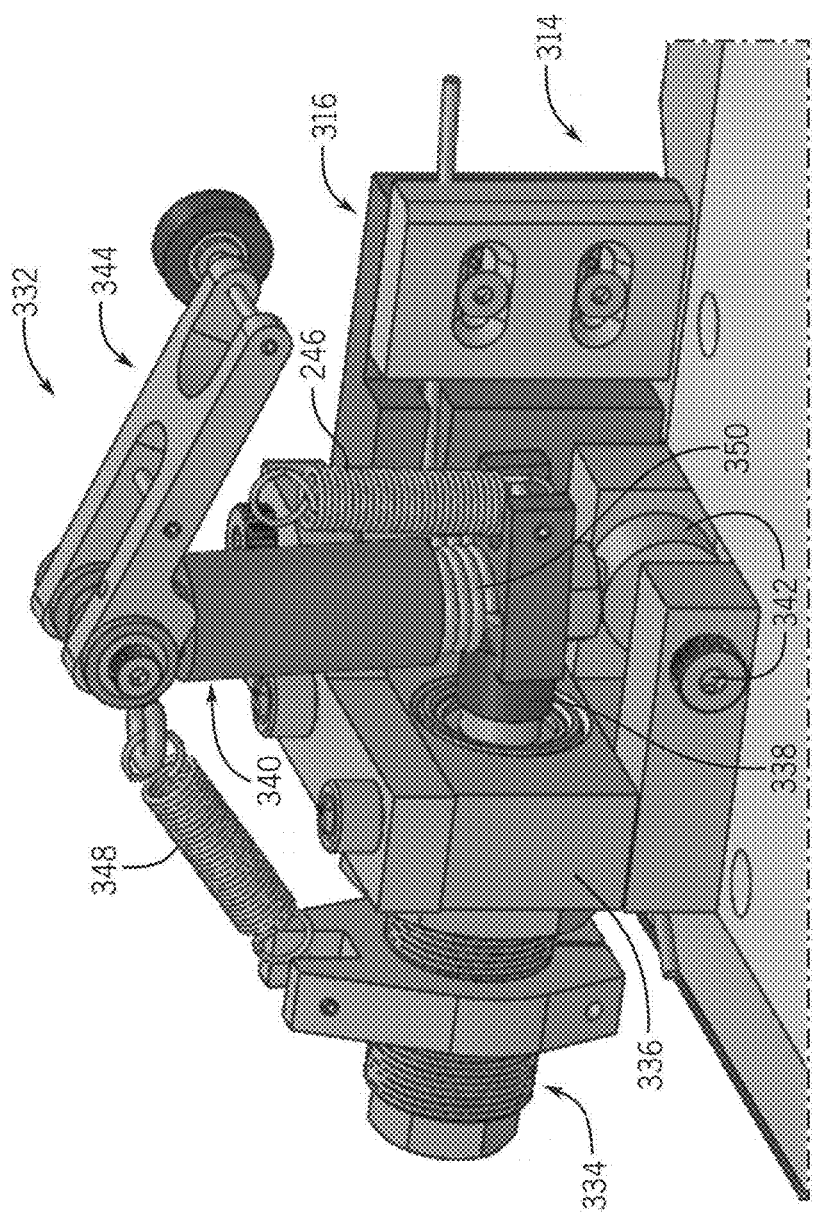
FIG. 29 shows a perspective view of one example of a decoupler of the decoupling device of FIG. 27.

Referring to FIGS. 27-29, the trailing or downstream end of the carriage 312 can have a gate 314 or forward stop that projects up from a surface of the carriage. The gate 314 is configured and arranged to engage a leading end of a coupling 36 on the lateral pipe 32 as it passes through the decoupling region 274. The carriage 312 in this example does not have a stop block for inhibiting reverse direction movement of the pipe, nor does it have a wedge to initiate movement of the gate 314. In one example, the gate 314 can include a pair of movable barriers 316 or stops rotatably mounted on the carriage 312. The barriers 316 in this example can pivot about vertical shafts 318 toward and away from one another to impede or obstruct the pipe path through the decoupling region 274 or to allow a coupling and pipe to pass. Each of the barriers 316 can be biased by a torsion spring 320 on each of the shafts 318 or by other biasing elements toward one another to a closed or stop position. In the stop position, a gap between the barriers 316 matches the width of a pipe section 34 but that is less than a width of the body of a coupling 36.

As shown in FIG. 28, each of the barriers 316 may also have a release cable 322 coupled to a release lever 324. The cables 322 can extend through a tunnel block 324 on the underside of the carriage 312 to protect and restrain the cables. Each cable 322 can also have an adjustment screw to fine adjust the cable tension to precisely set when the barriers 316 will open during operation of the machine 260. The release cables 322 overlap one another between the tunnel blocks 324 and can be actuated by a mechanical travel limiter, such as a hook (not shown) that grabs onto the exposed portion of the overlapped cables 322. The hook will then apply tension to the cables 322m, which can release latches, allowing the pipe to push the barriers open against the force of the springs 320. Other types of release mechanisms may be utilized, if desired.

In this example, as shown in FIGS. 27 and 28, the carriage 312 includes protective side skirt 330 that depend down from each side of the carriage. The protective side skirt 330 can extend to portions of the front and back ends of the carriage 312, if desired (see FIG. 27). The side skirt 330 blocks or inhibits direct contact with the components on the underside of the carriage and on the plate 104 from objects in the decoupling region 274 of the machine 260 during operation.

In this example, as shown in FIGS. 27 and 29, the carriage 312 also has an automated decoupler 332 offset to one side of the carriage. The decoupler 332 can be actuated by movement of one or more parts of the decoupling device 310. The decoupler 332 includes a hydraulic actuator 334 mounted to a bracket 336 on the carriage 312. The hydraulic actuator 334 has a rod 338 arranged to extend toward the lateral pipe 32 in the decoupling region 274. The decoupler 332 also includes a lever 340 that protrudes up from the carriage 312. The free end of the rod 338 is coupled to the lever 340, which is pivotable about its lower end about a pivot 342. A lock actuator 344 extends from the upper free end of the lever 340 toward the lateral pipe location in the decoupling region 274. The lever 340 may be biased by a tension spring 346 or another biasing element toward the bracket 336. The lock actuator 344 is in the form of a finger or arm and is pivotable relative to the lever 340. The lock actuator 344 may be biased a tension spring 246 or another biasing element to a lowered first position as shown in FIG. 29. The lock actuator 344 may pivot upward from the first position to accommodate the shape of the lateral pipe 32 and coupling 36, as discussed below.

In this example, the lever 340 may also be rotatable about a vertical axis. A heavy spring, such as a torsion spring 350, can be provided about the lever 340, as shown in FIG. 29. The spring 250 can allow the lever to twist in the direction of the pipe movement P, i.e., toward the gate 314, in the event of a misfire. If the lock actuator 344 and lever 340 are still extended when a coupling and pipe section are pulled through the coupling device 310, the coupling will hit the decoupler 332. In order to prevent damage, the spring 350 allows the lever 340 and lock actuator 344 to rotate upon contact to allow the coupler to pass. The spring 350 can then return the decoupler 332 to its normal ready position without incident. Also, in this example, the lower end of the lever 340 can be rotationally adjustable to extend or retract the length of the lever. This will allow the decoupler to accommodate different sized pipe by changing the approach angle of the lock actuator 344 relative to the pipe.

The hydraulic actuator 334 can be operable or actuated systematically in response to movements of the lateral pipe 32, parts of the decoupling device 310, or both, as discussed below. The rod 338, when actuated, pushes the lever 340 toward the lateral pipe 32 and coupling 36. The lock actuator 344 then contacts the coupling 36 and rides upward against a surface of the coupling. The lock actuator 344 can then pivot, as needed, relative to the lever 340 to stay in contact with the curved surface of the coupling 36 as the lever moves. The operation of the decoupler 332 is substantially similar to that described above with respect to FIGS. 7A-7F and for the decoupler 122.

A lateral pipe 32 is retrieved by and through the machine 70. The lateral pipe 32 is moved or pulled in the direction P by the transporting mechanism. In this steady state of operation, the inlet and outlet sides of the transporting mechanism are synchronized to operate at the same speed. The steady state operating speed can be characterized as 100% speed, though the actual speed at 100% can vary according to the needs of a given machine and irrigation system.

When a coupling 36 is aligned with the carriage 312, it is stopped by the gate 314 an held by the transporting mechanism. When the coupling 36 is captured, limit switches (not shown) or other such devices may be activated. This activation reduces the inlet or infeed speed of the inlet side of the transporting mechanism, such as to about 25% of the steady state speed. At the same time, this activation also reduces the outlet or outfeed speed of the ejection or outlet side of the transporting mechanism to a stop or to a slower speed of about 10% of the steady state speed. The speed reduction can be imparted to the drive system using electronic flow control valves (not shown) or other such devices. The slower speed of the outlet side of the transporting mechanism imparts a momentary compression force between the leading pipe segment 34A and the coupling 36.

The momentary compression alleviates tension in the joint between the leading pipe section 34A and the leading end of the coupling 36. This alleviates pressure against a locking part 134 in the joint, allowing the locking part to be manipulated. At the same time, the hydraulic actuator 334 is actuated, driving the rod 338 toward the coupling 36. The rod 338 then pushes the lever 340 toward the coupling 36. The lock actuator 344 contacts the surface of the coupling 36, is aligned with a release tab on the locking part 134, rides along the coupling surface, and contacts the release tab. As the lock actuator 344 pushes the release tab of the locking part 134, the locking part expands within the coupling 36, which releases the leading pipe section 34A from the leading end of the coupling 36.

Once the leading pipe section 34A is released from the coupling 36 in this manner, the outfeed speed of the transporting mechanism 74 at the outlet side of the machine is increased back to 100%. This speed increase causes the outlet side of the transporting mechanism to decouple and withdraw or pull the leading pipe section 34A from the coupling 36. The leading pipe section 34A is then ejected or fed out of the machine 260 to a waiting truck or trailer.

When the force of the leading pipe section 34A is alleviated on the coupling 36, the carriage 312 can move forward relative to the plate 104. This movement is driven by the inlet side of the transporting mechanism 74, which is still operating at 25% speed. As the carriage 312 moves forward, a portion of the barriers 314 can engage the cam surface or other obstruction, which pulls the cables 322 to swing open the barriers and opens the gate 314. The trailing pipe section 34B and the coupling 36 can then be moved forward toward the ejection side of the machine 260. At the same time, the infeed speed of the inlet side of the transporting mechanism can be increased to the steady state 100% speed to match the speed of the outfeed side and the trailing pipe section 34A and coupling 36 can be pulled through the machine 260 to become the next sequential leading pipe section. The carriage 312 will then return to a home position relative to the plate 104. The foregoing decoupling process will repeat each time the next coupling 36 is captured by the carriage 312.

In this example, and in any of the other examples, multiple microswitches may be utilized to communicate with the system and controller to speed up or slow down portions of the machine at the proper time. The microswitches can, for example, be positioned under the decoupling device to detect relative movement between the carriage and the plate. The carriage may be slidable relative to the plate and, at critical points, the microswitches can signal when the portions of the transporting system are to be sped up or slowed down. The carriage can be spring biased to the home position so that, when a pipe section is ejected, the carriage automatically returns to the home position.

As noted above, the pipe retrieval machine 260 may be operable so that the feed or pulling direction P can be in either direction. This means that either side of the transporting mechanism can be the infeed or inlet side. In one example, the decoupling device 310 may be reversible within the decoupling region 274 to achieve a direction change in the machine 260 in the same manner described above for the machine 70. Each of the machines 70 and 140 may utilize a ramp 360 at each end of the frame. The ramps 360 can aid in feeding the initial free end of a lateral pipe 32, which may be quite heavy, into the machine and may also assist a laborer in accessing the machine, if needed. The ramps 360 and 276 can be pivotable about the frame to move them to a stowed or storage position, if desired. The ramps may also be detachable for remote storage.

The above disclose pipe retrieval machines operate on being able to detect the location or presence of a joint or a coupling of the pipe and then synchronizing the decoupling device and operation accordingly. In the disclosed examples, a microswitch may be deployed to detect when a joint or a coupling passes the switch. The system and apparatus can them be signaled to begin the decoupling process. Other embodiments, devices, components, and methods may be utilized for detecting the location or presence of the joint or the coupling between the assembled pipe sections. For example, optical switches, contact switches, or various sensors may be utilized. Further, the sensing may occur upstream of the decoupling region and device or may occur directly within the region or on or at the device. The disclosure is not intended to be limited to only the one disclosed example.

The transporting mechanisms of the above-disclosed pipe retrieval machines can be configured to allow for ready compatibility with different diameter pipes. The transporting mechanism in one example can be adjustable to work with a range of pipe outer diameter (OD) sizes, such as from three (3) inches to ten (10) inches nominal, including the couplings. The transporting mechanism can be structured with a retrieval force able to pull up to one half mile of three (3) inch nominal size pipe. The transporting mechanism may be supplied with 2,250 PSI of hydraulic pressure and a minimum of eight (8) gallons per minute of remote hydraulic flow. The transporting mechanism can be structured with a retrieval speed that can transport a pipe assembly at about 90 feet per minute and with the ability accelerate or decelerate without the pipe slipping to a degree that would stop the process at precise locations, i.e., such as +/− about one-half inch.

In the disclosed examples, the pipe retrieval machines include a transporting mechanism and a drive system to power the transporting mechanism. The transporting mechanism can be a friction drive. The friction drive can apply linear actuation to move the length of pipe forward and backward through the machine. The disclosed pipe retrieval machines include two such transporting mechanisms, which can be independently operated and controlled, to independently move sections of the pipe at either end of the machine. One or more microswitches can be used to detect when the pipe is ready and correctly positioned and to trigger operation of a decoupling device. Precise delays and synchronous operation of the parts of the pipe retrieval machines can be flexible and varied to accommodate a variety of coupling, pipe, and/or bell or spigot assemblies and designs.

The disclosed pipe retrieval machines, systems, and methods include a control system that can identify the location of risers and couplings, as well as the joint locking parts, and to actuate a decoupling device. The control system can sync forward and/or reverse movement of a pipe, speeds of the transporting mechanism components, and the like to separate one or more pipe sections from a coupling. The disclosed pipe retrieval machines can include a housing with a storage space, such as for a bin or cart, to catch and store the disassembled couplings. The disclosed pipe retrieval machines can include safety switches and sensors and implement safety protocol, such as by incorporating an emergency shut off feature.

The mobility of the disclosed pipe retrieval machines can be provided by towing. In one example, the machines can be towed via a category two, 3-point hitch designed for use with tractors. External features (pipe ramps, walk-up ramps, a trailer hitch, and the like) of the pipe retrieval machines can be stored on-board in storage locations within or on the frame or can be foldable for ease of transport as a unit.

The disclosed pipe retrieval machines can be powered using a closed center remote hydraulic system of a tractor. Such a system can be rated, for example, at about 2250 psi. The disclosed machines can have an inlet pressure hose and a return hose to the tractor, both of which may be equipped with male or female quick couplers. In addition, the machines may also be provided with an oil case drain hose with a male or female quick connect coupler. In one example, the electronics of the disclosed machines can operate on a 12-volt DC supply. The power can be supplied via an on-board battery or by a power hook up to a trailer or a tractor.

Embodiments of a pipe retrieval apparatus, system, and method are disclosed. For example, a pipe retrieval machine may have features that are refined or added to enhance the operation and performance of the machine. Such refinements or additions can include an improved transporting mechanism, an improved drive system, an alignment feature, a vegetation removal device, a locking part engager, an improved user interface or control panel, and an improved control system operably connected to one or more of these other features.

The transporting mechanism grips a lateral pipe. The drive system drives the transporting mechanism to move or retrieve the pipe. The alignment feature vertically aligns a riser on the pipe. The alignment feature or another part of the machine can include a microswitch that can trigger a delay based on the riser contacting an arm or trigger of the microswitch. The lock actuator can actuate a locking part of a pipe coupling to release the joint. The lock actuator can be actuated electronically or through a hydraulic cylinder. The user interface or control panel can receive input from a user and provide output information to the user. The control system can be used to operate, control, and/or monitor virtually any aspect of the disclosed pipe retrieval machines.

The system can be all electric, including the actuators, if desired. The system can utilize pneumatic cylinders for the actuators and other components, also if desired. As disclosed herein, the system can utilize hydraulic components, such as for the actuators, if desired. The control panel can include the capability to run each part of the pipe retrieval machine, including any electronic, pneumatic, and/or hydraulic, components and systems. The various operations, controls, and systems of the pipe retrieval machine may also include safety features and operational hierarchy to increase the safety of the machine for the operators and users. The hierarchy, procedures, safety features and methods, and the like of the pipe retrieval machine may be expressed as an operation method of the machine.

Examples of pipe retrieval machine set-up and control system operations, components, features, safety features, and methods for the disclosed machines are described below. In one example, the pipe retrieval machine is set-up by first being moved to the desired location and position in a field. This can be done using a tractor or other suitable vehicle or transport method to deliver the machine. The operator can connect a power cable of the machine to a power source, such as a 12 v DC source. The power source may be the tractor or vehicle 12 v power system. The cable can be coupled to an electronics enclosure of the pipe retrieval machine, such as depicted in FIG. 30. As is known in the art, the operator can then connect hydraulic lines to a power unit configured to run the hydraulic system of the machine. The power unit may be the tractor. One line is the return line and another line is the supply line or pressure line. In one example, on the electric power unit, the pressure line may connect to an upper connector and the return line may connect to a lower connector.

As is also known in the art, once the electric and hydraulic systems are connected, the operator can switch the power unit on and may allow the machine to run, such as for a few minutes, for a brief warm-up to warm up the pumps, fluid, and electronics. The operator can then switch the power unit control valve (such as downward on the electric unit) to open the valve(s) and start flow of the hydraulic fluid. The operator can also verify that the hydraulic flow is in proper direction through the lines. The pipe retrieval machine should then be ready to run and retrieve pipe from the field, as discussed above.

Referring to FIG. 30, the control system may include a control panel with multiple devices, i.e., buttons, switches, knobs, and/or the like, that are operable by an operator to control all or most aspects of the pipe retrieval machine. In the disclosed examples, the pipe retrieval machine may have one or more safety features and other optional features that are accessible and/or controllable via the control panel. The control panel is configured in this example to provide operational control of the pipe retrieval machine.

FIG. 31 shows a close-up view of one example of a control panel for the pipe retrieval machines disclosed herein. Before the machine can be used, all emergency stop buttons (see further below, and FIG. 30) must be released. The machine will otherwise not function and will remain in a powered down state. Once released, the emergency stop buttons are available to stop the machine in an emergency. In one example, the emergency stop buttons may each be a twist to release type button, after being activated.

The control panel in one example nay include a start button and a stop button. The start button can be used to start the machine and the stop button may be used to stop the machine. The control panel also includes, in this example, wheel switches to control the position (OPEN/CLOSE) of the wheels to clamp or release pipe. The wheel switches may only function when the machine is plugged in and all emergency stops are released. If the machine is not plugged in or an emergency stop is activated, power is removed, and the wheel switches do not function. In this example, when the machine is stopped by emergency, the wheels remain in the closed position or in the position they were in at the time the machine was stopped. If the machine is powered up, i.e., plugged in and all emergency stops are released, the wheels can be repositioned. The wheels can be separated (OPENED) by holding both wheel switches, in this example, downward, until adequate clearance between the wheels is achieved. The switches can be raised and latched up to engage wheel cylinders to reposition (CLOSE) the wheels closer together for transferring pipe through the machine. In one example, the wheel switches may light up when activated to indicate the wheels are in the closed position to the operator. In this example, when power is off, the hydraulic valve reverts to a neutral position so that no hydraulic pressure is applied to the wheels.

When ready to use the machine, a pipe assembly may be loaded into the machine by inserting the pipe between the wheels. The operator can then press or move the wheel switches up, whereby they may latch to stay in the operating (CLOSED) position, and the switch lights may light up when engaged to indicate same. The control panel in one example may have ramp switches, which may be used to adjust a ramp angle, as desired, to accommodate the incoming pipe.

In one example, the control panel may include a jog control function. In this example, the control panel includes a jog switch and a jog safety button. An operator may wish to manually load and move pipe through the machine, such as for set-up. Also, on occasion, a pipe joint may not be decoupled when pipe is running through the machine. In either case, and particularly in order to retry a failed decoupling, the jog function may be utilized. To do so, the machine must be in a stopped state. The machine can be stopped using the stop button on the control panel. The jog function can move the wheels in either direction, as desired, depending on which direction the jog switch is moved. Pipe that is passing through the machine can then be moved left or right by depressing and holding the jog button while moving the jog switch left or right, respectively. The wheels can stop moving when either the switch is moved or returned to a neutral position or the jog safety button is released. The release actuator is configured so that it does not fire, i.e., does not move or operate with the machine in the jog mode.

In one example, the pipe retrieval machine may have both an automatic mode and a manual mode of operation. In the automatic mode, the machine can operate the actuator to move and release the CLIC style retainers automatically as pipe passes through the machine to decouple pipe sections. In the manual mode, the actuator may be disengaged, and thus not move, and the machine can be configured to pause while an operator manually removes a spline to decouple two pipe sections. The control panel may thus have a mode switch. The mode switch may be used to change or switch the operation mode between automatic and manual. The control panel or switch may include a light to indicate automatic mode, manual mode, or both using different light colors or the like.

To restart the machine, the operator may press the run or start button. The pipe retrieval machine can then automatically run pipe through the machine and decouple the pipe couplers and pipe sections. The operator can again use the stop button to stop the machine when a length of the pipe assembly is completed or when there is an error or malfunction. When a new pipe assembly is loaded or the malfunction is addressed, the operator can press the start or run button to start the machine again.

The operator may switch to the manual mode, when desired, using the mode switch. An indicator light again may illuminate, if present, to indicate manual mode operation. The operator can press the run or start button again when ready. The pipe retrieval machine will automatically run pipe through the machine and compress two pipe sections together at the coupler, releasing tension on the coupler and thus the spline for easy spline removal. The machine will then pause indefinitely while the operator manually removes the spline to decouple the pipe sections. The operator can then restart by pressing and holding the run or start button, which will separate the two pipe sections, until the coupling passes through the gate to restart a decoupling cycle. Again, the operator can continue in manual mode or restart the automatic mode. The operator can press the stop button when a pipe assembly is finished or if an error or malfunction is encountered.

Figure 32:
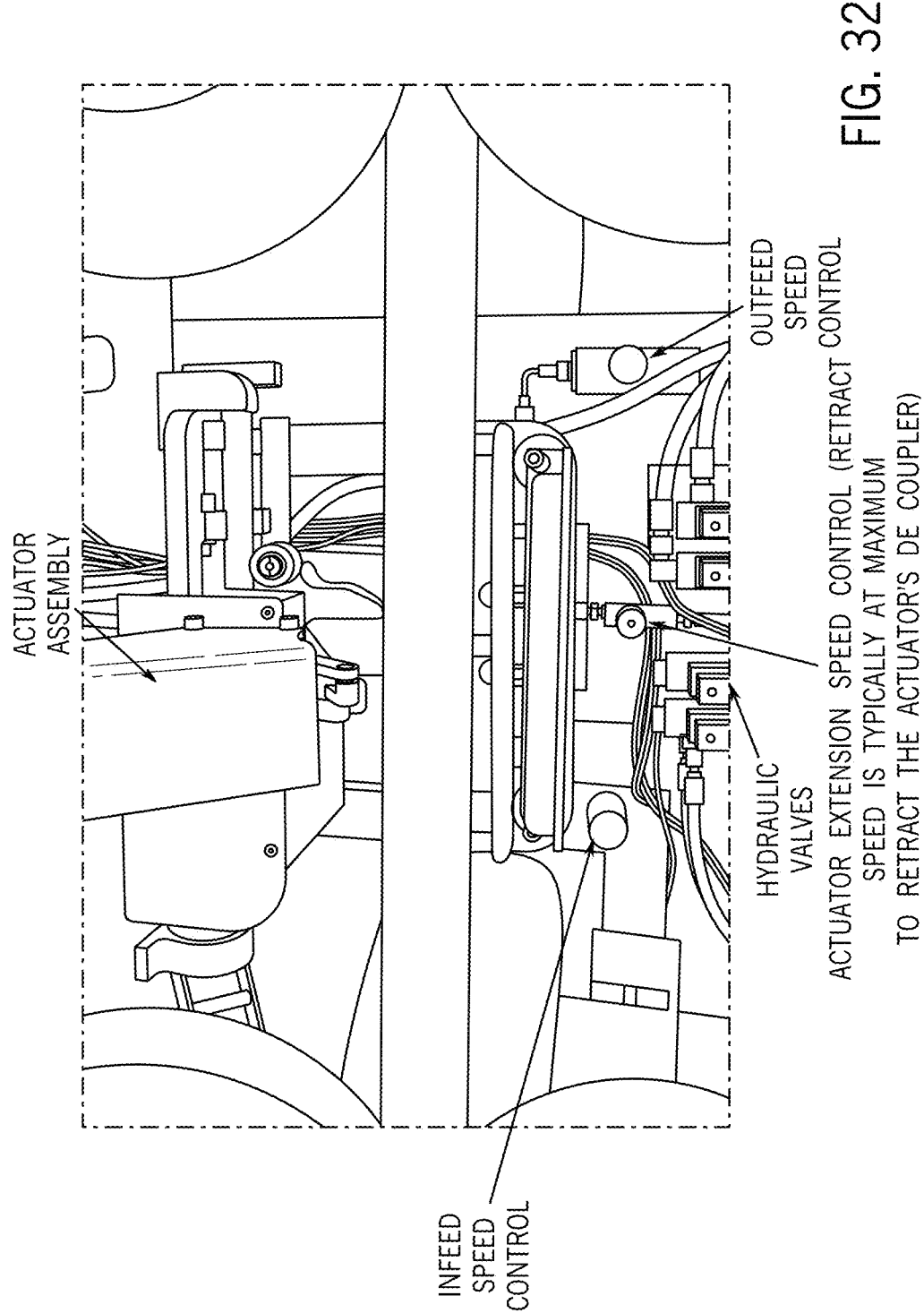
FIG. 32 shows a top view of an actuator portion of the pipe retrieval machine of FIG. 30.

The disclosed pipe retrieval machines may include potential safety shielding, safety functions, alternate control console or panel layouts, and/or the like. FIG. 32 shows that the machine may include pipe infeed speed control and outfeed speed control capability. In one example, the machine may include manual knobs or buttons that can be used to adjust the speed of each. The machine may also include a speed control for extension and retraction of the decoupler of the actuator into and out of the decoupling region. The speed controller can be any type of knob, button, valve control, or the like to control the hydraulic actuator speed.

Figure 33:
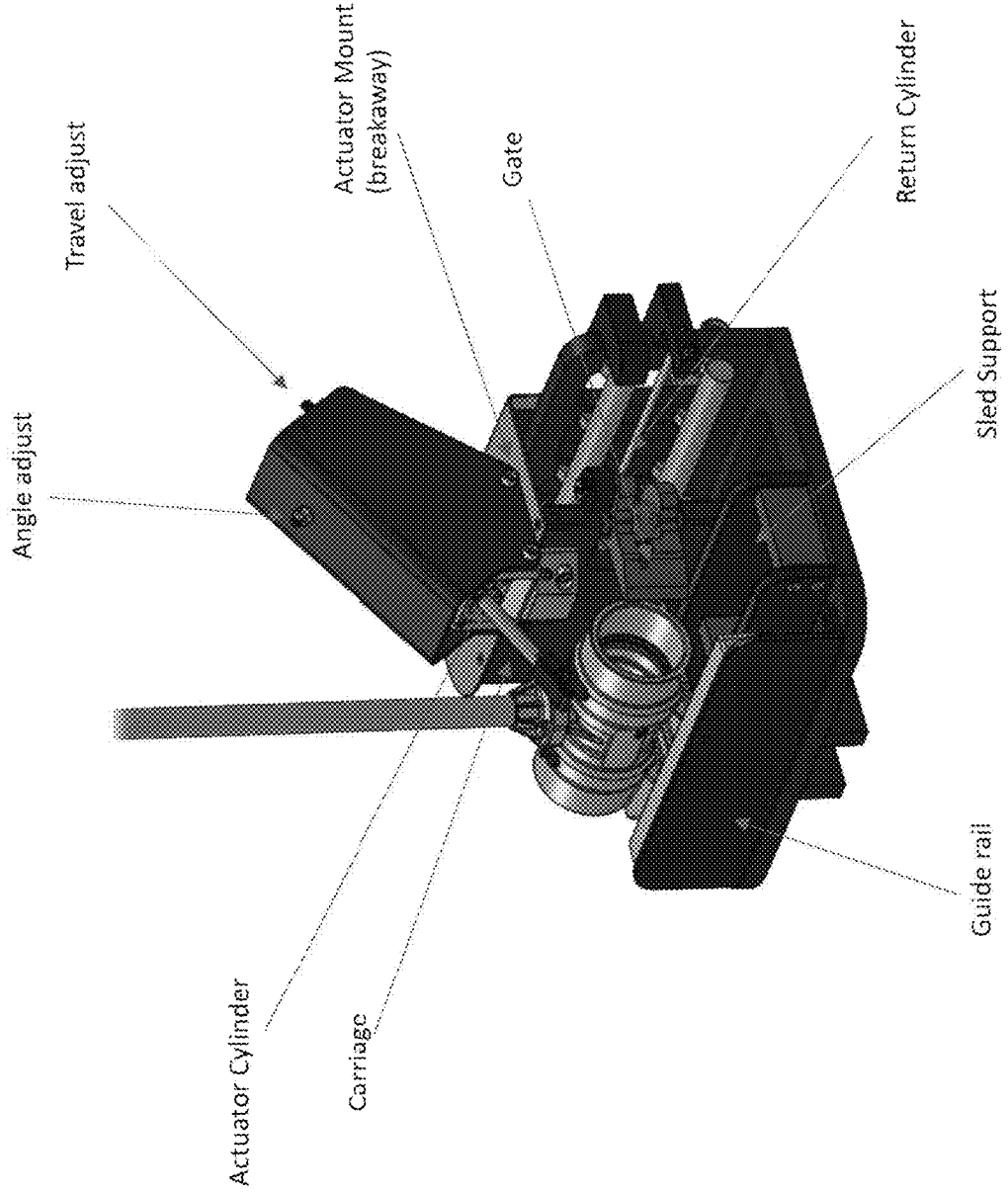
FIG. 33 shows a perspective view of one example of a decoupling region and actuator of a pipe retrieval machine according to the teachings of the present disclosure.
Figure 34:
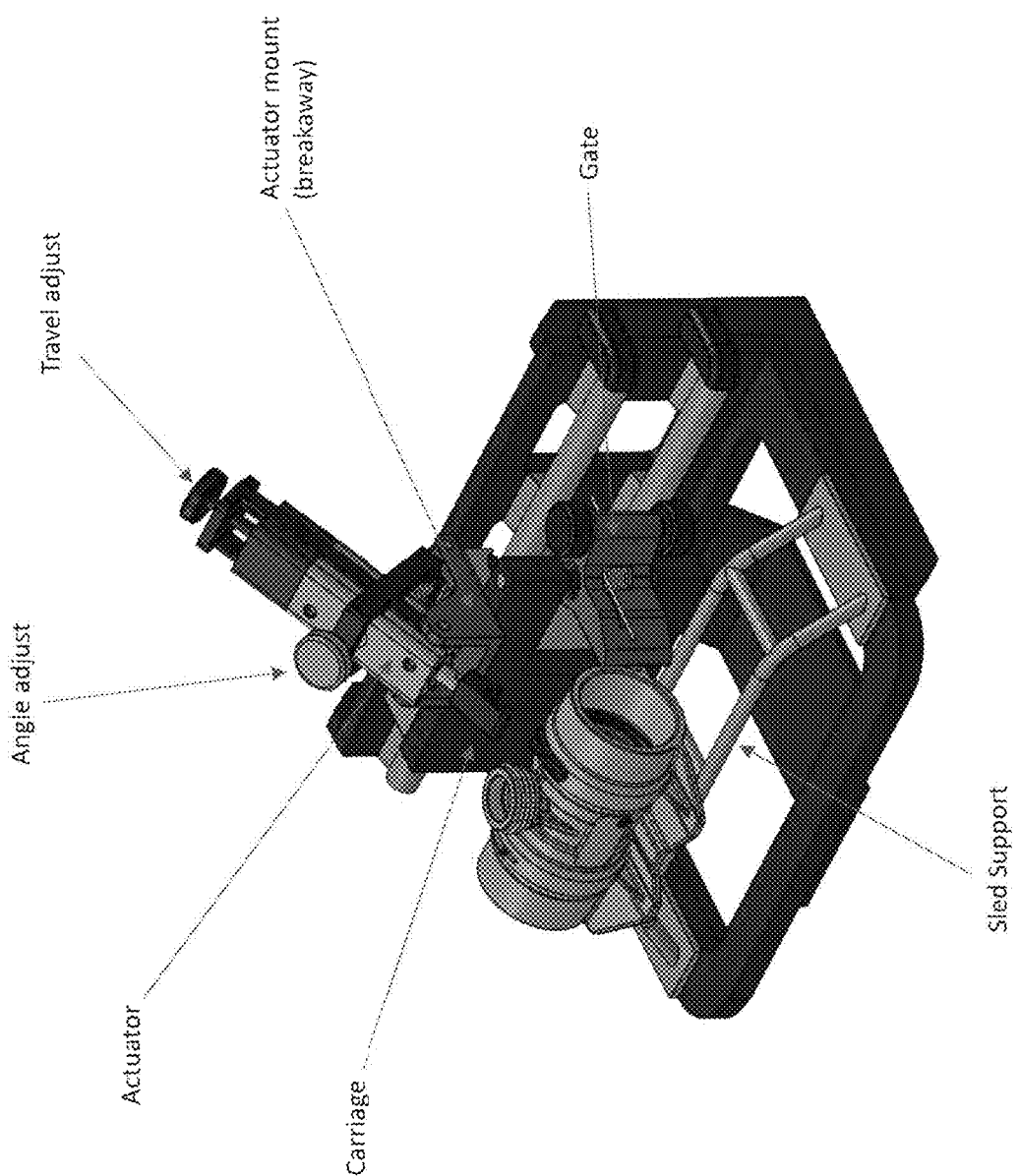
FIG. 34 shows the components of the decoupling region and actuator of FIG. 33 with certain parts removed to expose additional components.

FIGS. 33 and 34 show a view of the decoupling region of a pipe retrieval machine according to the teachings of the present disclosure. Various components of the decoupling region are noted and include the actuator, a breakaway actuator mount, a reversible gate, the actuator cylinder and rod, the carriage, the sled or coupling support, and a guide rail. Numerous safety features may be incorporated into these components of the machine.

Figure 35:
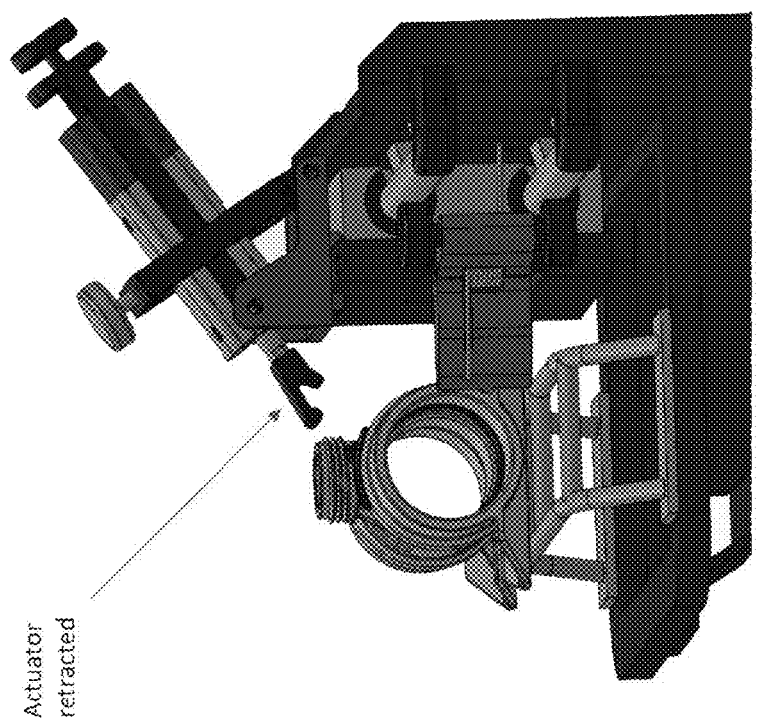
FIGS. 35-38 show side perspective views of the decoupling region and actuator of FIG. 34 with the actuator having undergone progressive actuation.
Figure 37:
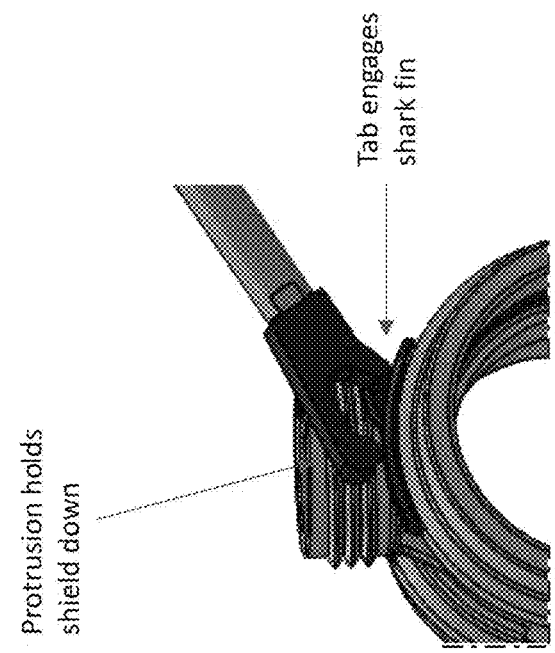
Figure 36:
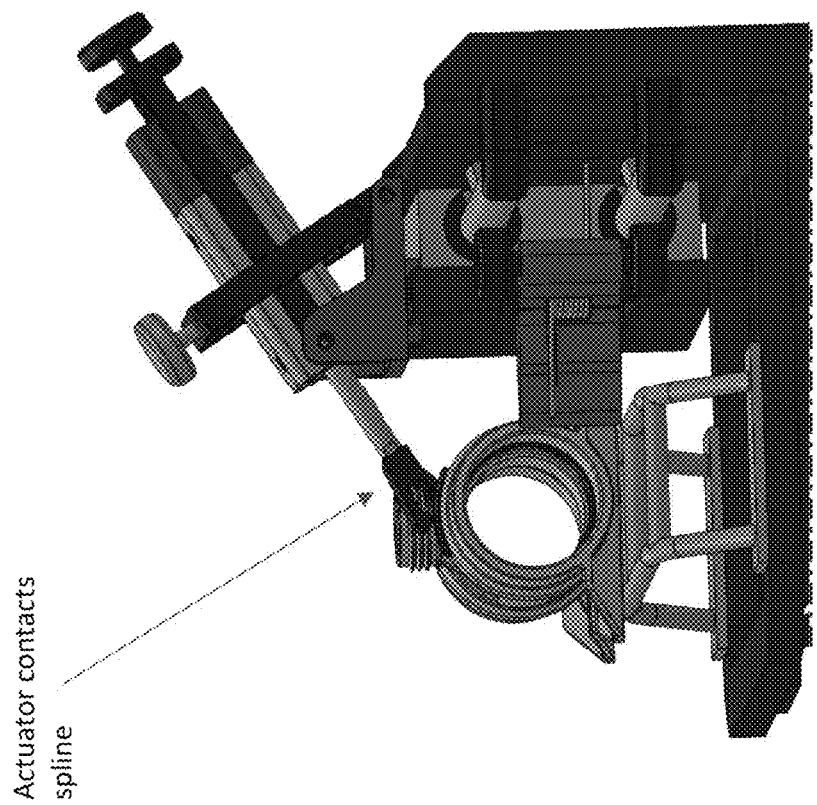
Figure 38:
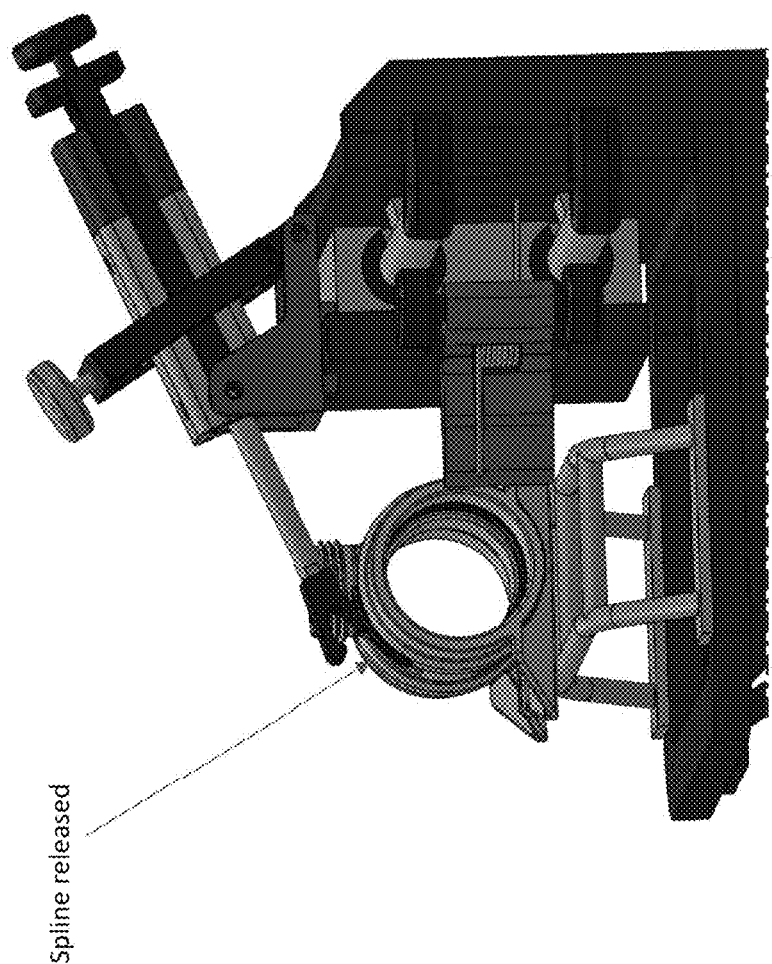
Figure 40:
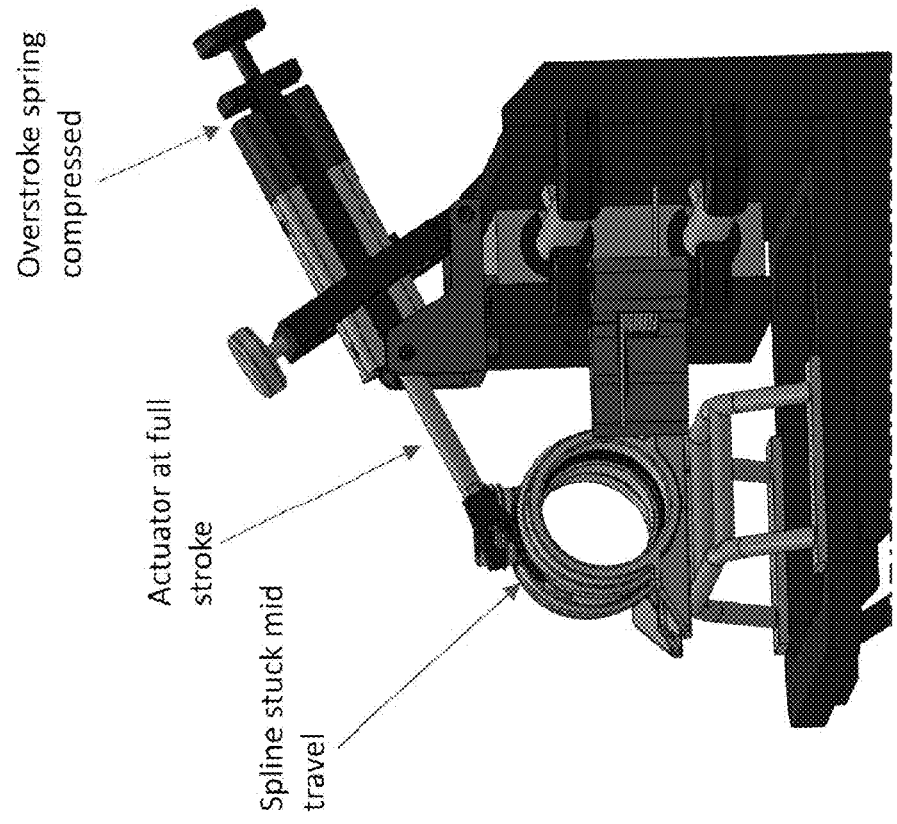
FIGS. 39-42 show side perspective and side views of the decoupling region and actuator of FIG. 34 with one example of an actuator safety feature according to the teachings of the present disclosure employed.
Figure 39:
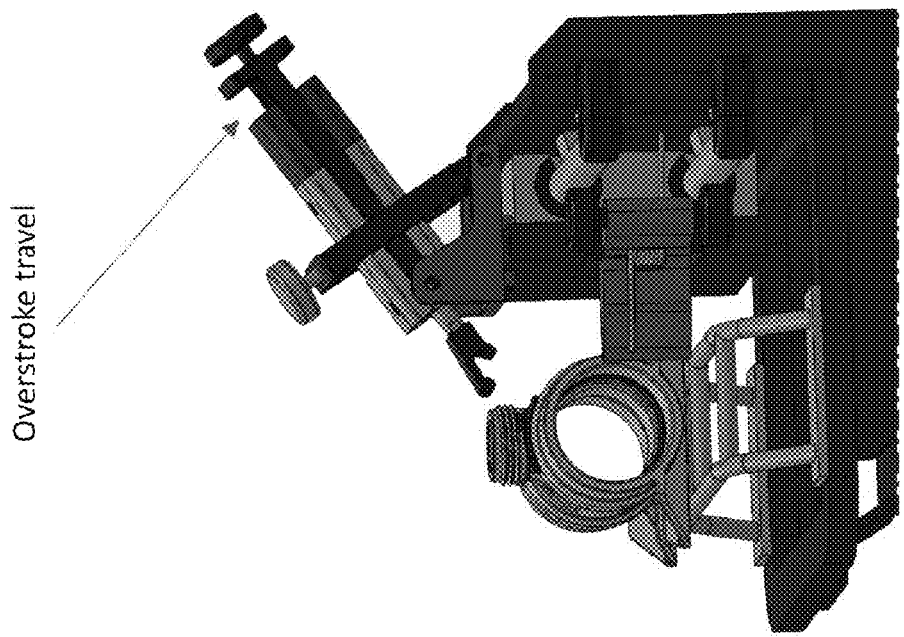
Figure 42:
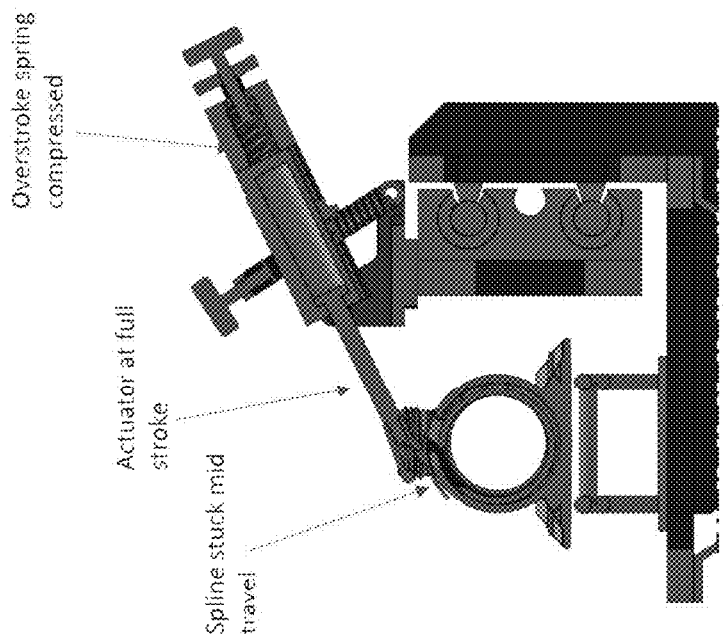
Figure 41:
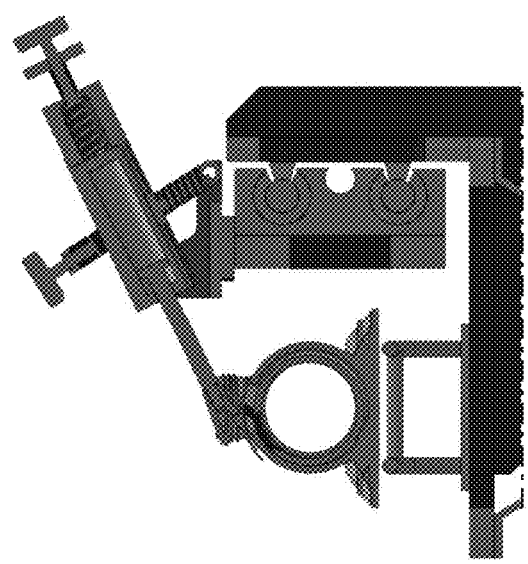

FIG. 35 shows the actuator and rod and cylinder in a retracted position. FIGS. 36 and 37 show the actuator and rod extended so that the decoupler is in contact with the spline of the pipe coupler. FIG. 38 shows the actuator in a fully extended position with the spline of the pipe coupler pushed to a released position, as described above. However, sometimes the spline may be stuck in the pipe groove and not be able to rotate to the released position. FIGS. 39 and 41 show that the actuator cylinder may include an overstroke spring that biases the actuator rod toward the retracted position. FIGS. 40 and 42 show a situation where the spline is stuck in mid travel. The actuator rod is at full stroke, which could break the spline. However, the overstroke spring is compressed by the return force of the stuck spline. This protects the actuator and the coupler and spline from damage. The mechanism limits the force that can be applied to the spline, such as to about 30-50 lbs., which is determined by the force at which the spring compresses. The spline could otherwise be damaged by the force of the cylinder, which may achieve 2000 lbs. However, as noted below, the machine may need to be stopped to deal with this malfunction and to manually separate the pipe sections before the machine is restarted again.

Figure 43:
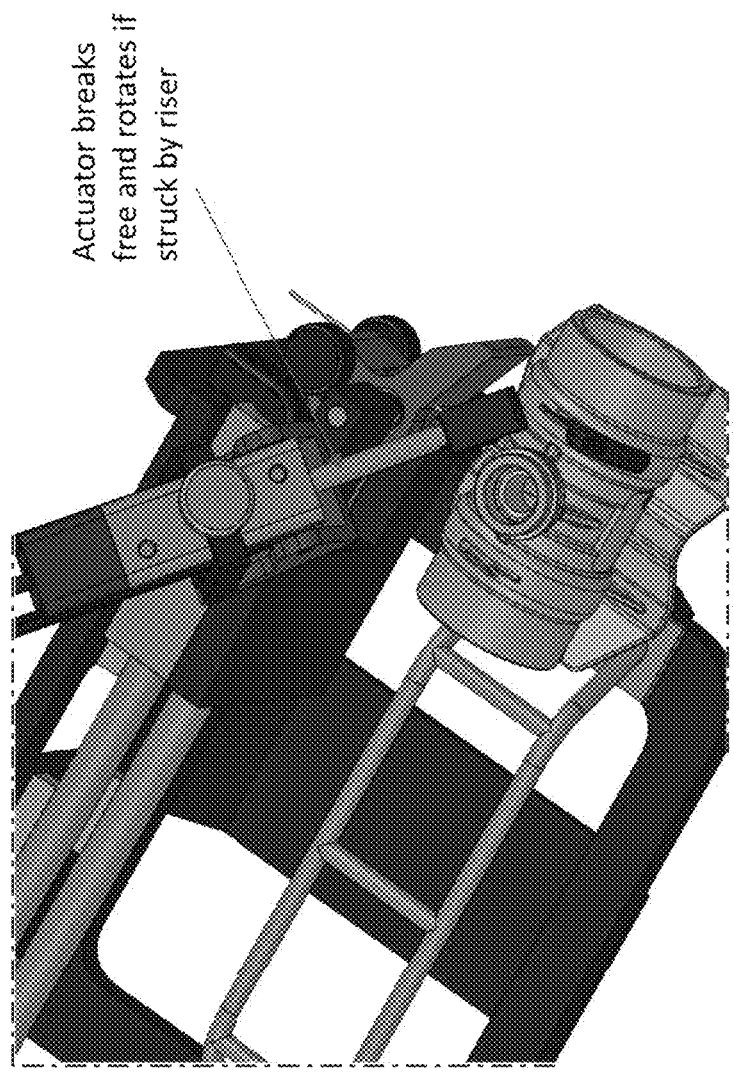
FIG. 43 shows a top perspective view of the decoupling region and actuator of FIG. 34 with one example of an actuator safety feature according to the teachings of the present disclosure employed.

FIG. 43 shows another situation where a pipe coupler may pass through the machine with the vertical sprinkler riser still attached (though not shown) and where the riser passes through the decoupling region prematurely and/or with the actuator cylinder and rod in the extended position. If this occurs, the sprinkler riser would hit the actuator, potentially causing damage to the actuator, cylinder, rod, and/or decoupler on the end of the rod. As shown in FIGS. 34 and 43, the actuator may be mounted onto the pipe retrieval machine with a breakaway mount. In one example, the actuator may be mounted on a bracket in such a way that the actuator and/or portions of the mounting bracket can break away from a support attached to the machine, such as to the frame. This can allow the actuator to rotate out of the way, allowing the riser to pass, and avoiding potential damage to the actuator and its components, as well as potential damage to the coupler, riser, and spline. The breakaway mount and function can be provided in numerous different ways and with a variety of different parts.

Figure 45:
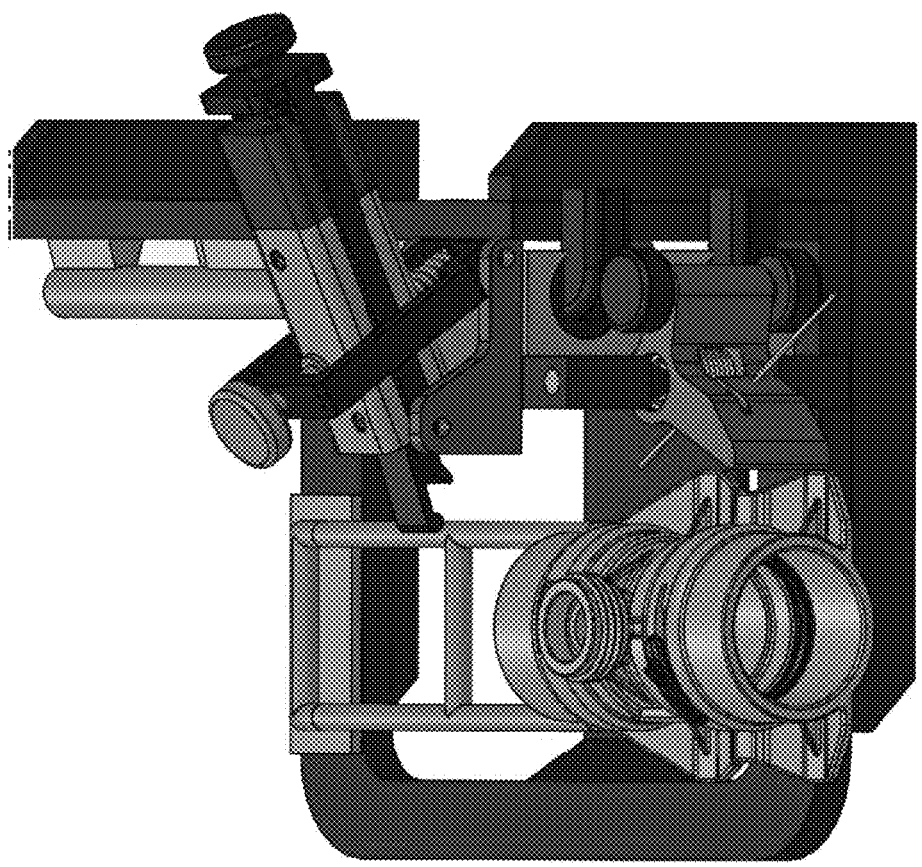

FIGS. 44A-44C and 45 show another feature of the decoupling region of FIG. 34. In this example, the gate is configured to hold or delay the pipe coupler in the region as the actuator performs the release movement and function, as described above. In this example, the gate may be spring or otherwise biased to an open position from a neutral blocking position, which is shown in FIG. 44A. As the carriage and pipe coupler move through the decoupling region, the gate is closed but moves with the carriage. The gate has one blocking arm that bears against the leading end of the carriage or coupler when the pipe coupler reaches the carriage. The gate has a second arm with a roller at the end of the arm. The roller rides along a rail, which keeps the gate in the closed or blocking position. As the roller reached the end of the rail, as shown in FIG. 44B, the gate is permitted to swing or rotate fully open by the spring or biasing force, as shown in FIGS. 44C and 45. The pipe coupler is then allowed to pass through the decoupling region and the machine.

Figure 46B:
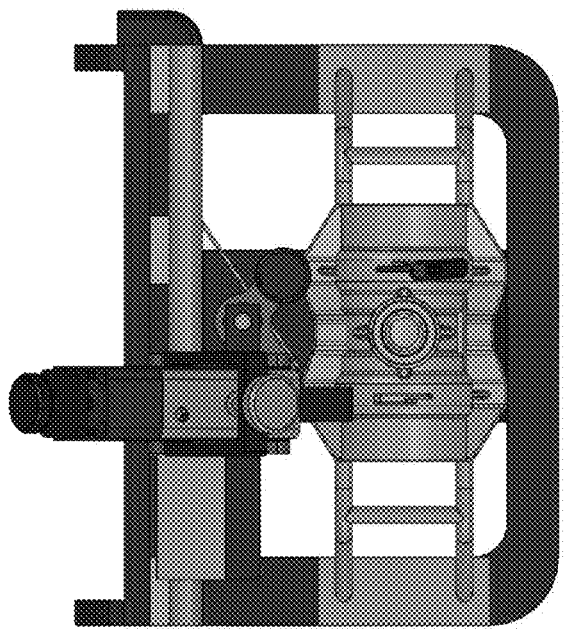
FIGS. 46A, 46B, and 47 show top views of the gate of FIG. 44 with one example of a gate safety feature according to the teachings of the present disclosure progressively employed.
Figure 46A:
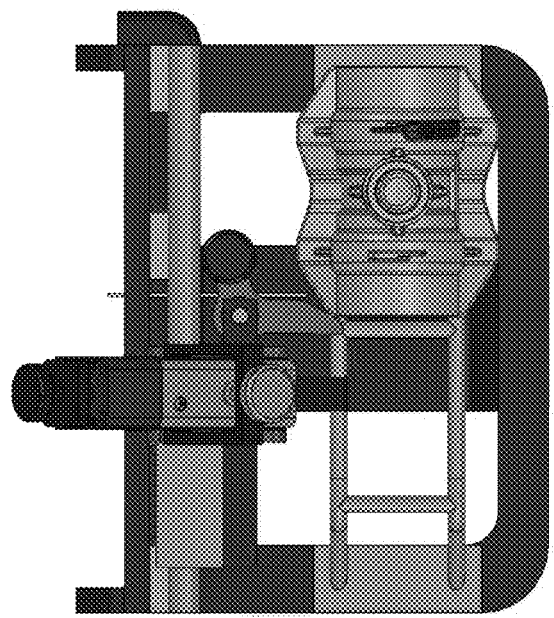
Figure 47:
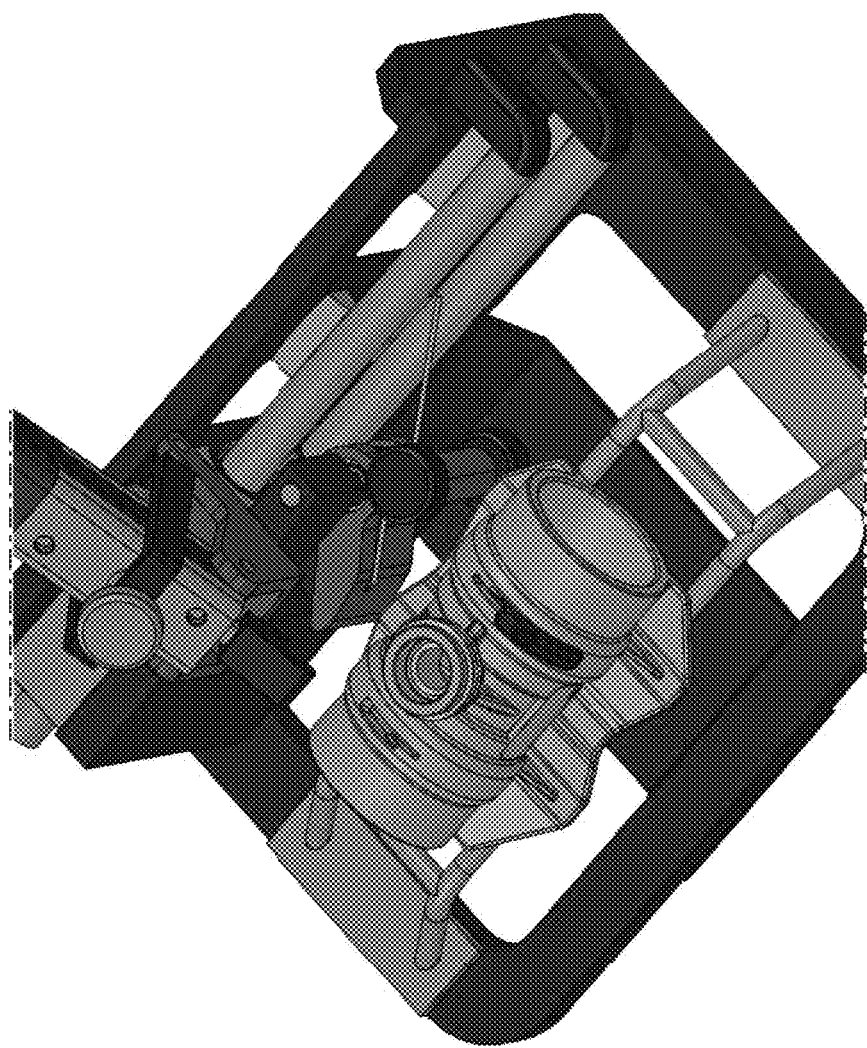

On occasion, a trailing pipe and the pipe coupler, or a failed decoupled pipe coupler, may reverse and travel back through the decoupling region, as shown in FIG. 46A. In such a case, the disclosed gate is configured to rotate out of the way, as depicted in FIGS. 46B and 47. In this way, the gate is not damaged by such a reverse in traveling direction. The gate may be configured with a breakaway mechanism that holds the neutral blocking position until a large enough force Is achieved by a reverse traveling pipe. Alternatively, a simple spring or other biasing mechanism may be utilized that must be overcome for the gate to swing open in the opposite direction.

The roller, gate, and rail configuration can be altered from the example described above. For example, the arrangement can utilize two gate rollers and two rails. The rail can be configured with an end, such as a rounded end, that smoothly allows the roller to bypass and ride along the rail end. The carriage, guide rail, and carriage support can also vary in configuration and construction and still guide the carriage through the decoupling region of the pipe retrieval machine.

Figure 48:
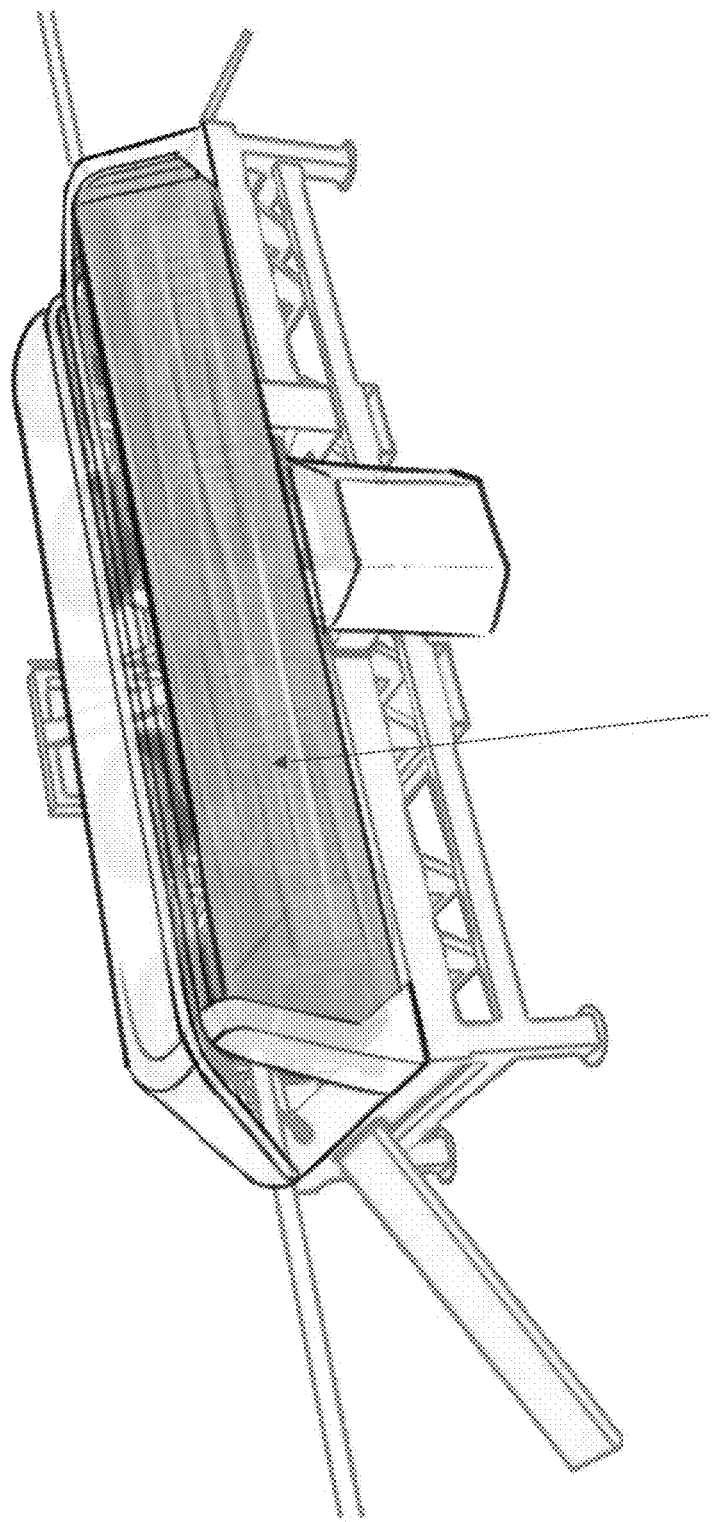
FIGS. 48-52 show perspective views of a piper retrieval machine including different examples of machine safety features according to the teachings of the present disclosure employed.

The pipe retrieval machine may include other types of safety features as well. FIG. 48 shows one example of a presence detection device feature that stops the machine if a foreign object is detected within the decoupling region or between the wheels. In one example, the machine may include a light curtain along the length of the machine. A light curtain is a known opto-electronic device that uses IR transmitter and receivers to create a barrier across the machine. If the light curtain detects a foreign object, such as a person or a limb of a person, a tree branch, or the like entering the machine, the machine can be configured to shut down.

Figure 49:
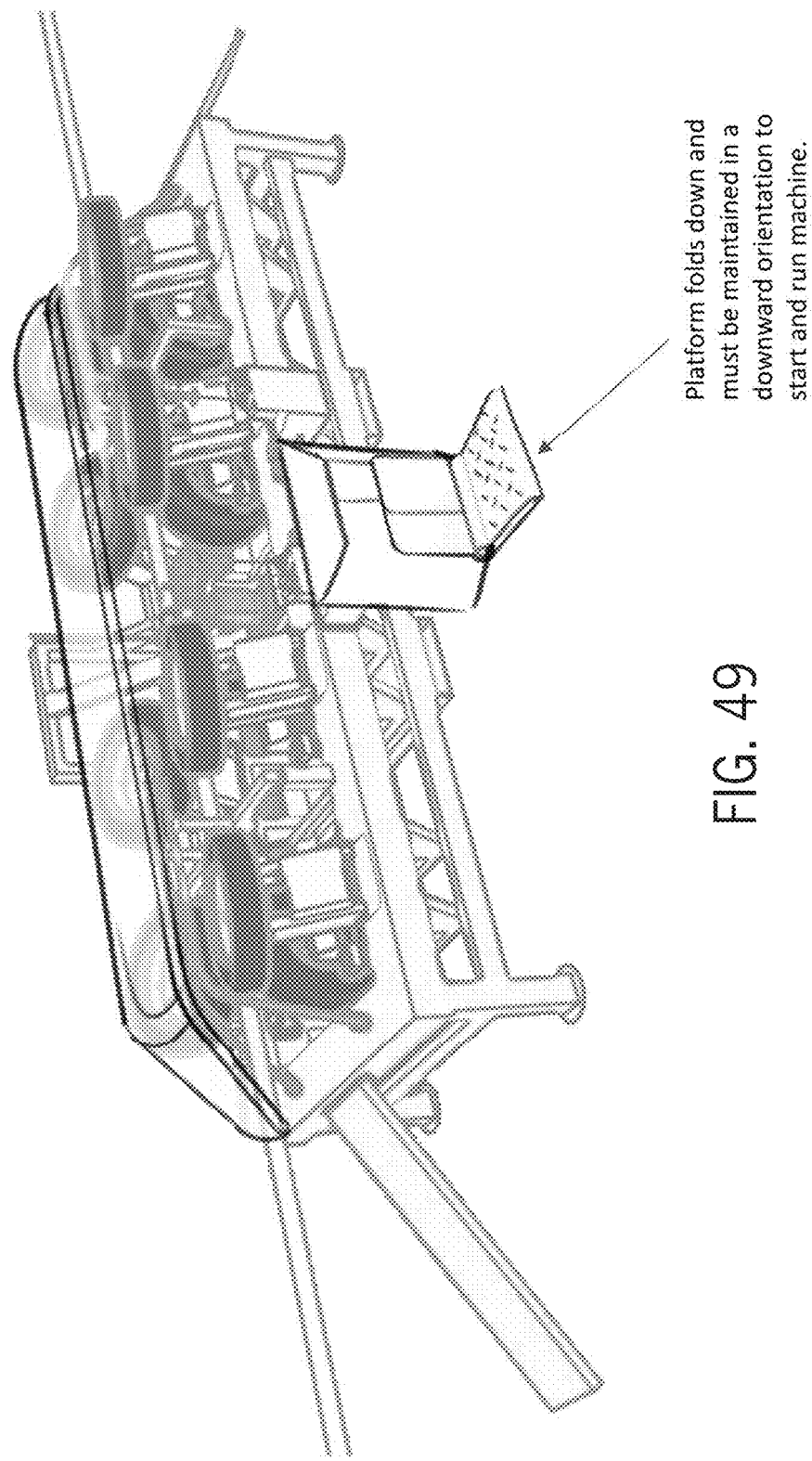

FIG. 49 shows another example of a safety feature associated with the control panel. In this example, the control panel may be positioned near a platform on which the operator should stand while operating the machine. The platform can be configured to pivot downward when manually lowered and stood on by the operator. The platform can be configured to automatically raise when the operator steps off or can be configured to be raised only manually. In either case, the pipe retrieval machine may be configured to stop when the platform is raised and to run or be capable of running when the platform is lowered.

Figure 50:
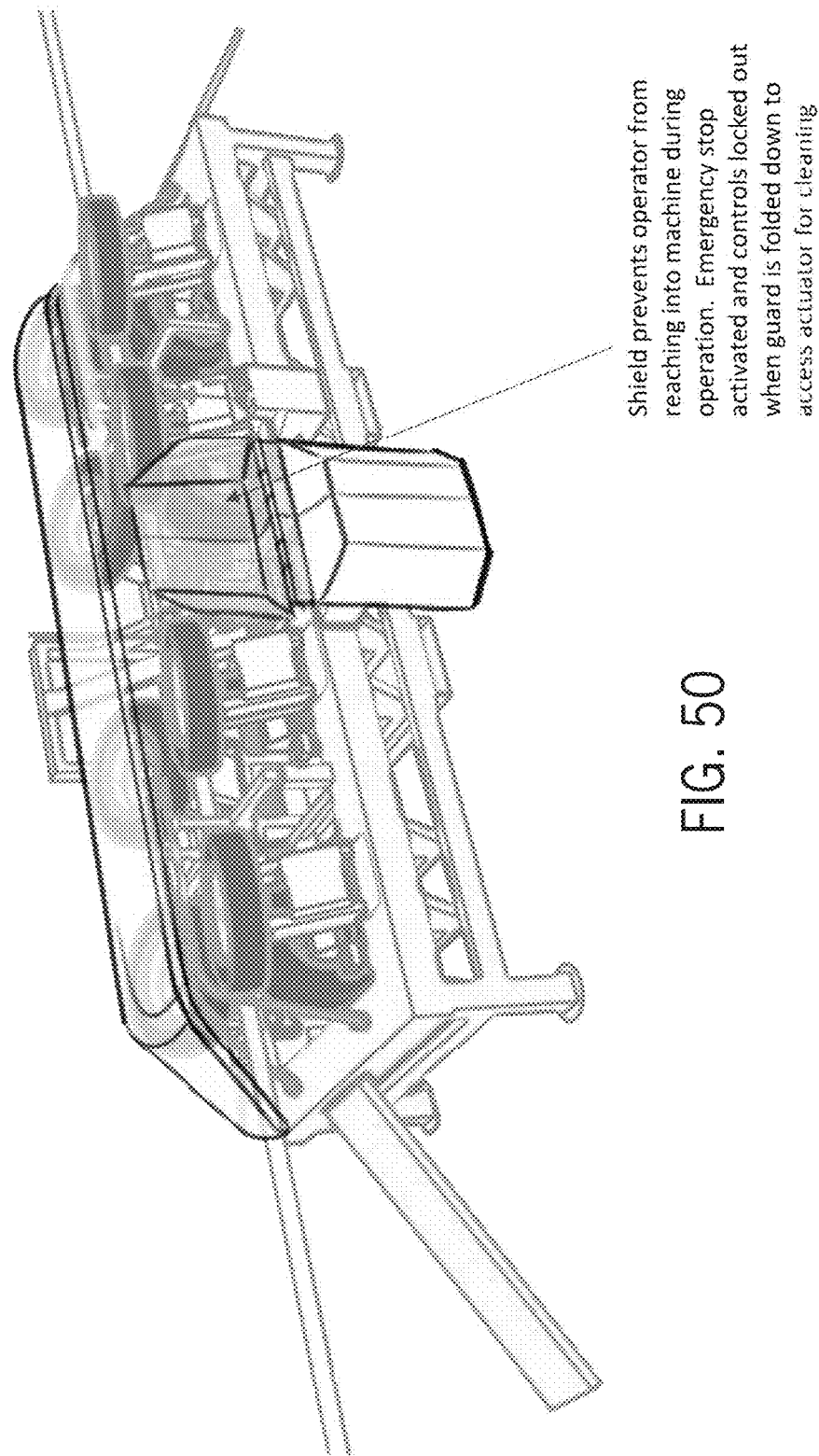

FIG. 50 shows another example of a safety feature associated with the control panel of the machine. In this example, the control panel may include a protective shield or screen that can be raised up to block the operator from reaching into the machine while operating the controls. The shield may be capable of being lowered to access and clean the decoupling region, but the machine may be configured to stop when the shield is lowered. The shield be formed to prevent access to the controls when lowered or may be configured to deactivate the controls and stop the machine when lowered. The screen or shield may be transparent or translucent to allow the operator to see within the machine while operating the controls.

Figure 51:
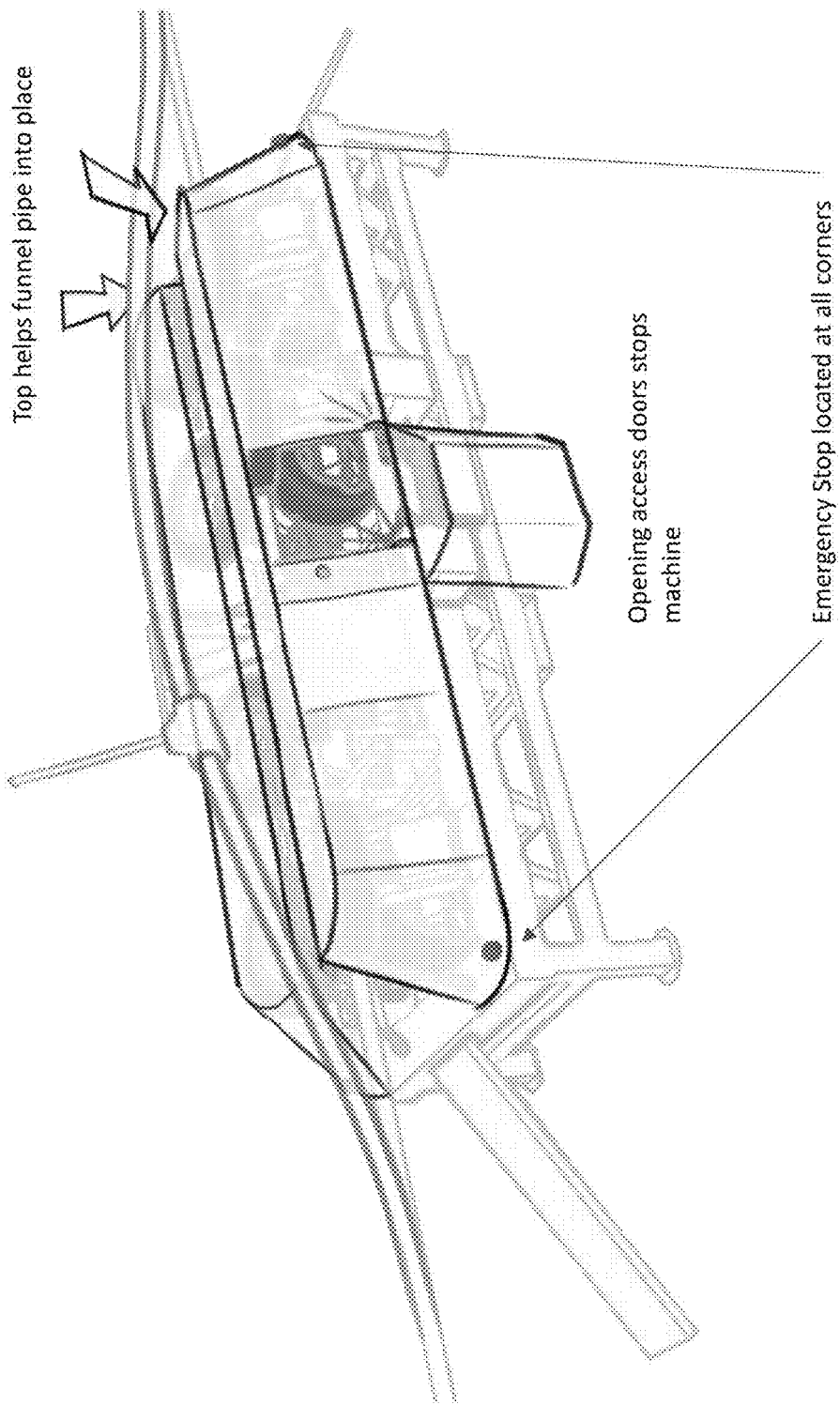
Figure 52:
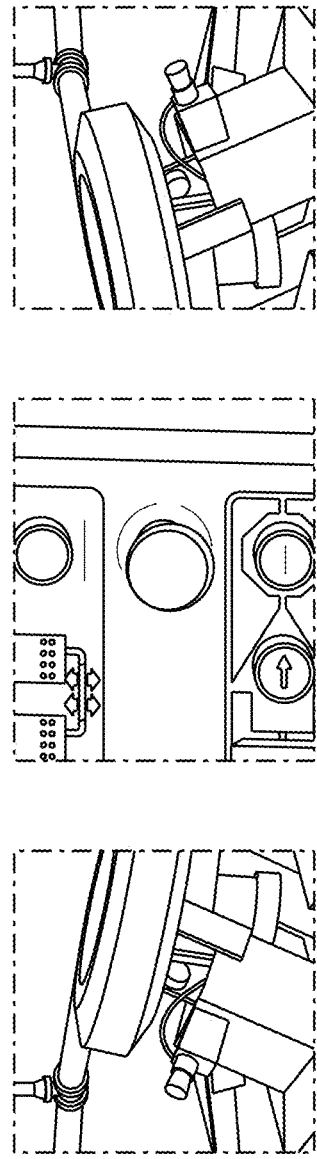

FIGS. 51 and 52 show another example of a safety feature associated with the pipe retrieval machine. In this example, the machine may have one or more emergency stop buttons. One of the stop buttons may be provided on the control panel, However, additional emergency stop buttons may be provided on the machine remote from the control panel. In one example, the machine may include at least one emergency stop button at each end so that a user may quickly stop the machine while at the loading end or the ejecting end if an emergency stop is required.

Figure 53:
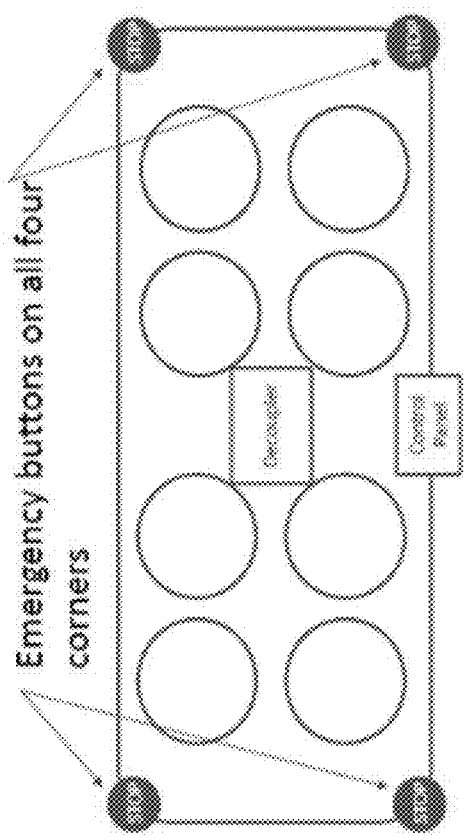
FIG. 53 shows a top view of a pipe retrieval machine including one example of a machine safety feature according to the teachings of the present disclosure employed.

As shown in FIG. 53, an emergency stop button may be placed on all corners of the pipe retrieval machine. In that way, the machine can be stopped from any side by an operator or other user in the event of an emergency. The control panel can be centralized, as in FIG. 30, with functions that are clearly communicated to the operator. The functions of the control panel may also be differentiated from one another to reduce the risk of error during operation. Further, a remote control device may be optionally provided, and which can allow the operator to turn the machine on or off from a distance. All other commands and functions of the machine and the control panel may be operable and accessible via the main control panel of the machine for safety reasons.

Figure 54:
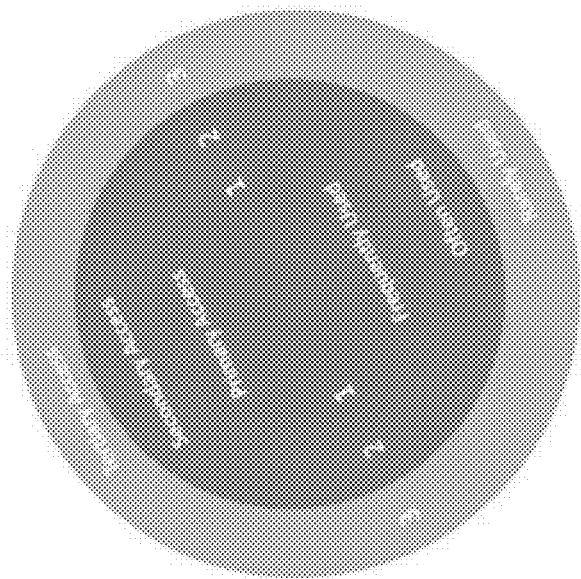
FIG. 54 shows a chart depicting of one example of a hierarchy for various operations and controls of a pipe retrieval machine including various safety features according to the teachings of the present disclosure.
Figure 55:
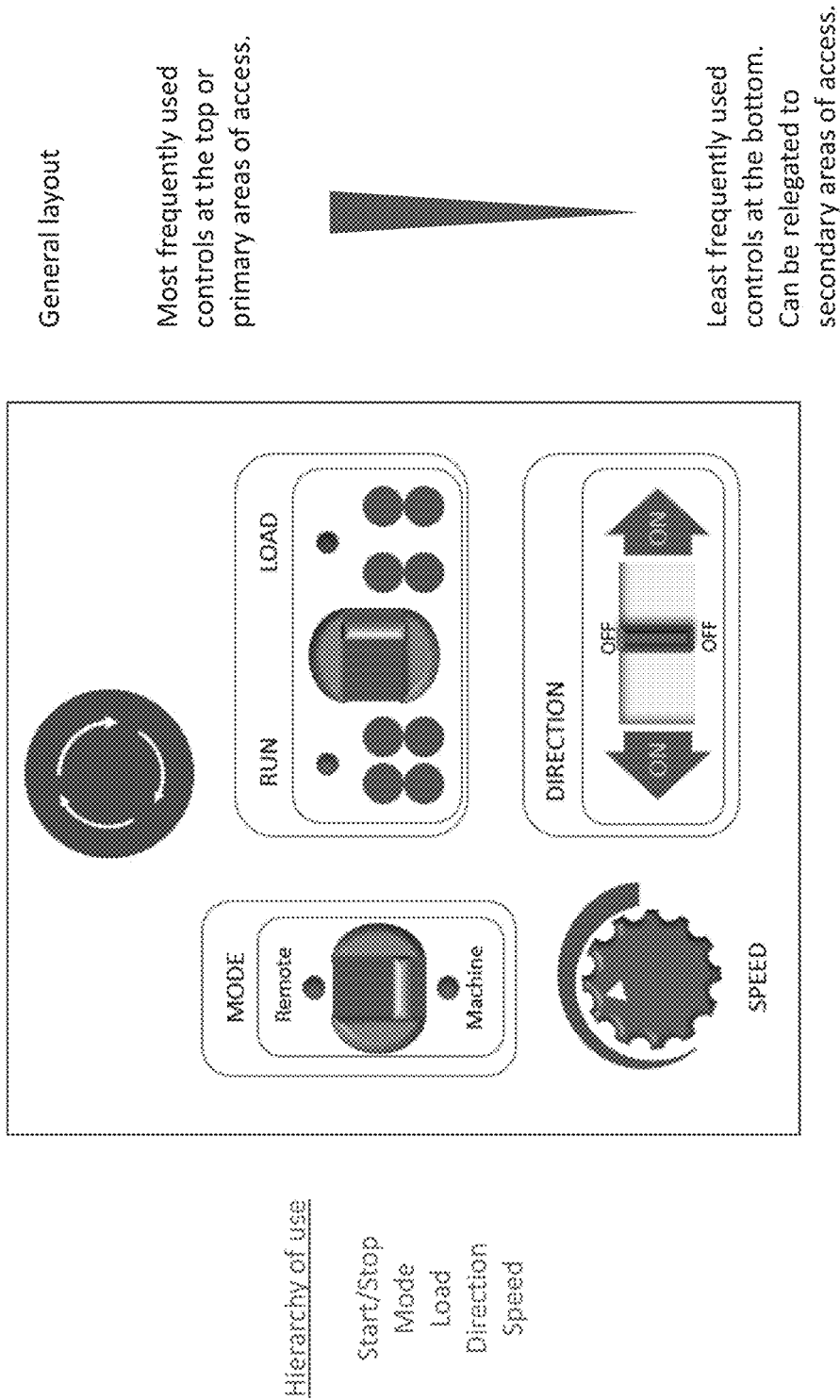
FIGS. 55-60 show examples of the operations and controls and safety features according to the teachings of the present disclosure for a pipe retrieval machine.

The control panel layout can be varied from the above example shown in FIGS. 30 and 31. Depending on the machine functions and features, the control panel can be laid out to provide logical ergonomic positioning of the various controls. The basic controls of the machine are start/stop, mode, pipe load, pipe direction, and pipe speed, in the likely order of frequency of use from most to least used. For example, referring to FIGS. 54 and 55, the most frequently used controls may be placed in a manner so that they are the most easily accessed. This doesn't necessarily mean that the most used controls are positioned at the top of a control panel, but instead may be positioned "front and center," which means for a user when that user has assumed the position of the operator. Likewise, the least frequently used controls may be positioned in a manner less accessible to the operator.

However, this need not be a steadfast rule. For example, if a rarely used control requires benefits that are only available to the operator when positioned in the primary access area, the rarely used control may reside in the primary or front and center access area. For example, a control may require visibility to the operator, even though it might be frequently used. That control may be better off residing in the primary access area.

Figure 56:
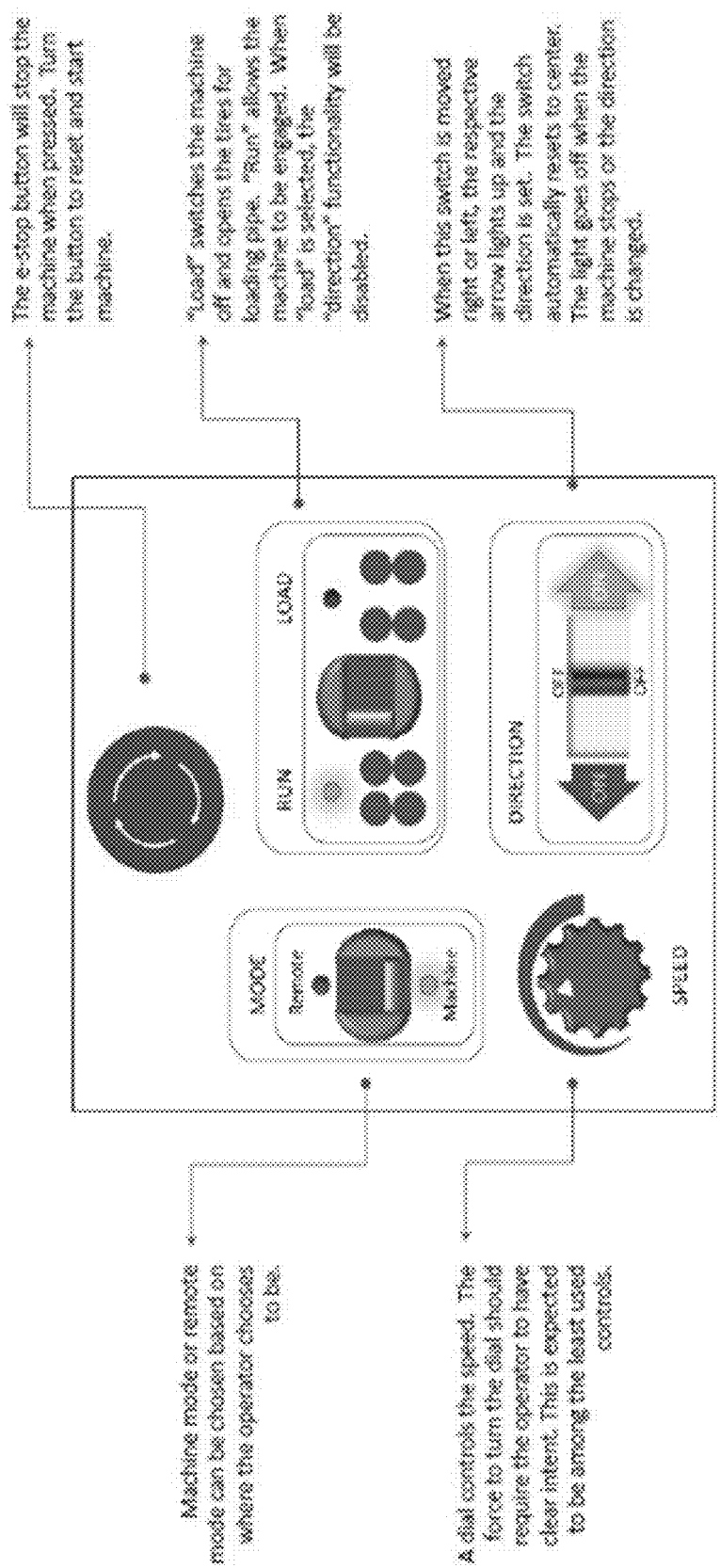

Referring to FIG. 56, the design of the controls on the control panel may be better utilized when the controls are distinct from one another, clearly marked, unambiguous, and matched to the functions that they control, where possible.

For example, a left-right function, such as the above mentioned jog switch, is more intuitive if provided as a left right motion switch instead of as an up/down switch. The current state of the pipe retrieval machine should be readily apparent and known to the operator. For example, if the machine is powered on and ready to be loaded with pipe, the power button may be configured to be lit green and the load button can be configured to be lit red. This would let the operator know that while the machine is powered up (green light), it will not run while being loaded (red light).

In other examples also shown in FIG. 56, a machine mode switch may be provided with a machine mode and a remote mode. An operator may select the mode, depending on where the operator chooses to be while the machine is running. A rotary dial may control the speed. The force necessary to turn the dial may be significant enough to require the operator to have clear intent to rotate and change speeds. The speed control may be expected to be among the least used controls.

An emergency stop button may be provided on the control panel, as well as one or more other more remote positions on the pipe retrieval machine. The emergency button may be configured to stop the machine and all or most machine functions when pressed. The emergency button may then stay locked in the pressed state until the machine is ready to be run again. The emergency button may then require a clear intent action, such as to turn the button to reset the button and to start the machine again.

A load switch or switch position may also be provided on the control panel. The load switch or position may be configured to turn the machine off and open the wheels to permit loading pipe into the machine. A run or start switch or switch position may also be provided on the control panel. In this example, one switch is provided with two positions including a load position and a run position. The run switch or position may be configured to allow the machine, or at least the wheels, to be re-engaged. In one example, when the load function is selected, the pipe flow direction functionality may be disabled so that pipe will not be moved through the machine while being loaded.

Figure 57:
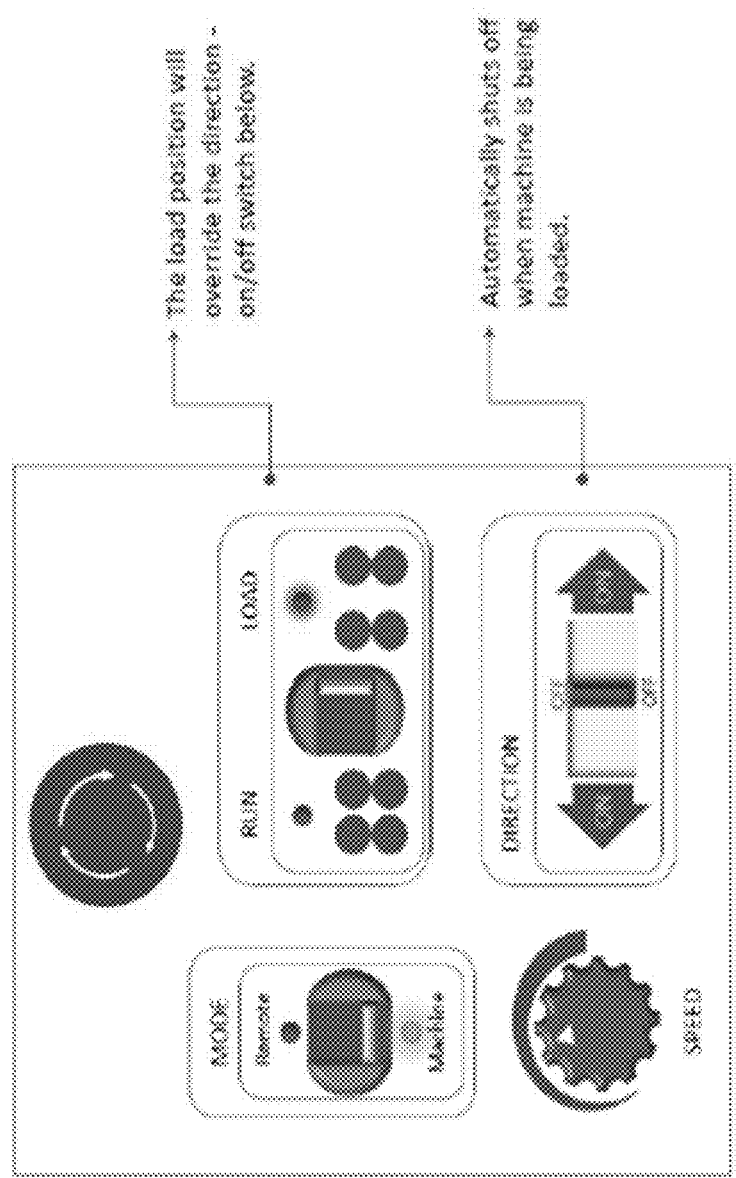

The control panel may also include a dedicated pipe direction switch. In one example, when the direction switch is moved right or left, a corresponding directional arrow may be lit up as the direction is selected and set. The direction switch may be configured to automatically reset to a center off or neutral position each time the machine is stopped or at other desired times or during other desired actions. The direction arrow light may be configured to go off when the machine is stopped or when the direction is changed. As shown in FIG. 57, the load position of the load/run switch may be configured to override the direction switch. The pipe direction may be set to switch to off or neutral automatically when the machine is being loaded while the run/load switch is in the load position.

Figure 58:
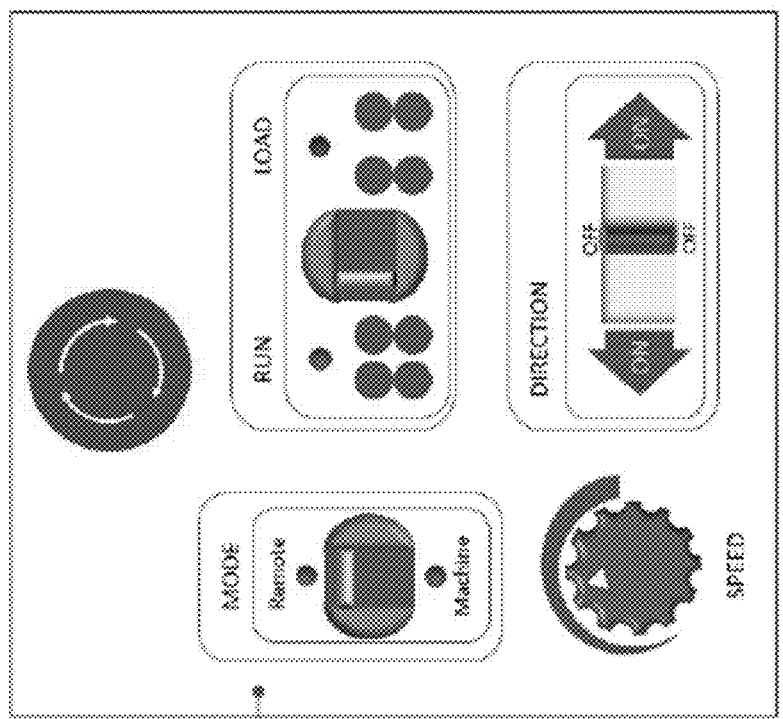

The various switches may be the same or one or more of the switches may be different from the other switches, such as by size, shape, style, tactile function, or the like. For example, the mode switch and the run/load switch may be the same or very similar. However, as shown in FIG. 58, orienting these switches in different directions (i.e., up/down and left/right) may reduce the likelihood of the switches and functions being confused during use, such as by being switched to the run position when the operator meant to switch to the remote operation mode.

As noted above, the remote control (see FIG. 53) may be configured to serve only two functions. One function is to run the machine and other function is to stop the machine.

Figure 59:
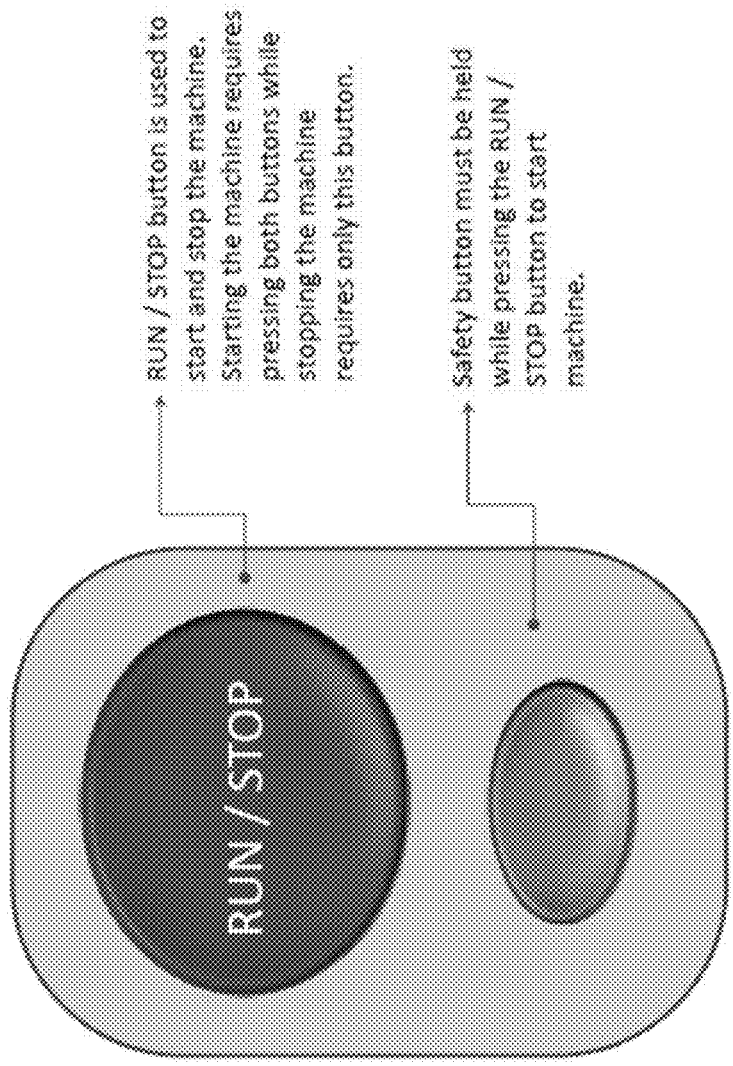
Figure 60:
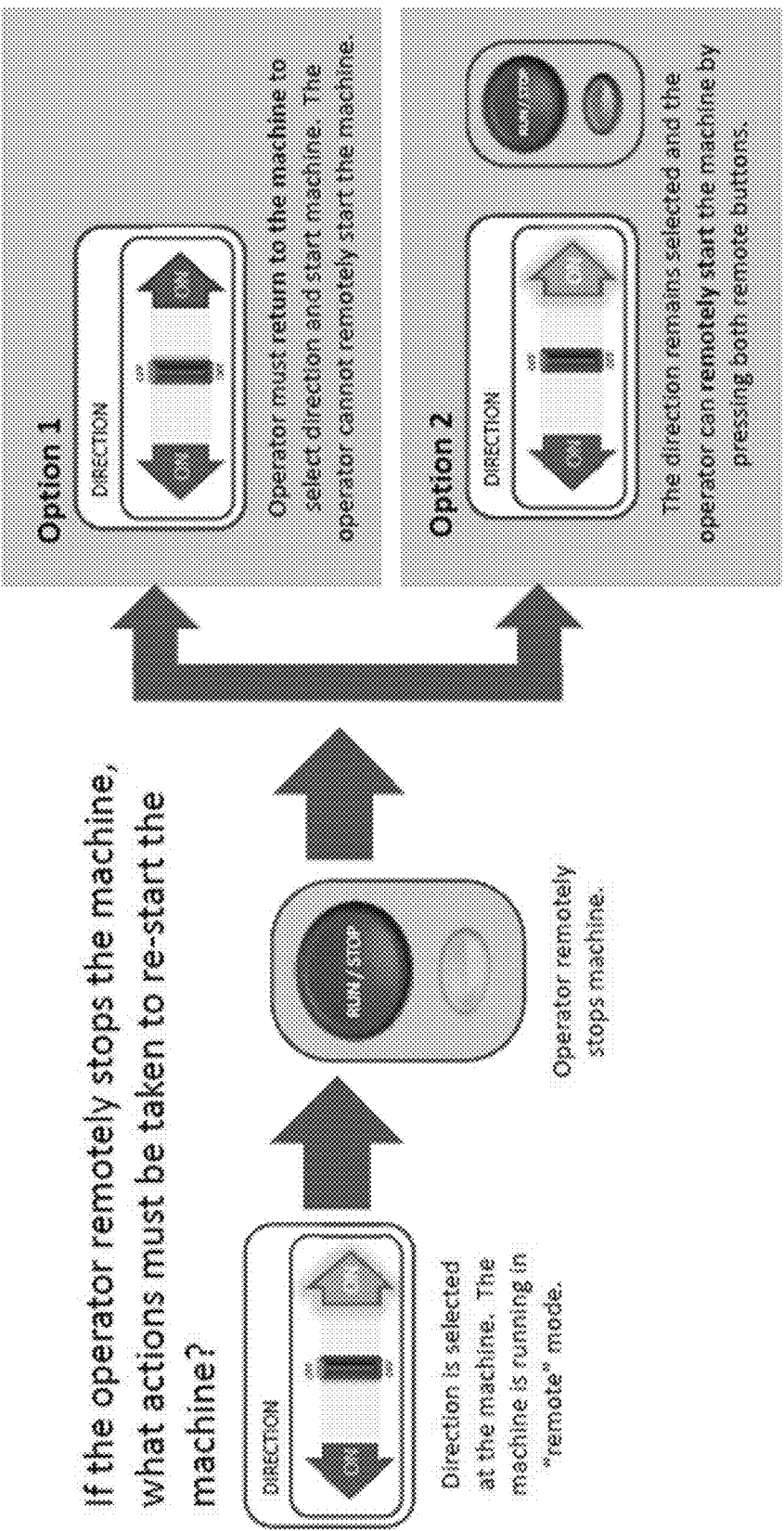

As shown in FIG. 59, running the machine may be configured to require two distinct steps or actions or two simultaneous distinct actions to avoid any chance of the machine being run without clear intent. This can be true of the remote control start or run function as well as the main control panel start or run function. However, referring also to FIG. 60, to ensure safety and awareness of the machine and its immediate surroundings, all other functions of the machine may be best served if provided only on the main machine control panel. Once the mode is switched from remote back to machine, all inputs from the remote control may be overridden by the operator at the machine. The remote control may be configured to be effective only when the remote mode is set at the machine control panel.

This written description uses examples or embodiments to enable those of ordinary skill in the art to make and use the invention. The patentable scope is defined by the claims. The claim scope may encompass other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all activities, components, and features described above in the general description or the examples are required. A portion of a specific activity, component, or feature may not be required, and that one or more further activities, components, or features may be performed or included in addition to those described or in different, more inclusive or less inclusive, combinations. Still further, the order in which activities are listed or described are not necessarily the order in which they are, or need be, performed.

In the foregoing specification, the concepts have been described with reference to specific examples. However, one of ordinary skill in the art appreciates that various modifications and changes can be made without departing from the scope of the disclosure as set forth in the claims below. Accordingly, the written description and drawings are to be regarded in an illustrative rather than a restrictive sense, and all such modifications are intended to be included within the scope of disclosure.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those having ordinary skill in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although certain pipe retrieval apparatuses, systems, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A pipe retrieval machine comprising:
   a frame defining a decoupling region and a travel axis;
   a transporting mechanism supported on the frame and having a first gripping structure adjacent an infeed end of the machine and a second gripping structure adjacent an outfeed end of the machine, the decoupling region disposed between the first and second gripping structures;
   a drive system configured to move the first and second gripping structures at a steady state speed to direct a pipe along the travel axis; and
   one or more safety features configured to stop the drive system either automatically or through manual action,
   wherein the pipe retrieval machine is configured, by selectively and independently reducing the first and second gripping structures to respective first and second speeds that are less than the steady state speed, to detach at least one pipe section from the pipe, to move the detached pipe section from the machine, and to advance the remaining pipe for disassembly.

2. The pipe retrieval machine of claim 1, further comprising:
   a decoupling device in the decoupling region and having a decoupler, the decoupler being automatically operable to engage a locking part of the pipe joint, and the decoupling device being configured to selectively and automatically slow the pipe relative to the steady state speed.

3. The pipe retrieval machine of claim 1, wherein the one or more safety features include one or more emergency stops configured, if actuated, to stop the drive system.

4. A pipe retrieval machine of claim 1, further comprising:
   a user interface or control panel configured to receive inputs from a user and provide outputs to the user; and
   a control system operable to control the drive system to move the transporting mechanism, wherein the control system is accessible via the user interface.

5. The pipe retrieval machine of claim 4, wherein the one or more safety features includes an emergency stop on the user interface or control panel.

6. The pipe retrieval machine of claim 1, wherein the one or more safety features includes one or more emergency stops, and wherein each of the one or more emergency stops is an emergency stop button that is actuatable by manually pressing the button and releasable or resettable by manually twisting the button.

7. A pipe retrieval machine comprising:
   a frame defining a decoupling region and a travel axis;
   a transporting mechanism supported on the frame and having a first gripping structure adjacent an infeed end of the machine and a second gripping structure adjacent an outfeed end of the machine, the decoupling region disposed between the first and second gripping structures;
   a drive system configured to move the first and second gripping structures at a steady state speed to direct a pipe along the travel axis; and
   one or more safety features configured to stop the drive system either automatically or through manual action,
   wherein the one or more safety features includes a plurality of emergency stops disposed spaced apart about the pipe retrieval machine.

8. A pipe retrieval machine comprising:
   a frame defining a decoupling region and a travel axis;
   a transporting mechanism supported on the frame and having a first gripping structure adjacent an infeed end of the machine and a second gripping structure adjacent an outfeed end of the machine, the decoupling region disposed between the first and second gripping structures;
   a drive system configured to move the first and second gripping structures at a steady state speed to direct a pipe along the travel axis; and
   one or more safety features configured to stop the drive system either automatically or through manual action;
   a user interface or control panel configured to receive inputs from a user and provide outputs to the user; and
   a control system operable to control the drive system to move the transporting mechanism, wherein the control system is accessible via the user interface, and
   wherein the one or more safety features includes an emergency stop disposed at each of four corners of the pipe retrieval machine and on the user interface or the control panel.

9. A pipe retrieval machine comprising:
   a frame defining a decoupling region and a travel axis;
   a transporting mechanism supported on the frame and having a first gripping structure adjacent an infeed end of the machine and a second gripping structure adjacent an outfeed end of the machine, the decoupling region disposed between the first and second gripping structures;
   a drive system configured to move the first and second gripping structures at a steady state speed to direct a pipe along the travel axis; and
   one or more safety features configured to stop the drive system either automatically or through manual action,
   wherein the one or more safety features includes a light curtain configured to sense a foreign object within the machine, such as within the decoupling region, and to automatically stop the drive system.

10. A pipe retrieval machine comprising:
a frame defining a decoupling region and a travel axis;
a transporting mechanism supported on the frame and having a first gripping structure adjacent an infeed end of the machine and a second gripping structure adjacent an outfeed end of the machine, the decoupling region disposed between the first and second gripping structures;
a drive system configured to move the first and second gripping structures at a steady state speed to direct a pipe along the travel axis; and
one or more safety features configured to stop the drive system either automatically or through manual action, wherein the one or more safety features includes a platform associated with a user interface or a control panel, and wherein the platform, in a lowered position, permits the pipe retrieval machine to start and run, and the platform, in a raised position, prevents the pipe retrieval machine from starting or running.

11. A pipe retrieval machine comprising:
a frame defining a decoupling region and a travel axis;
a transporting mechanism supported on the frame and having a first gripping structure adjacent an infeed end of the machine and a second gripping structure adjacent an outfeed end of the machine, the decoupling region disposed between the first and second gripping structures;
a drive system configured to move the first and second gripping structures at a steady state speed to direct a pipe along the travel axis; and
one or more safety features configured to stop the drive system either automatically or through manual action, wherein the one or more safety features includes a shield associated with a user interface or a control panel, and wherein the shield, in a lowered position, prevents the pipe retrieval machine from starting or running and/or prevents access to the user interface or control panel, and the shield, in a raised position, permits the pipe retrieval machine to start and run and/or permits access to the user interface or control panel.

12. A pipe retrieval machine comprising:
a frame defining a decoupling region and a travel axis;
a transporting mechanism supported on the frame and having a first gripping structure adjacent an infeed end of the machine and a second gripping structure adjacent an outfeed end of the machine, the decoupling region disposed between the first and second gripping structures;
a drive system configured to move the first and second gripping structures at a steady state speed to direct a pipe along the travel axis; and
one or more safety features configured to stop the drive system either automatically or through manual action, wherein the one or more safety features includes that user inputs and user outputs of a user interface or a control panel are arranged ergonomically according to a hierarchy of use.

13. A pipe retrieval machine comprising:
a frame defining a decoupling region and a travel axis;
a transporting mechanism supported on the frame and having a first gripping structure adjacent an infeed end of the machine and a second gripping structure adjacent an outfeed end of the machine, the decoupling region disposed between the first and second gripping structures;
a drive system configured to move the first and second gripping structures at a steady state speed to direct a pipe along the travel axis; and
one or more safety features configured to stop the drive system either automatically or through manual action, wherein the one or more safety features includes that user inputs and user outputs of a user interface or a control panel include a plurality of knobs, switches, and/or actuation devices, and wherein one or more of the plurality of knobs, switches, and/or actuation devices are configured to actuate a respective part of the machine and to move in a direction that corresponds to the movement of the respective part of the machine, such as left/right or up/down.

14. A pipe retrieval machine comprising:
a frame defining a decoupling region and a travel axis;
a transporting mechanism supported on the frame and having a first gripping structure adjacent an infeed end of the machine and a second gripping structure adjacent an outfeed end of the machine, the decoupling region disposed between the first and second gripping structures;
a drive system configured to move the first and second gripping structures at a steady state speed to direct a pipe along the travel axis; and
one or more safety features configured to inhibit or prevent damage to components of the decoupling region in the event of a malfunction.

15. The pipe retrieval machine of claim 14, further comprising:
a decoupling device in the decoupling region and having a decoupler, the decoupler being automatically operable to engage a locking part of a pipe joint, and the decoupling device being configured to selectively and automatically slow the pipe relative to the steady state speed.

16. The pipe retrieval machine of claim 15, wherein the decoupling device includes a breakaway mount to the pipe retrieval machine, and wherein the breakaway mount is configured to release the decoupling device to allow the decoupling device to move out of the way if a riser on a joint of a pipe passing through the pipe retrieval machine hits a part of the decoupling device.

17. The pipe retrieval machine of claim 15, wherein the decoupling device includes an actuator with an actuator cylinder, and wherein the actuator includes an overstroke spring to prevent damage to a pipe coupling, a decoupler of the actuator, or both, in the case of a failed spline release.

18. The pipe retrieval machine of claim 15, wherein the decoupling device includes a gate that is pivotable in one direction to selectively release a separated pipe and pipe coupling passing through the decoupling region, and that is configured to pivot in the opposite direction if hit by a pipe coupling and pipe that is reversed in direction through the decoupling region.

19. The pipe retrieval machine of claim 14, wherein the pipe retrieval machine is configured, by selectively and independently reducing the first and second gripping structures to respective first and second speeds that are each less than the steady state speed, to compress a pipe joint, to detach at least one pipe section from the pipe at the pipe joint, to move the detached pipe section from the machine, and to advance the remaining pipe for disassembly.

20. The pipe retrieval machine of claim 14, further comprising one or more additional safety features configured to stop the drive system either automatically or through manual action.

* * * * *